United States Patent [19]
Tanake et al.

[11] Patent Number: 5,537,310
[45] Date of Patent: Jul. 16, 1996

[54] INTERNAL MODEL CONTROLLER WITH AUTOMATICALLY CORRECTING GAIN OF THE INTERNAL MODEL CONTROLLER

[75] Inventors: Masato Tanake; Hiroyuki Mibuchi, both of Tokyo, Japan

[73] Assignee: Yamatake-Honeywell Co., Ltd., Tokyo, Japan

[21] Appl. No.: 359,630

[22] Filed: Dec. 20, 1994

[30] Foreign Application Priority Data

Dec. 27, 1993 [JP] Japan .................................. 5-347221

[51] Int. Cl.⁶ .................................................. G05B 13/04
[52] U.S. Cl. .......................... 364/151; 364/157; 364/158
[58] Field of Search ........................ 364/148, 149–151, 364/152, 153, 157, 158, 159, 164, 165, 166, 176, 177, 183; 318/561

[56] References Cited

U.S. PATENT DOCUMENTS

| | | | |
|---|---|---|---|
| 4,368,510 | 1/1983 | Anderson | 364/151 |
| 5,319,539 | 6/1994 | Shinskey | 364/157 |
| 5,347,446 | 9/1994 | Iino et al. | 364/153 X |
| 5,442,544 | 8/1995 | Jeliner | 364/153 X |

FOREIGN PATENT DOCUMENTS

| | | |
|---|---|---|
| 4042303 | 2/1992 | Japan . |
| 5265515 | 10/1993 | Japan . |
| 2086082 | 5/1982 | United Kingdom . |
| 2267979 | 12/1993 | United Kingdom . |

OTHER PUBLICATIONS

'A New Automated Optimal Tuning Strategy for a PID Controller' L. S. Cheung (auth); ISA Transactions–vol. 27 (1988).

Manfred Morari and Evanghelos Zafiriou, "ROBUST PROCESS CONTROL/ Chapter 3 and 4", pp. 39–83 and title page, Prentice–Hall; Date unknown.

*Primary Examiner*—Joseph Ruggiero
*Attorney, Agent, or Firm*—Lane, Aitken & McCann

[57] ABSTRACT

An internal model control (IMC) automatically corrects the gain of the internal model control when the settings in the internal model are improper. The controller calculates and outputs a manipulated variable according to an IMC control algorithm, and an adaptive tuning section adaptively tunes the model gain of an internal model such that change rates of the controlled variable and the reference controlled variable used in said IMC section become the same value during a control response period in a transient state. When a transient state of control is detected, a transient state detection signal is output and a response start region is detected. The change rates of the controlled variable and the reference controlled variable in this response start region are determined. The corrected gain of the internal model is calculated from the change rates of the controlled variable and the reference controlled variable in the response start region. The corrected gain is then output to an internal model storage section, thereby correcting the gain of the internal model.

13 Claims, 30 Drawing Sheets

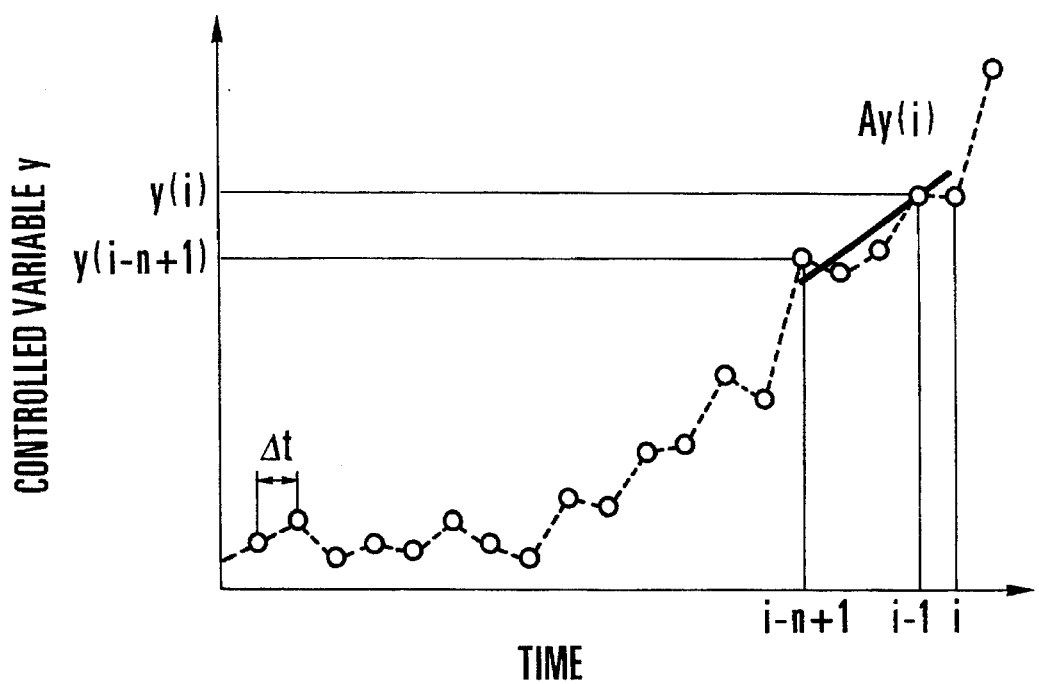
F I G. 6A
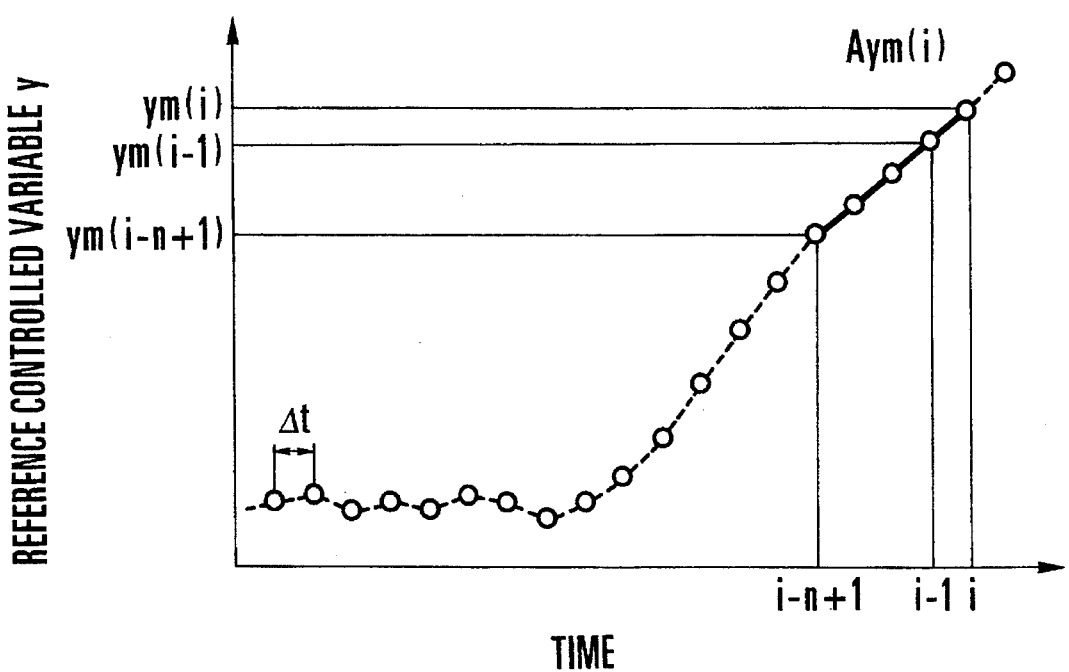
F I G. 6B

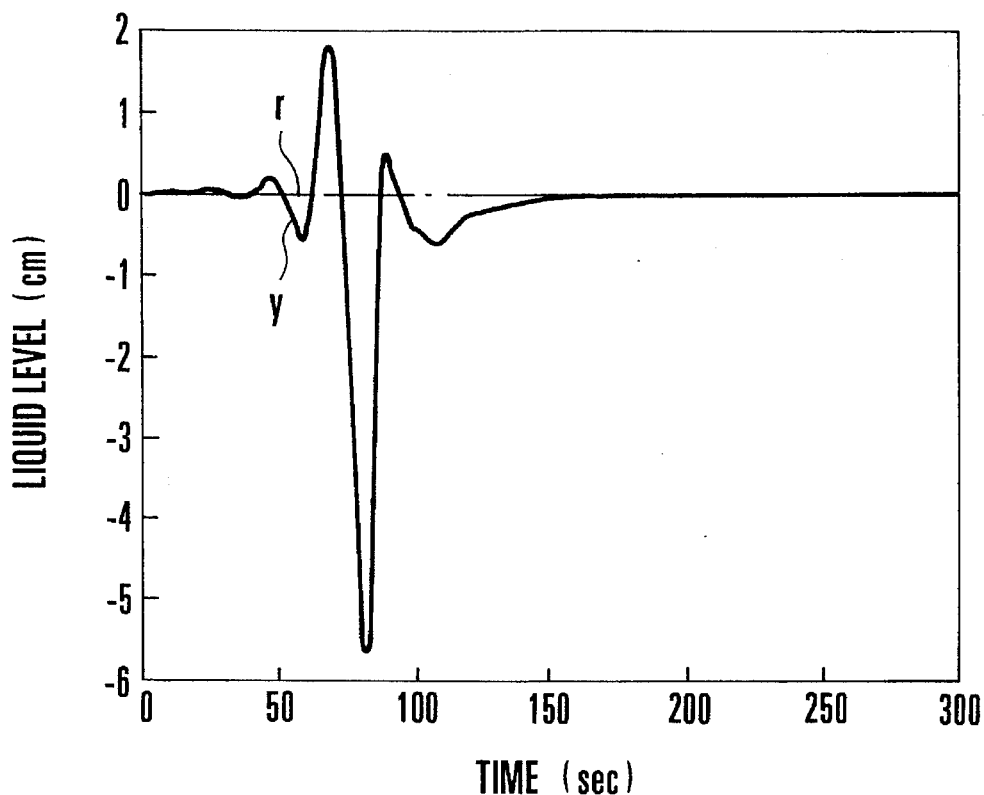
F I G. 16
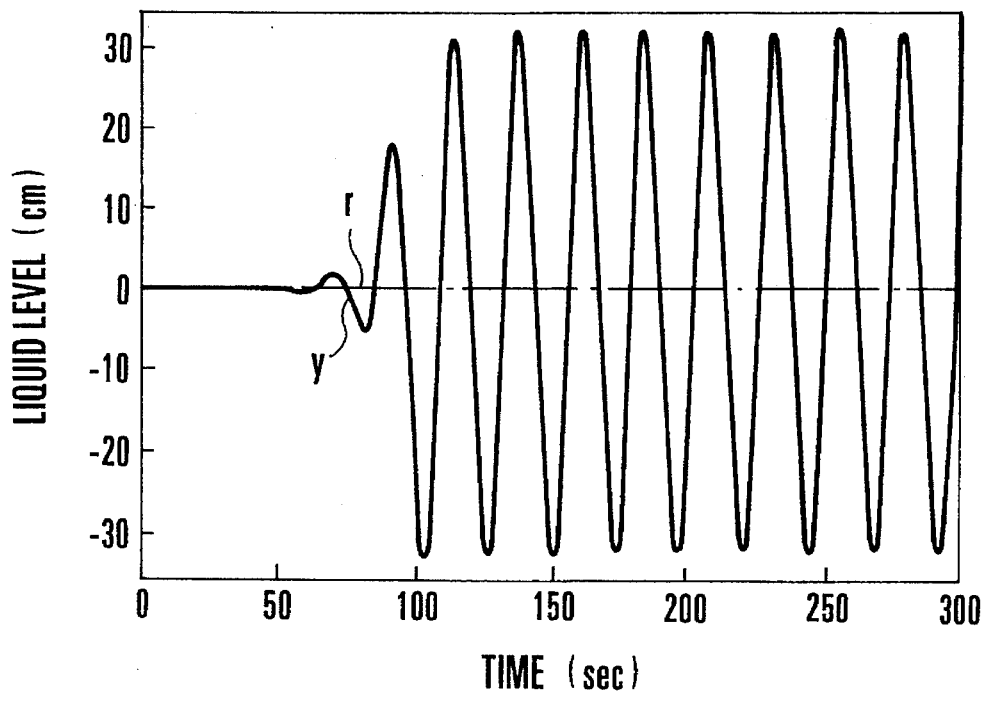
F I G. 17

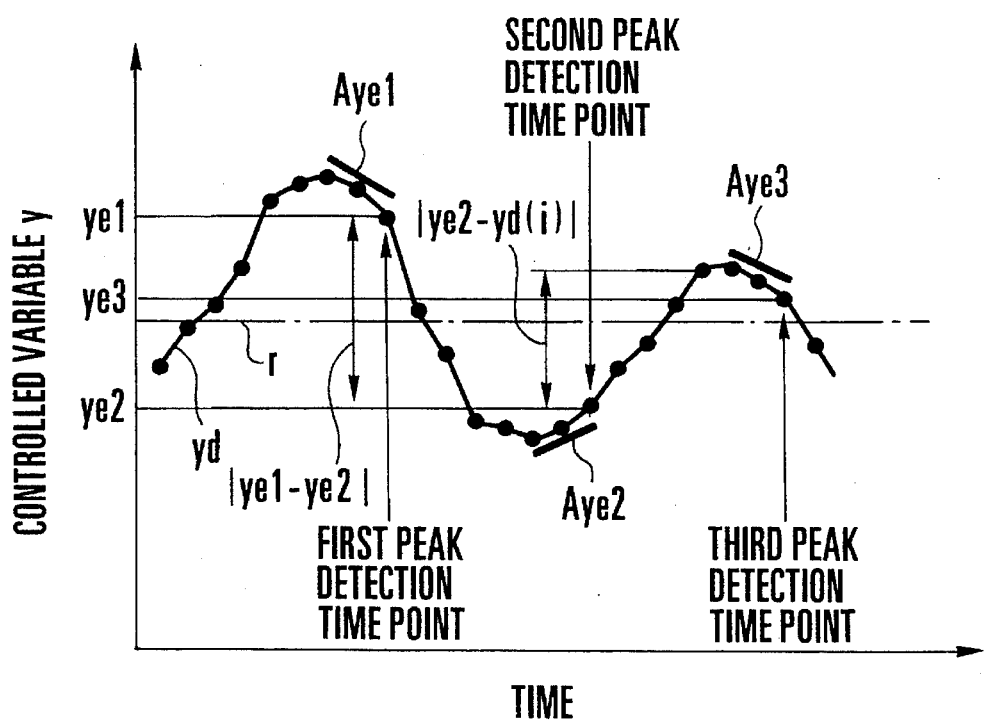
F I G. 20 A
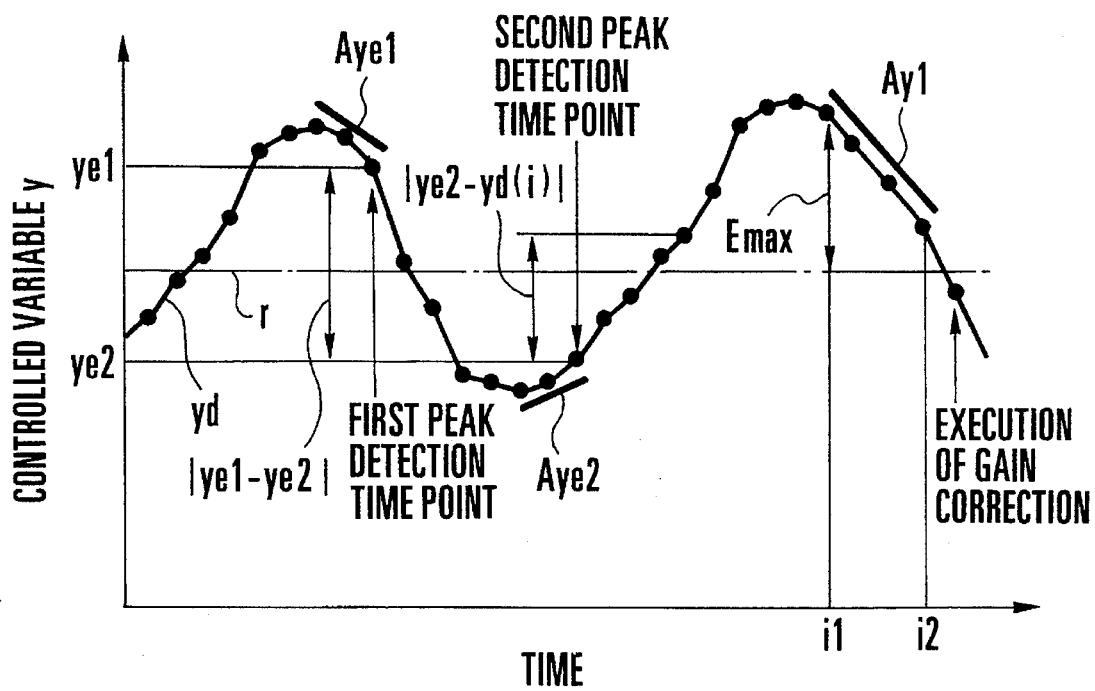
F I G. 20 B

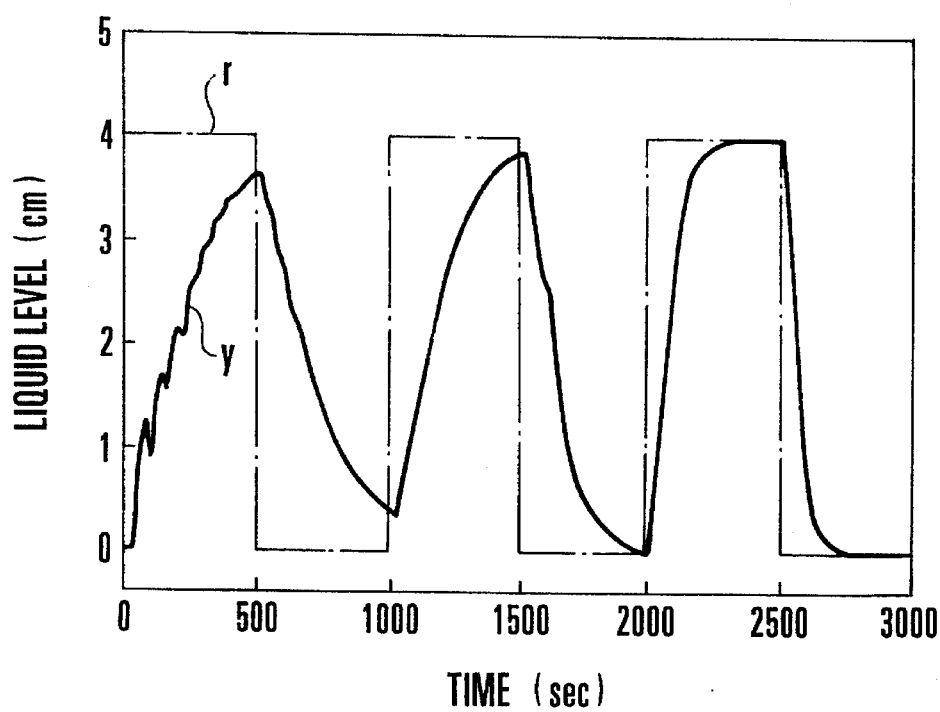
F I G. 31
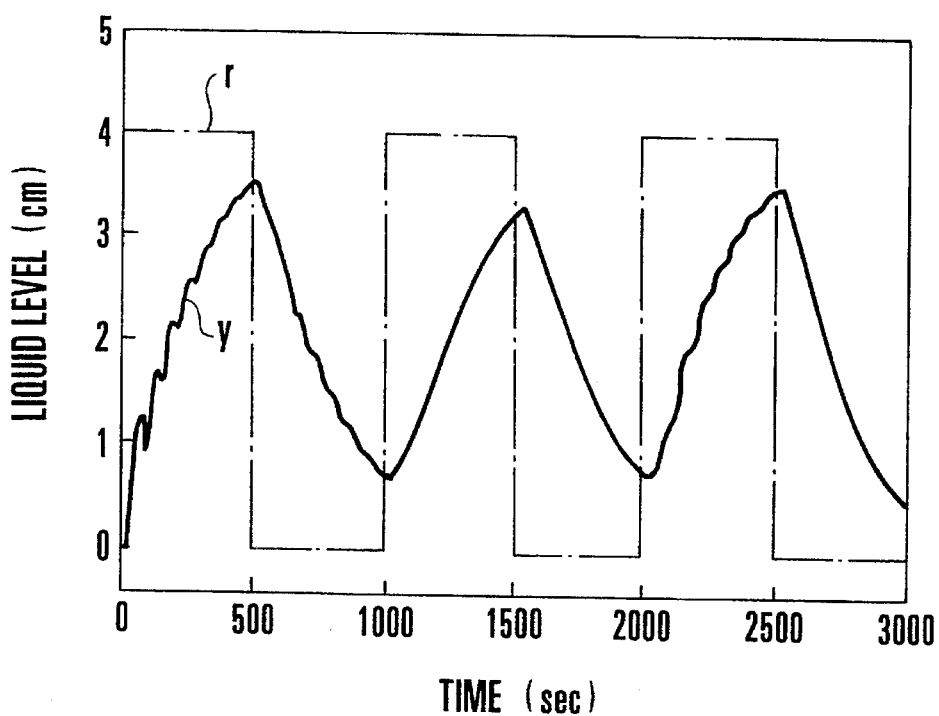
F I G. 32

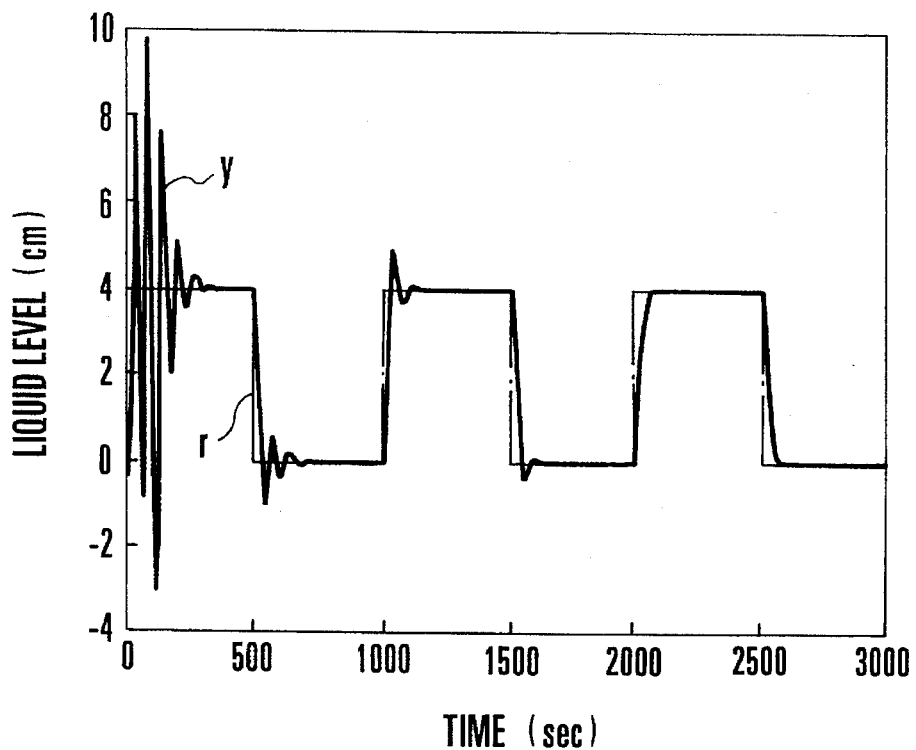
F I G.33
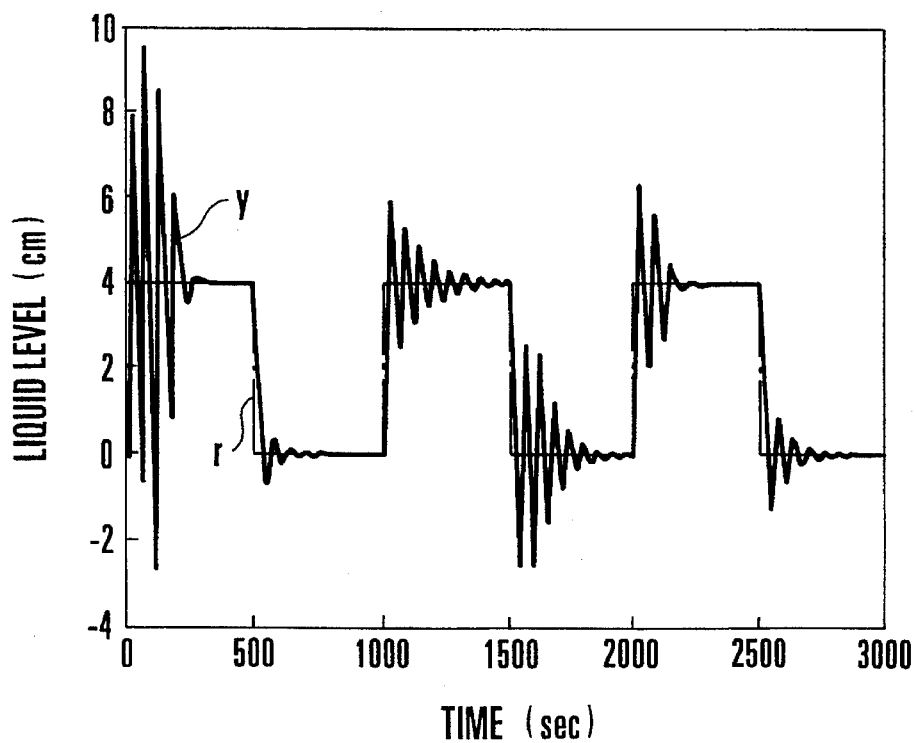
F I G.34

INTERNAL MODEL CONTROLLER WITH AUTOMATICALLY CORRECTING GAIN OF THE INTERNAL MODEL CONTROLLER

BACKGROUND OF THE INVENTION

The present invention relates to a controller using a control algorithm having an IMC (Internal Model Control) structure and, more particularly, to a controller which can perform proper control by automatically correcting the gain of an internal model when the setting of the internal model is improper.

A controller using a control algorithm having an IMC structure has been proposed, which performs control by incorporating an internal model as a mathematical expression of a controlled system process. With this IMC controller, even a controlled system process with a large idle time can be controlled. More specifically, if, for example, the controller is an indoor air conditioner, the controlled system process corresponds to an indoor environment, and the idle time corresponds to the time interval between the instant at which the air conditioner is started and the instant at which the indoor temperature begins to change.

FIG. 1 shows a control system using a conventional IMC controller. Reference numeral 33 denotes a first subtraction processing section for subtracting a feedback amount (to be described later) from a command (set indoor temperature); 32, a filter section for preventing abrupt transfer of a change in output from the first subtraction processing section 33; 34, a manipulating section for calculating a manipulated variable (the temperature of warm or cool air sent from an indoor air conditioner) as an output from this controller on the basis of an output from the filter section 32; 36, an internal model as an approximate mathematical expression of a controlled system process, which model outputs a reference controlled variable corresponding to a controlled variable (indoor temperature) as a control result; 38, a second subtraction processing section for subtracting a reference controlled variable, supplied from the internal model 36, from a controlled variable so as to output a feedback amount; and 40, a controlled system process.

Reference symbols F, Gc, Gm, and Gp denote the transfer functions of the filter section 32, the manipulating section 34, the internal model 36, and the controlled system process 40, respectively; r, a command; u, a manipulated variable; d, a disturbance corresponding to, e.g., an outdoor environment with respect to an indoor environment; y, a controlled variable; ym, a reference controlled variable; and e, a feedback amount.

The operation of this IMC controller will be described next.

First of all, the first subtraction processing section 33 subtracts the feedback amount e from the command r. The result is output to the filter section 32. The manipulating section 34 then calculates the manipulated variable u on the basis of an output from the manipulating section 34. The manipulated variable u is output to the controlled system process 40 and the internal model 36. The second subtraction processing section 38 subtracts the reference controlled variable ym, supplied from the internal model 36 which approximately operates in the same manner as the controlled system process 40, from the controlled variable y of the controlled system process 40. The result is fed back, as the feedback amount e, to the first subtraction processing section 33. In this manner, a feedback control system is formed.

Ideally, the internal model 36 of this IMC controller is mathematically expressed to be perfectly identical to the controlled system process 40. It is also ideal that the manipulating section 34 has an inverse characteristic (1/Gm) of the transfer function of the internal model 36. However, it is impossible to obtain the reciprocal of a factor associated with the idle time of the internal model 36. For this reason, the factor associated with the idle time is generally neglected.

With such an arrangement, therefore, the controlled variable y can be obtained from the command r and the disturbance d according to the following equation:

$$y = F \times Gp \times Gc \times r/\{1 + F \times Gc \times (Gp - Gm)\} + \qquad (1)$$

$$(1 - F \times Gm \times Gc) \times d/\{1 + F \times Gc \times (Gp - Gm)\}$$

Assume that the transfer function Gm of the internal model 36 is equal to the transfer function Gp of the controlled system process 40, and the transfer function Gc of the manipulating section 34 is equal to the reciprocal (1/Gm= 1/Gp) of the transfer function of the internal model 36. In this ideal state, equation (1) can be rewritten into $$y = F \times r + (1 - F) \times d \qquad (2)$$

Also assume that there is no abrupt change in the command r. Under such an ideal condition, the filter section 32 can be omitted, and F=1 can be set. Therefore, the controlled variable y becomes equal to the command r (y=r) to realize control without any influence of the disturbance d.

Consider the disturbance d next. Even if both the controlled system process 40 and the internal model 36 have a long idle time, they exhibit the same characteristics with respect to the manipulated variable u. Consequently, the feedback amount e output from the second subtraction processing section 38 is only the disturbance d. It is, therefore, apparent that the disturbance d can be controlled.

Such an IMC controller is generally designed on the basis of design conditions associated with robust stability and robust performance respectively indicating stability and performance obtained when the model identification error between the controlled system process 40 and the internal model 36 becomes large.

When the internal model 36 is determined by such a model identification technique, some model identification error in the internal model 36 relative to the controlled system process 40 cannot be avoided. If, however, this model identification error is erroneously estimated, control cannot be performed as expected. Countermeasures against this situation are taken by an expert in control.

A conventional IMC controller is arranged in the above-described manner. In a controller having a internal model which is greatly different from a controlled system process, when a change in command, a disturbance, changes in the characteristics of the controlled system process, or the like, which shifts control to a transient state, occurs, fluctuations in controlled variable occur. As a result, instability of this control cannot be suppressed. In this case, an operator other than an expert in control must give up the use of the IMC controller.

This problem will be described below with reference to FIG. 2. Assume that a conventional IMC controller (Internal Model Controller) is used to perform temperature control of an industrial electric furnace. In the case shown in FIG. 2, the controlled variable y is the temperature in the furnace, and the manipulated variable u is an output from a heater. The controller is used to adjust the temperature in the furnace to a command. The command is input, as the desired value r, to the controller. In general, the command r, the controlled variable y, and the manipulated variable u in the controller are expressed as values normalized within the range of 0% to 100%. A change in a designated value from the controller in response to an output, as a manipulated variable, from the heater is transferred to the temperature, as a controlled variable, in the furnace. This transfer characteristic can be defined as the transfer function Gp. The simplest expression of this transfer function is 1st-order delay+idle time and given by $$Gp=K\exp(-Ls)/(1+Ts)$$

where K is the process gain, L is the idle time, and T is the process time constant. This equation indicates the following characteristics. When the designated value from the controller changes by 1% in response to an output from the heater, the temperature in the furnace changes by K%. The time interval between the instant at which the designated value from the controller changes by, e.g., 1% in response to an output from the controller and the instant at which the temperature in the furnace substantially begins to change is the process idle time L. The time interval between the instant at which the temperature in the furnace begins to change (after the lapse of the process idle time L since the designated value from the controller has changed by, e.g., 1% in response to an output from the heater) and the instant at which the temperature in the furnace changes by 0.63 K% is the process time constant T.

In the electric furnace, since it takes much time for an output from the heater itself to change, the process idle time is close to the process time constant in the characteristics of the transfer function. In general, such a value is large as a process idle time. It is difficult to apply PID control, which has been most widely used, to a controlled system having such characteristics. An IMC, however, is an effective means for this controlled system.

The purpose of control is to keep the temperature in the furnace constant. The internal model parameters of the IMC controller are generally adjusted by the designer/manufacturer of the electric furnace or a field operator. The designer/manufacturer of the electric furnace tends to lack in knowledge of control. Even if the designer/manufacturer has knowledge of control, he/she cannot properly adjust the parameters because he/she does not perform adjustment during an operation of the electric furnace. On the other hand, the field operator generally performs adjustment by a trial-and-error method which is not based on knowledge of control. Therefore, it takes much time and labor to realize proper adjustment. For these reasons, a conventional IMC controller is often used without proper adjustment.

In addition, the number of products transferred through the electric furnace during an operation of the furnace often and irregularly varies. Furthermore, the number of types of products transferred through the furnace is not limited to one. If the furnace is an electric furnace for precision machine components, the type of products transferred through the furnace may change every several hours. Such a change in type becomes a factor of variations in the characteristics of the controlled system process. The electric furnace itself is affected by the indoor temperature of the factory or other heating elements, which become factors of variations in characteristics. In this case, even if the internal model parameters of the IMC controller are properly adjusted in the process of installing the electric furnace, proper control cannot be maintained.

Assume that the type of products transferred through the electric furnace changes. In this case, the temperature (command) to be maintained in the furnace also changes. As the command changes, control is shifted from a settled state to a transient state. At this time, with the above improper adjustment and variations in the characteristics of the controlled system process, control lacks stability, resulting in fluctuations in temperature in the furnace, or control becomes excessively stable, excessively prolonging the time required for the temperature in the furnace to reach a command. These phenomena lead to a deterioration in the productivity of the electric furnace or generation of defective products.

In general, variations in the characteristics of an electric furnace are caused by the improper setting of the internal model parameters of an IMC, especially a model gain. If such variations in characteristics occur frequently and irregularly, it is difficult for a field operator to adjust even the model gain. Therefore, practical use of an IMC is difficult to realize unless the model gain is automatically adjusted in accordance with a situation. Consequently, practical use of such an electric furnace must be abandoned.

SUMMARY OF THE INVENTION

The present invention has been made to solve the above problems, and has its object to provide a controller having an IMC structure which can perform proper control by automatically correcting the gain of an internal model when the settings in the internal model are improper.

According to the present invention, there is provided a controller having an IMC structure which calculates a manipulated variable output to a controlled system process from a command of control, calculates a reference controlled variable corresponding to a controlled variable of the controlled system process as a control result by using an internal model representing the controlled system process, and feeds back a difference between the controlled variable and the reference controlled variable, thereby adaptively stabilizing control, comprising an IMC section for calculating and outputting a manipulated variable according to an IMC control algorithm, and an adaptive tuning section for adaptively tuning a model gain of an internal model as a constituent element of the IMC control algorithm such that change rates of the controlled variable and the reference controlled variable as variables used in the IMC section become the same value during a control response period in a transient state.

According to an aspect of the present invention, the IMC section comprises a command filter section for outputting an input command of control with a transfer function having a delay characteristic, a first subtraction processing section for subtracting a feedback amount from the output from the command filter section, a manipulated variable calculating section including a command/disturbance filter section for outputting the output from the first subtraction processing section with a transfer function having a delay characteristic, and a manipulating section for calculating a manipulated variable on the basis of the output from the command/disturbance filter section on the basis of parameters of the internal model, and outputting the calculated manipulated variable, an internal model storage section for storing parameters of the internal model, an internal model output calculating section for calculating a reference controlled variable from the manipulated variable on the basis of parameters of the internal model, and a second substraction processing section for subtracting the reference controlled variable output from the internal model output calculating section from the controlled variable of the controlled system process, and outputting the feedback amount.

Further, the adaptive tuning section comprises a deviation change amount calculating section for calculating a deviation as a difference between the command and the controlled variable, and calculating a change amount of the deviation, a sequential change rate calculating section for calculating change rates of the controlled variable and the reference controlled variable, a first transient state detecting section for outputting a transient state detection signal upon detecting a transient state of control due to a change in command, a second transient state detecting section for outputting a transient state detection signal upon detecting a transient state of control due to a factor other than the change in command, a response start region detecting section for detecting a response start region, in which control responses corresponding to a transient state begin to appear in the controlled variable and the reference controlled variable, on the basis of the deviation and the change rates of the controlled variable and the reference controlled variable, when the transient state detection signal is output, and determining the change rates of the controlled variable and the reference controlled variable in the response start region, and a model gain calculating section for calculating a corrected gain of the internal model from the change rates of the controlled variable and the reference controlled variable in the response start region, and updating a gain as one of the parameters stored in the internal model storage section into the corrected gain.

The adaptive tuning section may further comprise a peak controlled variable detecting section for detecting maximum and minimum values of the controlled variable on the basis of the change rate of the controlled variable after the gain of the internal model is corrected by the model gain calculating section, and setting a controlled variable at the time point, at which the maximum and minimum values are detected, as a peak controlled variable, a damping determining section for evaluating a fluctuated state of the controlled variable on the basis of the peak controlled variable, and outputting a re-execution designation signal for re-executing correction of the gain of the internal model to the response start region detecting section upon determining that damping of fluctuations is insufficient, and a settlement determining section for evaluating a settled state of control on the basis of the deviation and the deviation change amount output from the deviation change amount calculating section, and outputting initialization signals for resuming detection of a transient state to prepare for a next transient state to the first and second transient state detecting sections upon determining a settled state.

The adaptive tuning section may further comprise an excessive stability determining section for evaluating an excessively stable state of control on the basis of the deviation and the deviation change amount output from the deviation change amount calculating section, and outputting a correction designation signal upon determining the excessively stable state, and an excessive stability gain correcting section for calculating a corrected gain of the internal model to cancel the excessively stable state in response to the correction designation signal, and updating a gain as one of the parameters stored in the internal model storage section into the corrected gain.

The adaptive tuning section may further comprise a settlement determining section for evaluating a settled state of control on the basis of the deviation and the deviation change amount output from the deviation change amount calculating section, and outputting a correction designation signal upon determining the settled state, and a quick response characteristic model gain correcting section for calculating a corrected gain of the internal model to restore a quick response characteristic of control in response to the correction designation signal, and updating a gain as one of the parameters stored in the internal model storage section into the corrected gain.

The adaptive tuning section may further comprise a settlement determining section for evaluating a settled state of control on the basis of the deviation and the deviation change amount output from the deviation change amount calculating section, and outputting a correction designation signal upon determining the settled state, an idle time error estimating section for estimating an idle time error of the internal model on the basis of time information of the response start region which is output from the response start region detecting section, and a model idle time correcting section for calculating a corrected idle time of the internal model on the basis of the idle time error in response to the correction designation signal, and updating an idle time as one of the parameters stored in the internal model storage section into the corrected idle time.

According to the present invention, a deviation and a deviation change amount are calculated by the deviation change amount calculating section, and the change rates of a controlled variable and a reference controlled variable are calculated by the sequential change rate calculating section. When a transient state of control is detected by the first or second transient state detecting section and a transient state detection signal is output, a response start region is detected by the response start region detecting section, and the change rates of the controlled variable and the reference controlled variable in the response start region are determined. The corrected gain of the internal model is calculated by the model gain calculating section on the basis of the change rates of the controlled variable and the reference controlled variable in the response start region. The corrected gain is then output to an internal model storage section, thereby correcting the gain of the internal model.

The maximum and minimum values of a controlled variable after gain correction are detected by the peak controlled variable detecting section. When the controlled variable at the time of this detection is set as a peak controlled variable, and the damping determining section determines that damping of fluctuations in the controlled variable is insufficient, a re-execution designation signal is output to the response start region detecting section. With this operation, the gain of the internal model is corrected again by the model gain calculating section.

In addition, when an excessively stable state is determined by the excessive stability determining section, a correction designation signal is output. In response to the correction designation signal, the corrected gain of the internal model is calculated by the excessively stable gain correcting section to eliminate the excessively stable state. The corrected gain is then output to the internal model storage section, thereby correcting the gain of the internal model.

Furthermore, when a settled state is determined by the settlement determining section, a correction designation signal is output. In response to the correction designation signal, the corrected gain of the internal model is calculated by the quick response characteristic model gain correcting section to restore the quick response characteristic of control. The corrected gain is output to the internal model storage section, thereby correcting the gain of the internal model.

When an idle time error is estimated by the idle time error estimating section, and a correction designation signal is output from the settlement determining section, an idle time of the internal model is calculated by the idle time correcting section on the basis of the idle time error. The calculated idle time is output to the internal model storage section, thereby correcting the idle time of the internal model.

BRIEF DESCRIPTION OF THE DRAWINGS

FIGS. 6A and 6B are graphs showing the change rates of controlled variable and reference controlled variable;

FIG. 16 is a graph showing the command tracking characteristic of the controller shown in FIG. 1;

FIG. 17 is a graph showing the command tracking characteristic of the conventional IMC controller;

FIGS. 20A and 20B are graphs showing the fluctuated states of the controlled variable;

FIG. 31 is a graph showing the command tracking characteristic of the controller shown in FIG. 30;

FIG. 32 is a graph showing the command tracking characteristic of the controller shown in FIG. 4;

FIG. 33 is a graph showing the command tracking characteristic of the controller shown in FIG. 30;

FIG. 34 is a graph showing the command tracking characteristic of the controller shown in FIG. 4;

DESCRIPTION OF THE PREFERRED EMBODIMENTS

Figure 1:
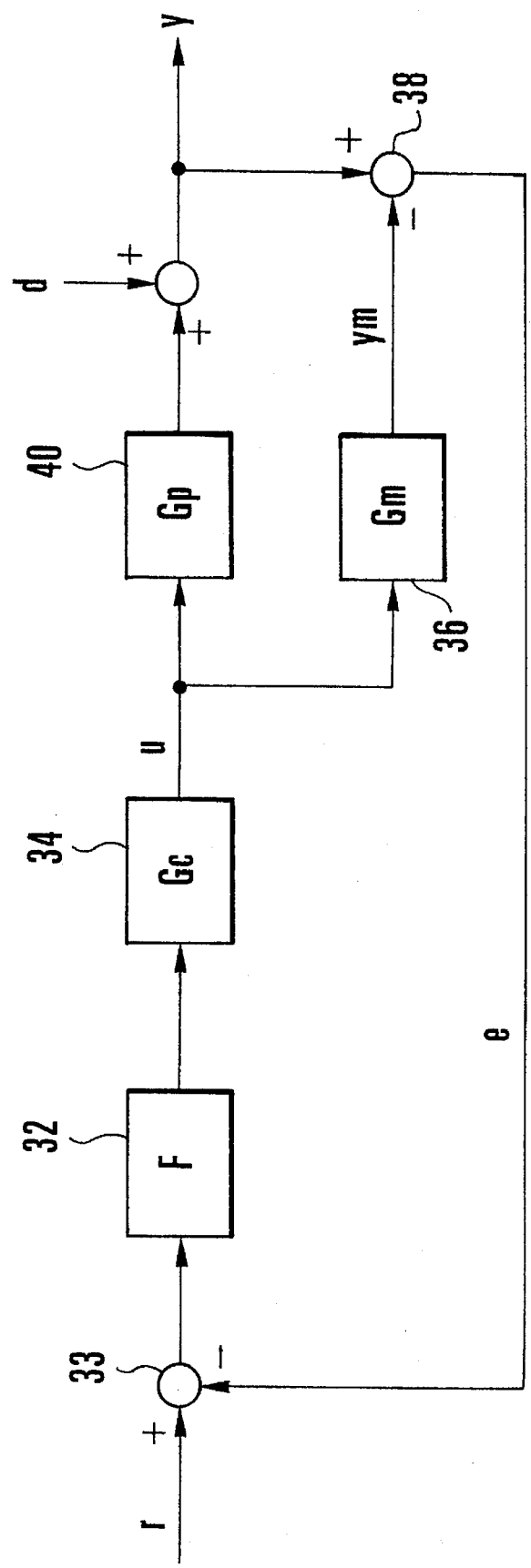
FIG. 1 is a block diagram showing a control system using a conventional IMC controller.
Figure 2:
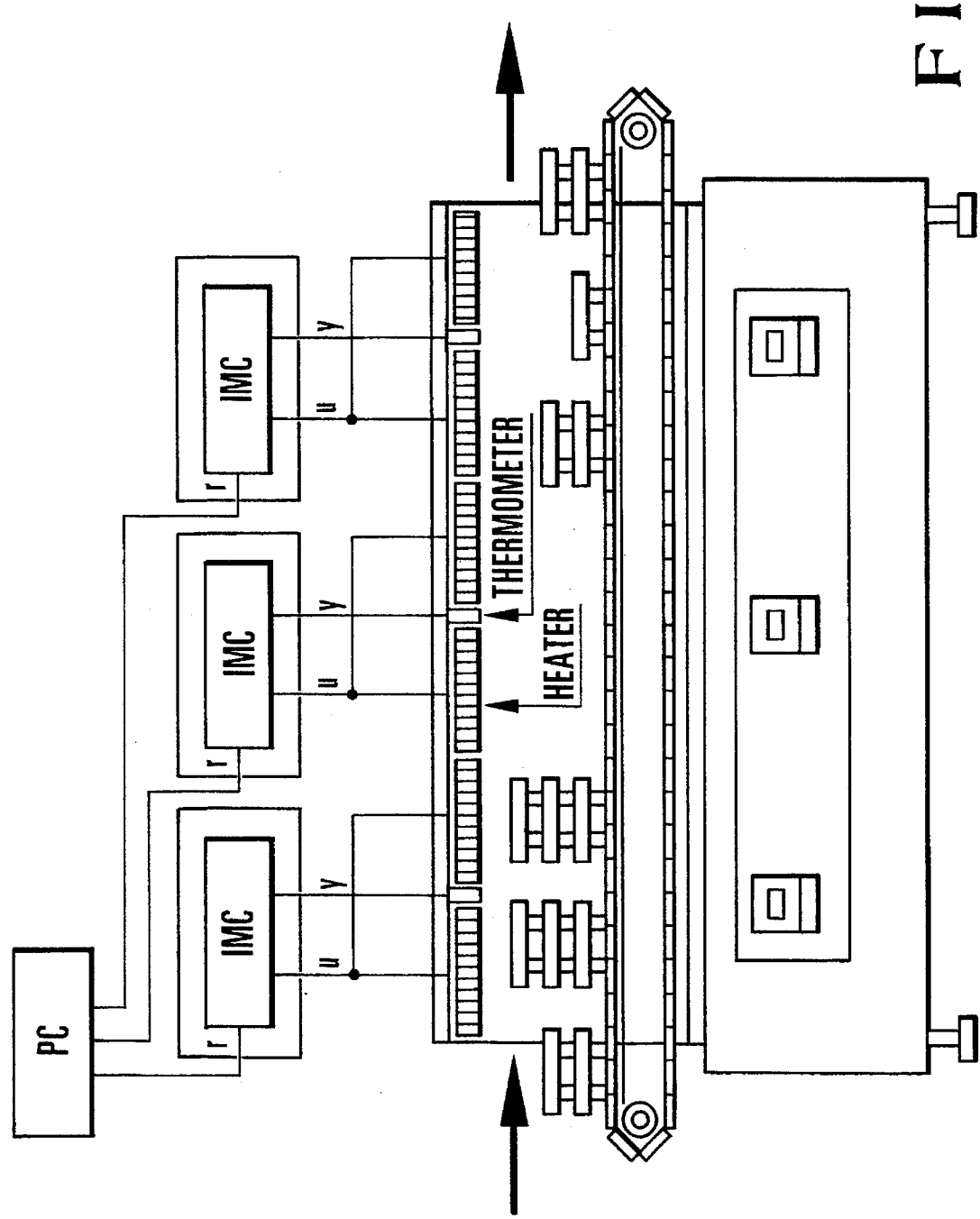
FIG. 2 is a view showing an industrial electric furnace in which temperature control is performed by using the conventional IMC controller (Internal Model Controller)
Figure 3:
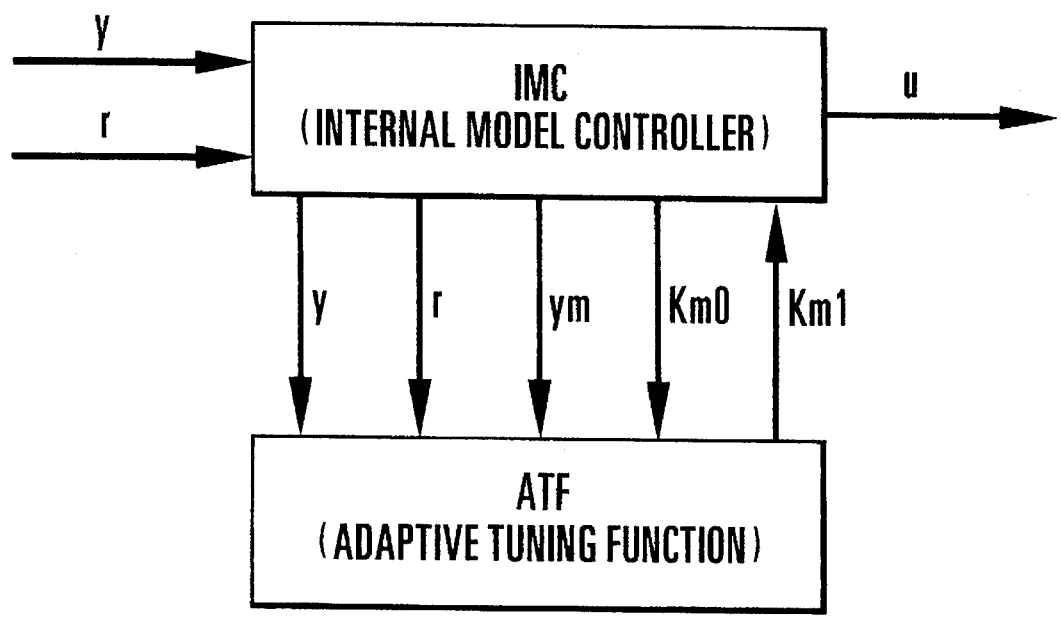
FIG. 3 is a block diagram showing the basic arrangement of the present invention.
Figure 4:
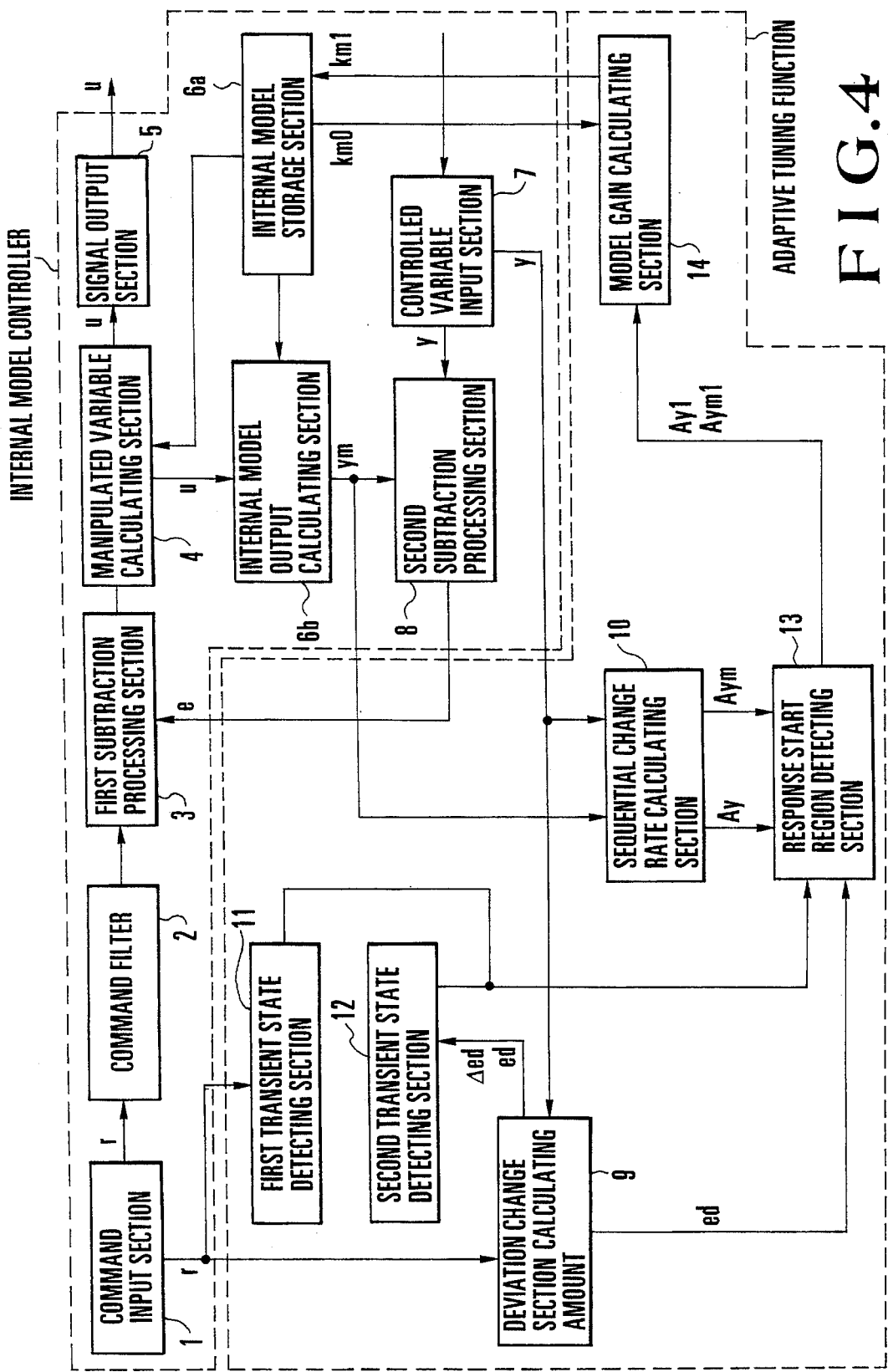
FIG. 4 is a block diagram showing a controller having an IMC structure according to an embodiment of the present invention.
Figure 5:
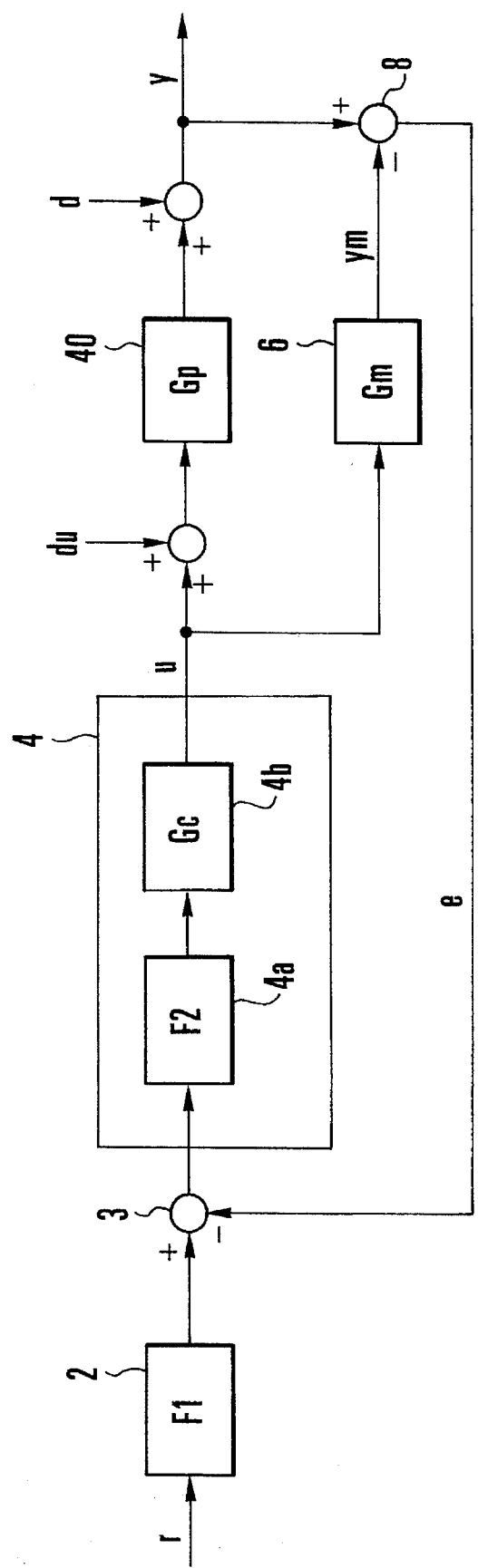
FIG. 5 is a block diagram showing a control system using the controller having the IMC structure shown in FIG. 4.

FIG. 3 shows the basic arrangement of the present invention. FIG. 4 shows a controller having an IMC structure according to an embodiment of the present invention. FIG. 5 shows a control system using this controller having the IMC structure.

Referring to FIG. 4, reference numeral 1 denotes a command input section for inputting a command r, set by an operator (not shown), to the controller; 2, a command filter, having a 1st-order delay transfer function characteristic, for transferring the command r from the command input section 1 upon reducing an abrupt change in the command r; 3, a first subtraction processing section for subtracting a feedback amount e on the basis of an output from the command filter 2; 4, a manipulated variable calculating section for calculating a manipulated variable u on the basis of an output from the first subtraction processing section 3 on the basis of parameters from an internal model storage section (to be described later); and 5, a signal output section for outputting the manipulated variable u, output from the manipulated variable calculating section 4, to a controlled system process (not shown in FIG. 4).

Reference numeral 6a denotes an internal model storage section for storing the parameters of the internal model of the controller; 6b, an internal model output calculating section for performing calculation for the internal model on the basis of the parameters output from the internal model storage section 6a and outputting a reference controlled variable ym; 7, a controlled variable input section for inputting a controlled variable y from the controlled system process to the controller; and 8, a second substraction processing section for subtracting the reference controlled variable ym, output from the internal model output calculating section 6b, from the controlled variable y output from the controlled variable input section 7 and outputting the feedback amount e.

Reference numeral 9 denotes a deviation change amount calculating section for calculating a deviation as the difference between the command r and the controlled variable y and a deviation change amount; 10, a sequential change rate calculating section for calculating the change rates of the controlled variable y and the reference controlled variable ym; 11, a first transient state detecting section for outputting a transient state detection signal upon detecting a transient state of control caused by a change in command; and 12, a second transient state detecting section for outputting a transient state detection signal upon detecting a transient state of control due to a factor other than a change in command.

Reference numeral 13 denotes a response start region detecting section; and 14, a model gain calculating section. When a transient state detection signal is output, the response start region detecting section 13 detects a response start region where a control response corresponding to the transient state begins to appear in the controlled variable y and the reference controlled variable ym, and determines the change rates of the controlled variable y and the reference controlled variable in the response start region. The model gain calculating section 14 calculates the corrected gain of the internal model from the change rates of the controlled variable y and the reference controlled variable ym in the response start region, and changes the gain stored in the internal model storage section 6a to the corrected gain.

The IMC block in FIG. 3 corresponds to blocks 1, 2, 3, 4, 5, 6a, 6b, 7, and 8 in FIG. 4. The adaptive tuning function block in FIG. 3 corresponds to the remaining blocks in the FIG. 4.

Referring to FIG. 5, reference numeral 4a denotes a command/disturbance filter section, arranged in the manipulated variable calculating section 4 and having a 1-order delay transfer function characteristic, for transferring an output from the first subtraction processing section 3 upon reducing an abrupt change in output; 4b, a manipulating section, arranged in the manipulated variable calculating section 4, for calculating the manipulated variable u on the basis of an output from the command/disturbance filter section 4a; and 6, an internal model consisting of an internal model storage section 6a and an internal model output calculating section 6b. Reference symbol F1 denotes the transfer function of the command filter 2; and F2, the transfer function of the command/disturbance filter section 4a.

Reference symbol du denotes a manipulated variable disturbance which can be treated as a value equivalent to a disturbance d by setting d=Gp×du.

Note that FIG. 5 shows a control system obtained by adding the controlled system process 40, the disturbance d, and the manipulated variable disturbance du to the basic arrangement of the controller having the IMC structure shown in FIG. 4 which is constituted by the command filter 2, the first subtraction processing section 3, the manipulated variable calculating section 4, the internal model storage section 6a, the internal model output calculating section 6b, and the second substraction processing section 8.

The operation of the basic arrangement of this controller will be described next.

For example, the command r is set by the operator of this controller. The command r is then input to the command filter 2 through the command input section 1. The command filter 2 outputs the command r with the characteristic of the transfer function F1 given by $$F1=1/(1+T1 \times s) \tag{3}$$

where T1 is the time constant.

In this case, if, for example, the command r abruptly changes from 0.0 to 100.0, a change in the signal transferred through this transfer function characteristic is exponentially and gradually brought close to 100.0. In addition, the rate of this change is reduced such that it takes a time T1 for the command r to change from 0.0 to 63.2.

The time constant T1 is set according to the following equation in accordance with a change in an idle time Lm of the internal model 6 (to be described later), except for the initial value set in advance.

$$T1 = 4 \times \alpha \times Lm \tag{4}$$

where $\alpha$ is the proportional constant (e.g., $\alpha$=0.318, which is experimentally determined with reference to a CHR method (Chien Hrones Reswick method) as an adjustment method for ID control).

The first subtraction processing section 3 subtracts the feedback amount e, output from the second substraction processing section 8, from an output from the command filter 2.

The command/disturbance filter section 4a in the manipulated variable calculating section 4 outputs an output from the first subtraction processing section 3 with the characteristic of the transfer function F2 given by $$F2=1/(1+T2 \times s) \tag{5}$$

where T2 is the time constant.

Similar to the time constant T1 of the command filter 2, the time constant T2 is set according to the following equation in accordance with a chance in the idle time Lm, except for the initial value set in advance.

$$T2 = \alpha \times Lm \tag{6}$$

That is, the time constant T1 is set, as a standard value, to be four times the time constant T2. This setting is experimentally determined. More specifically, a change in the command r passing through a command filter is generally abrupt, whereas a change in an output from the first subtraction processing section 3 which passes through the command/disturbance filter is not so abrupt as a change in the command r. For this reason, the above setting is determined so as not to excessively reduce the rate of change in signal value.

The manipulating section 4b in the manipulated variable calculating section 4 also calculates the manipulated variable u on the basis of an output from the command/disturbance filter section 4a. However, a transfer function Gc of the manipulating section 4b is given by the following equation on the basis of the gain and time constant of the internal model 6, output from the internal model storage section 6a. Similar to the case shown in equation (36), the transfer function Gc must be the reciprocal of a transfer function Gm of the internal model 6 from which a factor associated with the idle time Lm is excluded.

$$Gc=(1+Tm \times s)/Km \tag{7}$$

where Km and Tm are the gain and time constant of the internal model 6, respectively.

Therefore, the transfer function of the overall manipulated variable calculating section 4 is given by $$F2 \times Gc = (1 + Tm \times s)/\{Km \times (1 + T2 \times s)\} \quad (8)$$

In this manner, the manipulated variable u is calculated on the basis of the output from the first subtraction processing section 3 and output to the controlled system process 40 via the signal output section 5. The manipulated variable u is also output to the internal model output calculating section 6b.

A transfer function Gp of the controlled system process 40 can be expressed by the following approximate transfer function having factors associated with a 1st-order delay and an idle time:

$$Gp = K \times \exp(-L \times s)/(1 + T \times s) \quad (9)$$

where K, L, T are the gain, idle time, and time constant of the controlled system process 40, respectively.

The internal model 6 is a mathematical expression of the controlled system process 40 using the parameters stored in the internal model storage section 6a, i.e., the gain Km, the time constant Tm, and the idle time Lm. The reference controlled variable ym is calculated by the internal model output calculating section 6b on the basis of the manipulated variable u output from the manipulated variable calculating section 4. The transfer function Gm of the internal model 6 is given by $$Gm = Km \times \exp(-Lm \times s)/(1 + Tm \times s) \quad (10)$$

The second substraction processing section 8 subtracts the reference controlled variable ym, supplied from the internal model output calculating section 6b, from the controlled variable y supplied from the controlled system process 40 via the controlled variable input section 7, and outputs the feedback amount e. This feedback amount e is input to the first subtraction processing section 3, as described above.

The above description is associated with the operation of the feedback control system as the basic arrangement of the controller having the IMC structure.

In this control system, the deviation change amount calculating section 9 calculates a deviation as the difference between the command r and the controlled variable y and the change amount of this deviation at a control period in the following manner. First of all, the deviation change amount calculating section 9 reduces the noise of the controlled variable y output from the controlled variable input section 7 by performing a damping process represented by the following equation with respect to the controlled variable y.

$$yd(i) = \{y(i) + Td \times yd(i-1)\}/(1 + Td) \quad (11)$$

where yd(i) is the controlled variable y obtained after the damping process at sampling time i in the control system, y(i) is the controlled variable y at sampling time i, and Td is the damping time constant (e.g., Td=2 sec if a control period At as a sampling period is 1 sec).

The noise of the controlled variable y can be reduced by performing a damping process corresponding to a low-pass filter in this manner. However, the noise of this controlled variable y includes measurement noise caused by a sensor (not shown) for measuring the controlled variable controlled variable y and outputting it to the controlled variable input section 7. If the measurement noise is close to 0, a damping process need not be performed, considering the damping time constant Td=0 sec.

Subsequently, the deviation change amount calculating section 9 calculates a deviation (although this deviation is a damped deviation which has undergone a damping process, the damped deviation will be simply referred to as a deviation hereinafter) at the control period.

$$ed(i) = r(i) - yd(i) \quad (12)$$

where ed(i) and r(i) are the deviation and the command at current sampling time i.

The deviation change amount calculating section 9 also calculates a change amount $\Delta ed(i)$ as the difference between the deviation ed(i) at current sampling time i and a deviation ed(i−1) at the sampling time immediately before sampling time according to the following equation:

$$\Delta ed(i) = |ed(i)| - |ed(i-1)| \quad (13)$$

The deviation change amount calculating section 9 outputs the calculated deviation ed(i) to the second transient state detecting section 12 and the response start region detecting section 13, and the change amount $\Delta ed(i)$ to the second transient state detecting section 12.

The sequential change rate calculating section 10 calculates the change rate of the controlled variable y output from the controlled variable input section 7 and the change rate of the reference controlled variable ym output from the internal model output calculating section 6b at the control period.

FIG. 6A shows the change rate of the controlled variable y to explain the operation of the sequential change rate calculating section 10. FIG. 6B shows the change rate of the reference controlled variable ym. Referring to FIGS. 6A and 6B, "i−n+1", "i−1", and "i" respectively indicate sampling times, and each mark "o" indicates the controlled variable y and the reference controlled variable ym at each time.

As shown in FIG. 6A, the sequential change rate calculating section 10 analyzes controlled variables y(i−n+1) to y(i) corresponding to n past sampling operations including the sampling operation at current time i by the least squares method, and calculates a controlled variable change rate Ay(i) at the control period. In this case, an integer set value n is set as n=5.

Similarly, as shown in FIG. 6B, the sequential change rate calculating section 10 analyzes reference controlled variables ym(i−n+1) to ym(i) corresponding to n past sampling operations including the sampling operation at current time i by the least squares method, and calculates a controlled variable change rate Aym(i) at the control period.

Subsequently, the sequential change rate calculating section 10 outputs the calculated the controlled variable change rate Ay(i) and reference controlled variable change rate Aym(i) to the response start region detecting section 13.

The first and second transient state detecting sections 11 and 12 detect a transient state of control, in which the controlled variable y approaches the command r by a control response after the controlled variable y greatly differs from the command r, in the following manner.

A main factor for a transient state of control is a change in the command r caused when a new command r is input to the command input section 1 by the operator of this controller (such a transient state caused by a change in command will be referred to as the first transient state hereinafter).

Other factors are occurrence of the disturbance d or the manipulated variable disturbance du, an abrupt change in a gain K of the controlled system process 40, and self-fluctuations which occur such that fluctuations in the controlled variable y are gradually amplified by improper control (a transient state caused by these factors such as a disturbance will be referred to as the second transient state hereinafter).

The first transient state detecting section 11 determines whether control is in the first transient state. The second transient state detecting section 12 determines whether control is in the second transient state.

Figure 7A:
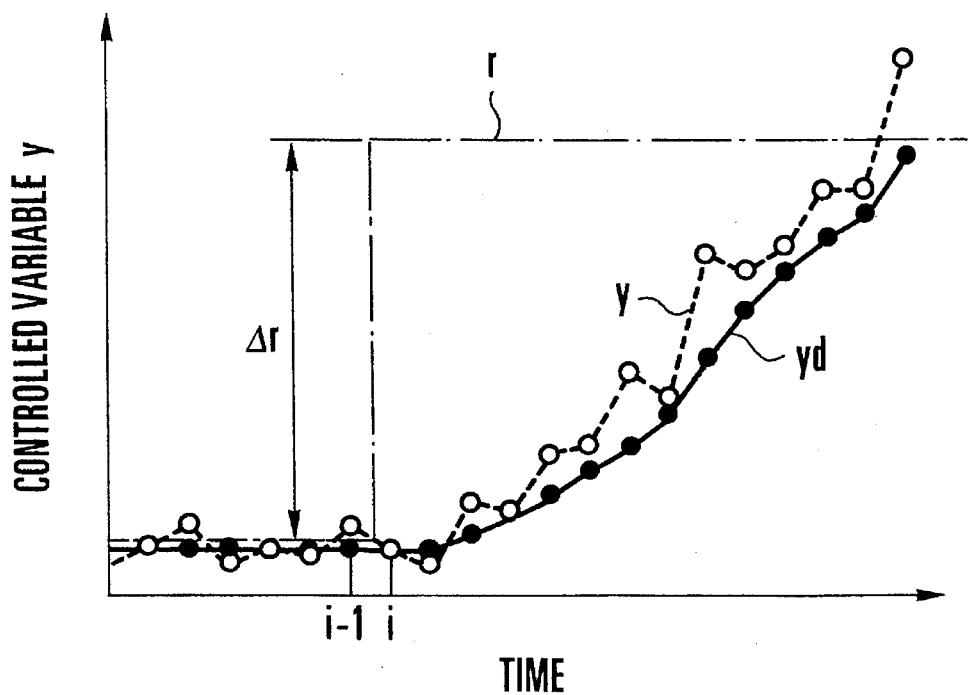
FIGS. 7A and 7B are graphs showing the transient states of the controlled variable.
Figure 7B:
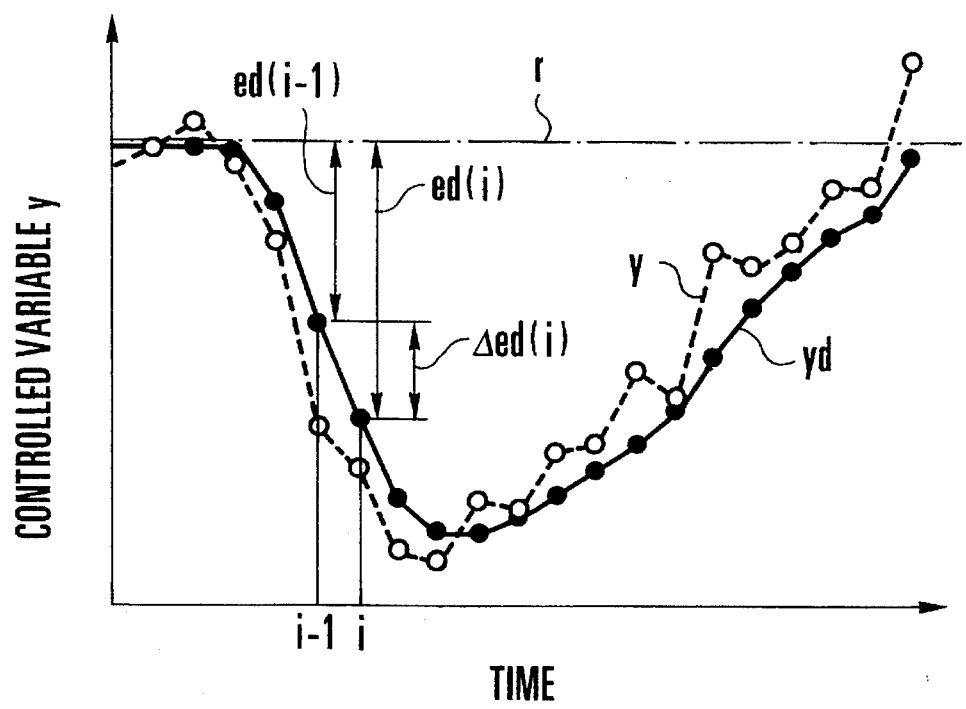

FIG. 7A shows a transient state of the controlled variable y to explain the operation of the first transient state detecting section 11. FIG. 7B shows a transient state of the controlled variable y to explain the operation of the second transient state detecting section 12.

FIG. 7A shows a state wherein as the command r changes, the manipulated variable calculating section 4 outputs the manipulated variable u corresponding to the change in the command r, and the controlled variable y begins to change toward the command r. FIG. 7B shows a state wherein as the controlled variable y is abruptly decreased by a factor such as a disturbance, the manipulated variable calculating section 4 outputs the manipulated variable u corresponding to the change in the controlled variable y, and the controlled variable y begins to increase and return to the command r.

A transient state caused by a change in command can be detected as follows. The change amount of the command r is calculated at a control cycle. When the change amount exceeds a predetermined value, it can be determined that control is shifted from a settled state to a transient state. In general, in controlling the temperature in a furnace by a heater, when a command changes by at least 5%, it should be determined that a transient state is set. In many control systems other than a control system for controlling the temperature in a furnace, it is proper that about 5% of a command be set as a criterion. Therefore, the first transient state detecting section 11 determines, according to the following mathematical expression, whether control is in the first transient state. Upon determining the first transient state, the first transient state detecting section 11 outputs a transient state detection signal to the response start region detecting section 13.

$$|\Delta r(i)|=|r(i)-r(i-1)|>\Theta \tag{14}$$

where $\Delta r(i)$ is the command change amount at current sampling time i, as shown in FIG. 7A, and 8 is the command input detection reference value, which is set to be, for example, 5% of the full range of the controlled variable y.

That is, the first transient state detecting section 11 determines that control is set in the first transient state caused by a change in command, if the command change amount $\Delta r(i)$ is larger than the command input detection reference value $\Theta$.

Changes in the command r include an abrupt change like a step input and a gradual change like a ramp input. Since a ramp input is not subjected to gain correction, the command input detection reference value $\Theta$ is set to discriminate these inputs.

A transient state caused by a disturbance can be detected by detecting a case wherein the deviation exceeds a predetermined value owing to the disturbance. Note, however, that if a control operation insufficiently follows a gradual change in command or a gradual change in a characteristic of the controlled system itself, the deviation may increase. In order to discriminate the above deviation from such a gradual deviation, the change rate of deviation may be evaluated. With this operation, detection of a transient state caused by a disturbance can be reliably realized. In general, in controlling the temperature in a furnace by a heater, if at least a deviation of 5% occurs, it should be determined that control is affected by a disturbance. A criterion for a deviation change rate should be determined on the basis of a time constant set when the controlled system process is approximated to a 1-order delay. If a disturbance is applied like a step disturbance, a transient state is sure to occur owing to the disturbance. According to experiments, of deviation change rates detected in a 1-order delay step response, a deviation change rate detected after the lapse of a time at least 4.8 times the time constant is a criterion for a transient state. That is, if this deviation change rate as a criterion is detected in the process of generating a deviation of 5%, a transient state should be determined. Therefore, the second transient state detecting section 12 determines, according to the following inequalities, whether control is in the second transient state. Upon determining the second transient state, the second transient state detecting section 12 outputs a transient state detection signal to the response start region detecting section 13.

$$|\Delta ed(i)|>\epsilon\exp(-4.8)\times\Delta t \tag{15}$$

$$|ed(i)|>\epsilon \tag{16}$$

where $\epsilon$ is the settlement determination reference value, which is set to be, for example, 5% of the full range of the controlled variable y.

That is, if both inequalities (15) and (16) are satisfied, the second transient state detecting section 12 determines that control is set in the second transient state caused by a disturbance or the like.

In the second transient state caused by a factor such as a disturbance, before the controlled variable y changes toward the command r, an abrupt change in the controlled variable y occurs in the opposite direction to the command r. Therefore, a change in command is subtracted from a change in the controlled variable y. Inequality (16) is set to prevent erroneous detection due to the noise of the controlled variable y.

When a transient state detection signal is output from the first or second transient state detecting section 11 or 12, the response start region detecting section 13 starts operating to detect the response start regions of the controlled variable y and the reference controlled variable ym.

These response start regions are present in transient states. In the response start regions, control responses begin to appear in the controlled variable y and the reference controlled variable ym when the manipulated variable u corresponding to a change in command or an error correction is output from the manipulated variable calculating section 4.

In detecting a response start region, the response start region detecting section 13 obtains a maximum transient deviation Emax as follows.

Figure 8A:
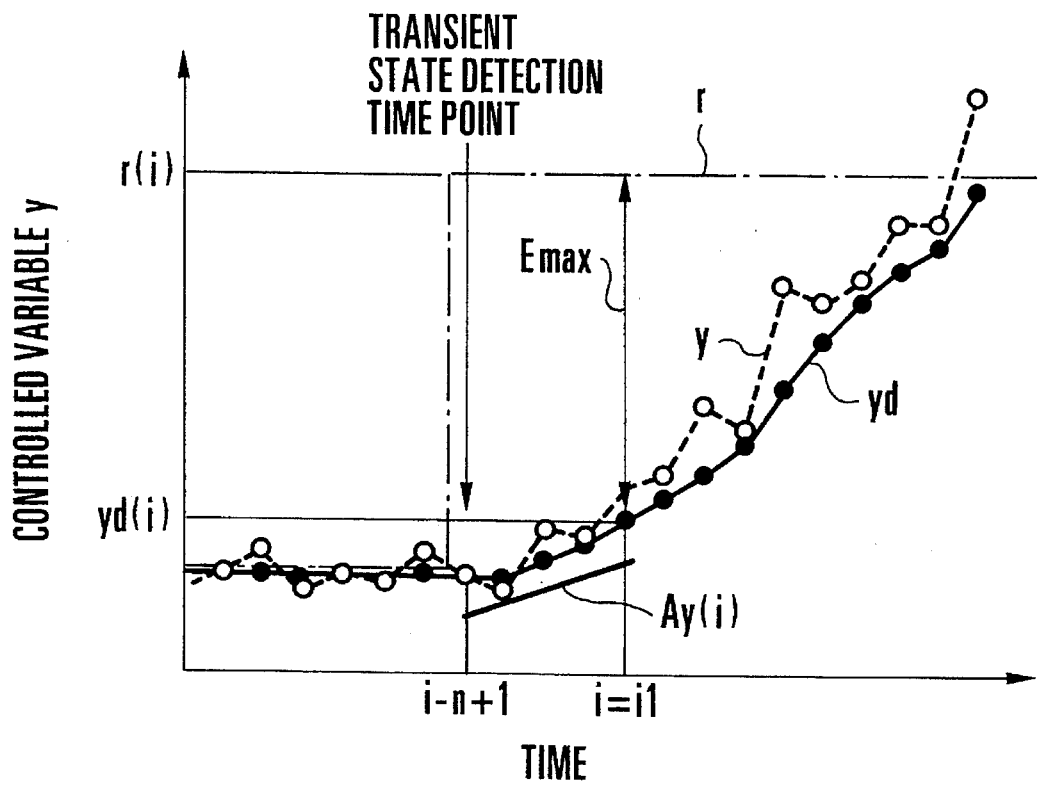
FIGS. 8A and 8B are graphs showing the transient states of the controlled variable.
Figure 8B:
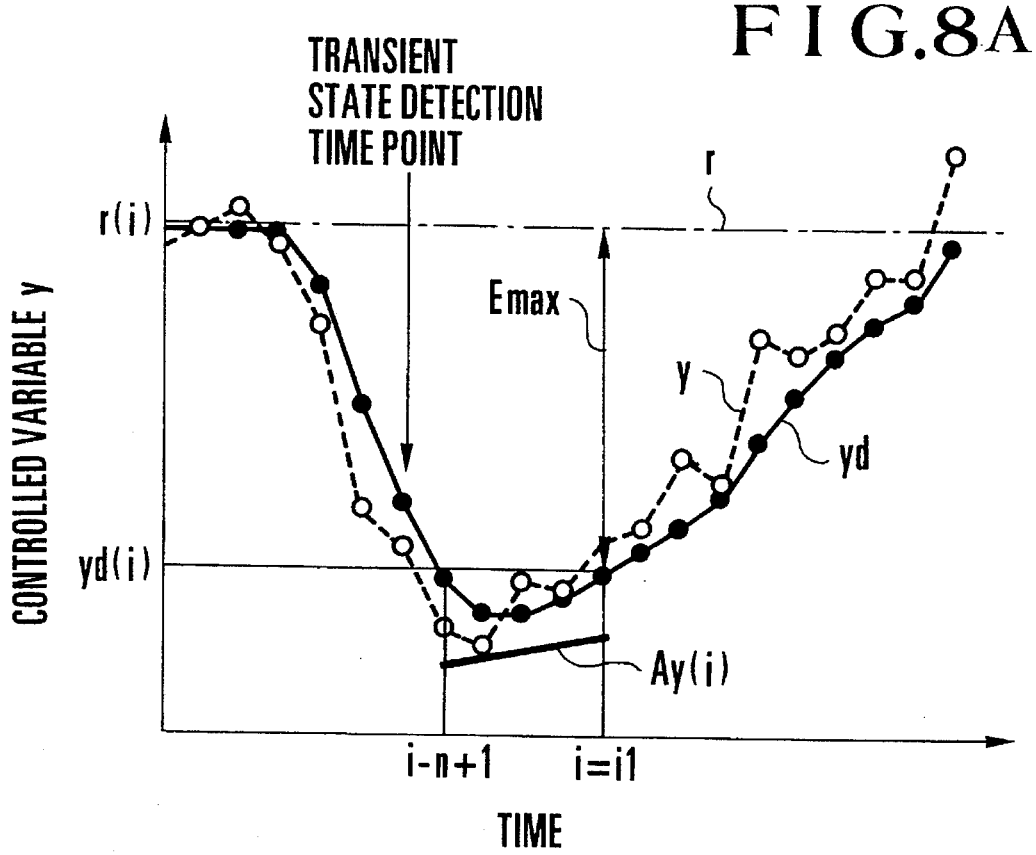
Figure 9A:
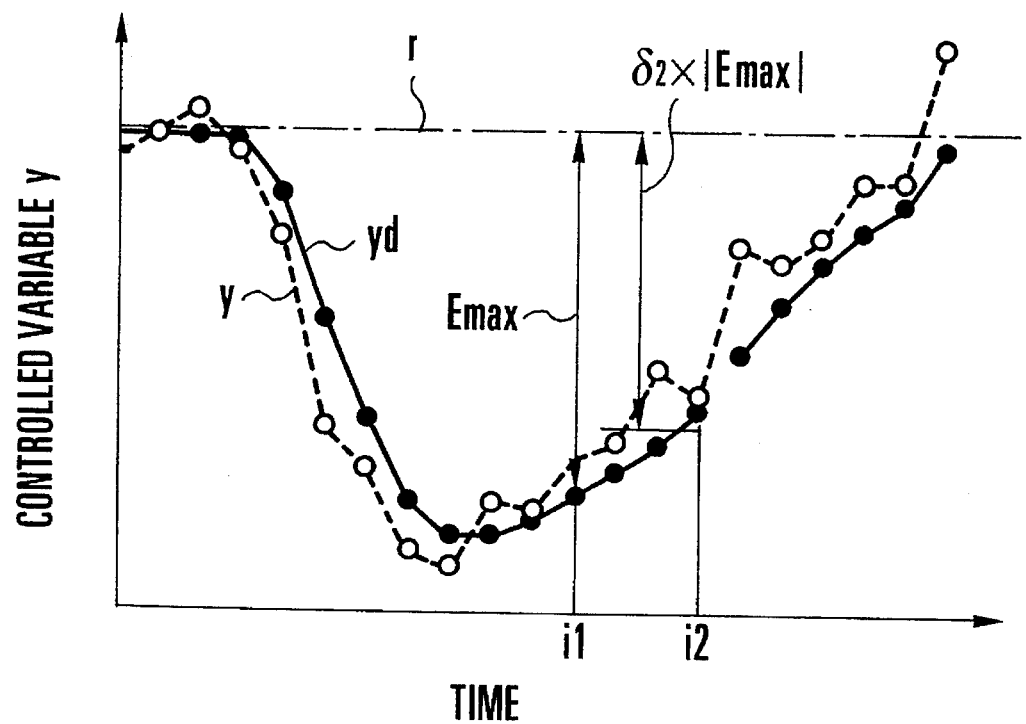
FIGS. 9A and 9B are graphs showing the transient states of the controlled variable and the reference controlled variable.
Figure 9B:
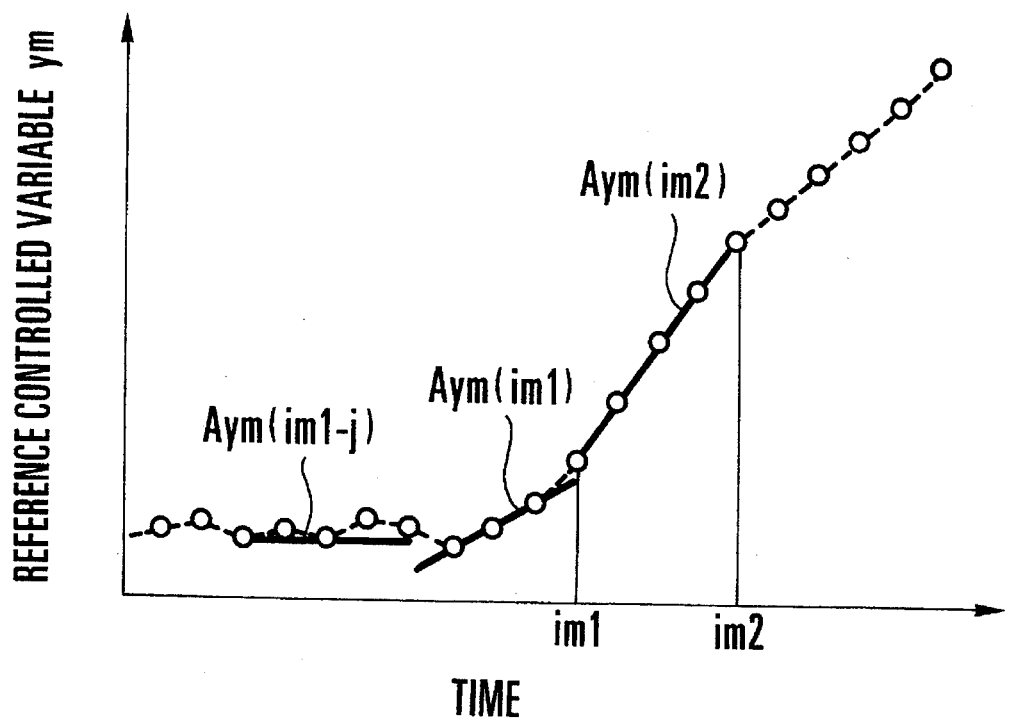

Each of FIGS. 8A and 8B shows a transient state of the controlled variable y to explain the operation of the response start region detecting section 13 for obtaining the maximum transient deviation Emax. FIG. 9A shows a transient state of the controlled variable y to explain the operation of the response start region detecting section 13 for detecting a response start region. FIG. 9B shows a transient state of the reference controlled variable ym. FIGS. 8A and 8B respectively show the first and second transient states.

The response start region detecting section 13 uses the current deviation ed(i), as the maximum transient deviation Emax, which is obtained when the product of the deviation ed(i) output from the deviation change amount calculating section 9 and the controlled variable change rate Ay(i) output from the sequential change rate calculating section 10 becomes a positive value.

$$ed(i)\times Ay(i)>0 \tag{17}$$

As shown in FIGS. 8A and 8B, the maximum transient deviation Emax is a deviation obtained when the controlled variable y begins to change toward the command r by a control response operation after a transient state of control is detected by the first or second transient state detecting section 11 or 12, and is the maximum deviation in the time interval between the instant at which a transient state is detected and the instant at which gain correction (to be described later) is performed.

As shown in FIGS. 8A and 8B, the sampling time i at which the maximum transient deviation Emax is detected is set as a start time point i1 of the response start region of the controlled variable y.

A cause for a change in the reference controlled variable ym is a change in the deviation between the command r and the controlled variable y. When the controlled variable y finally shifts from a transient state to a settled state, the controlled variable y changes in a direction to coincide with the command r. Therefore, a response start region can be detected on the basis of the maximum deviation. However, a finally settled value in a case wherein the reference controlled variable ym reaches a settled state cannot be specified when a transient state is detected. For this reason, a change in the change rate of the reference controlled variable ym is an important clue. Since the internal model for calculating the reference controlled variable ym is a 1-order delay model, a time point at which the change rate of the reference controlled variable ym changes from a small value to a large value appears without fail when a response starts upon occurrence of a transient state. In general, when a change in the change rate of the reference controlled variable ym is monitored at intervals corresponding to five sampling operations, it is found that the change rate of the reference controlled variable ym changes to a large value at least twice or more the previous value when a response starts. For this reason, the response start region detecting section 13 sets the sampling time i detected by the following inequality as the start time point im1 of the response start region of the reference controlled variable ym after a transient state detection signal is output from the first or second transient state detecting section 11 or 12.

$$Aym(i)/Aym(i-j) > \delta 1 \quad (18)$$

In this case, an integer set value j and a start region detection reference value $\delta 1$ are respectively set as j=5 and $\delta 1$=2.

As shown in FIG. 9B, the start time point im1 of the response start region of the reference controlled variable ym is time i ("im1" in FIG. 9B) at which the ratio between a reference controlled variable change rate Aym (i-j) sampled at the time j sampling operations before sampling time i and the reference controlled variable change rate Aym(i) sampled at sampling time i exceeds the value $\delta 1$ as a threshold value.

Subsequently, sampling time i detected by the following inequality after detection of the start time point i1 is set as an end time point i2 of the response start region of the controlled variable y.

$$|ed(i)| \leq \delta 2 \times |Emax| \quad (19)$$

In this case, a start region detection reference value $\delta 2$ is set as $\delta 2$=0.8.

The end time point of the response start region of the reference controlled variable ym must coincide with the end time point of the response start region of the controlled variable y. Since the reference controlled variable ym is calculated by the 1-order delay internal model, the pattern of change in the change rate of the reference controlled variable ym regularly corresponds to the respective elapsed time points of the process of reaching a final settled value. That is, the end time point of the response start region of the reference controlled variable ym corresponding to the end time point of the response start region of the controlled variable y can be detected from the pattern of change in the change amount of the reference controlled variable ym. According to experiments, it is proper that a criterion for the reference controlled variable ym corresponding to a case wherein a criterion at the end time point of the response start region of the controlled variable y is set as $\delta 2$=0.8 be set at a time point at which the ratio between the change rate of the reference controlled variable ym at the current time point and the change rate of the reference controlled variable ym at the time one sampling operation before the current time point exceeds 0.85. Therefore, time i–1 one sampling operation before the current time, which is detected by the following inequality after detection of the start time pint im1, is set as an end time point im2 of the response start region of the reference controlled variable ym.

$$Aym(i-1)/Aym(i) > \delta 3 \quad (20)$$

The start region detection reference value $\delta 3$ is set as, for example, $\delta 3$=0.85.

That is, the end time point im2 of the response start region of the reference controlled variable ym is time i–1 at which the ratio between the reference controlled variable change rate Aym(i–1) at the time one sampling operation before the current time point and the reference controlled variable change rate Aym(i) at the current time point exceeds the value $\delta 3$ as a threshold value.

The response start region detecting section 13 sets a controlled variable change rate Ay(i2) at the end time point i2, of the response start region of the controlled variable y, detected in this manner, as Ay1; and a reference controlled variable change amount Aym(im2) at the end time point im2, as Aym1. The response start region detecting section 13 outputs these controlled variable change rates Ay1 and Aym1 to the model gain calculating section 14.

The model gain is corrected such that the change rate of the controlled variable y becomes equal to the change rate of the reference controlled variable ym. From the viewpoint of a control theory, however, control becomes more stable as the change rate of the reference controlled variable ym becomes larger than the change rate of the controlled variable y. It is, therefore, preferable that gain correction be performed safely by assuming a measurement error in the controlled variable y and the like. Consider, for example, general temperature control in the furnace. In this case, it is proper for the change rate of the reference controlled variable ym to have a margin which is about 1.5 times the change rate of the controlled variable y. The model gain calculating section 14 calculates a corrected gain Km1 of the internal model 6 on the basis of the controlled variable change rate Ay1 and the reference controlled variable change rate Aym1 according to the following equation:

$$Km1 = \rho \times Km0 \times |Ay1/Aym1| \quad (21)$$

where Km0 is the gain Km, of the internal model 6, which is currently stored in the internal model storage section 6a, and $\rho$ is the safety coefficient (e.g., $\rho$=1.5).

If the calculated corrected gain Km1 is smaller than the minimum value, as indicated by the following inequality, the model gain calculating section 14 determines that the corrected gain falls outside the safety limit, and limits the corrected gain Km1 within the safety limit.

$$Km1 < Ld \times Km0 \quad (22)$$

Reference symbol Ld denotes a lower proportional constant. In the first transient state caused by a change in command, Ld=0.3. In the second transient state caused by a disturbance or the like, Ld =0.7. When the corrected gain Km1 falls outside the safety limit, the corrected gain Km1 is set as Km1=Ld ×Km0.

When the corrected gain Km1 calculated in the same manner as described above is larger than the maximum value, as indicated by the following inequality, the corrected gain Km1 is limited to fall within the safety limit.

$$Km1 > Lu \times Km0 \quad (23)$$

Reference numeral Lu denotes an upper proportional constant. In the first transient state caused by a change in command, Lu=10. In the second transient state caused by a disturbance or the like, Lu =5. If the corrected gain Km1 falls outside the safety limit, as described above, the corrected gain Km1 is set as Km1=Lu×Km0.

When the corrected gain Km1 calculated in this manner is output to the internal model storage section 6a, the current value of the gain Km0, of the internal model 6, stored in the internal model storage section 6a is updated to the corrected gain Km1. This correction of the gain Km is performed once at the end of a response start region.

In this manner, gain correction is performed at the beginning of a control response to cause the controlled variable y to start approaching the command r. It is important for safety that the error between the internal model 6 and the controlled system process 40 be small at the beginning of a control response including a response start region. For this reason, the gain Km of the internal model 6 is corrected in the above-described manner such that the rate change of the controlled variable y of the controlled system process 40 is brought close to the change rate of the reference controlled variable ym of the internal model 6 in the response start region, as indicated by equation (21).

By using the safety coefficient ρ for calculation of the corrected gain Km1, a safer operation can be realized.

Since the gain Km of the internal model 6 is automatically corrected during a control response operation, proper control can be performed even if a change in the command r or a disturbance or the like occurs in the controller in which the internal model 6 is improperly set.

With regard to a model identification error in the internal model 6, both an error in the gain Km and an error in the time constant Tm can be properly handled. In addition, an error in the idle time Lm can be properly handled within a range of ±30%.

Figure 10:
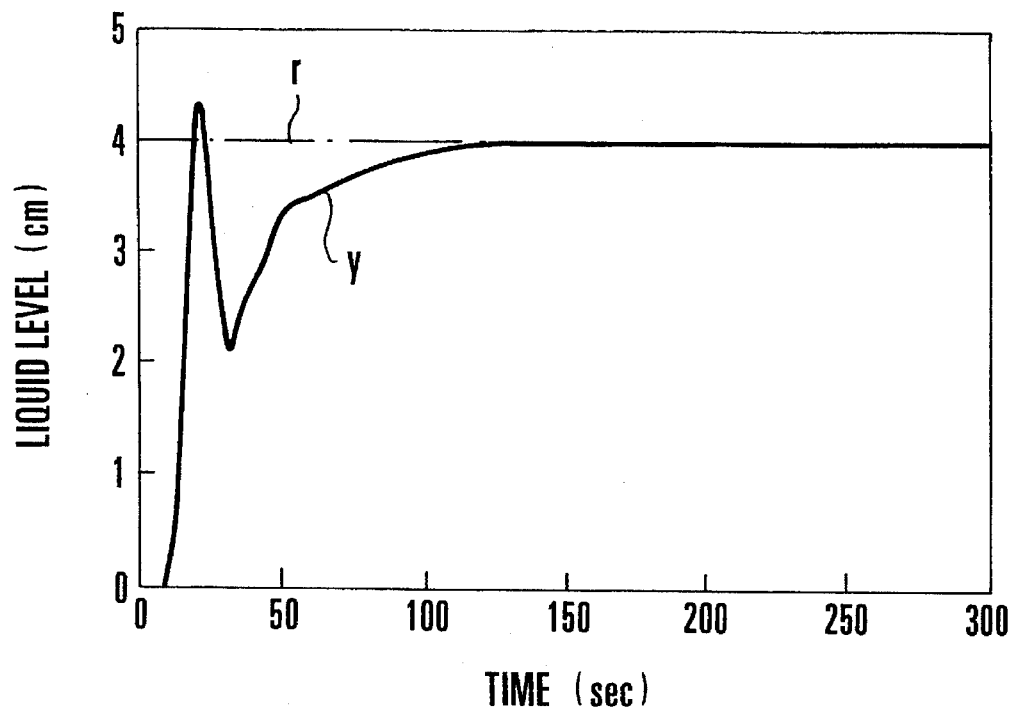
FIG. 10 is a graph showing the command tracking characteristic of the controller shown in FIG. 4.
Figure 11:
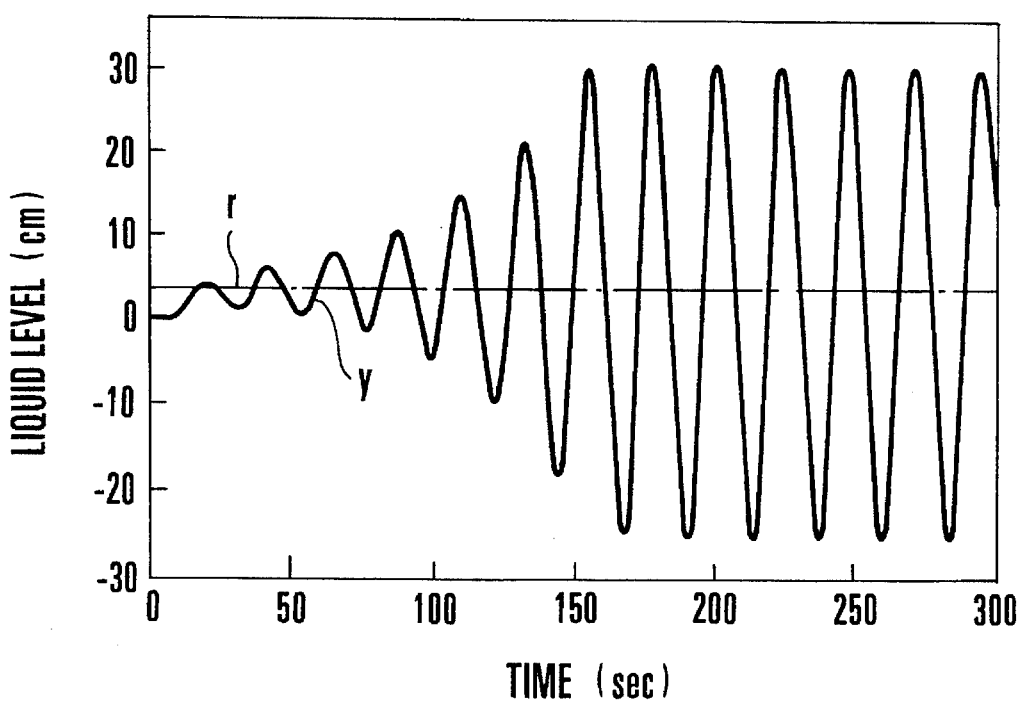
FIG. 11 is a graph showing the command tracking characteristic of the conventional IMC controller.

FIG. 10 shows a command tracking characteristic obtained when the controller of this embodiment is used to control a liquid level in a tank. FIG. 11 shows a command tracking characteristic obtained when a conventional IMC controller is used.

FIGS. 10 and 11 show simulation results, each obtained when a command r is changed from 0 to 4 cm at the time point "0 sec" to obtain a controlled variable y which is a liquid level as a control result.

In the conventional controller, no gain correction is performed unlike the controller of this embodiment, in which the gain Km of the internal model 6 is corrected.

In this case, a gain K of a controlled system process, i.e., a liquid level in the tank, is set to be 10; a time constant T, 10 sec, and an idle time L, 10 sec. In each of the controller of this embodiment and the conventional IMC controller, a gain Km of the internal model 6 is set to be 5; a time constant Tm, 20 sec; and an idle time Lm, 10 sec. Therefore, model identification errors are present in both the gain Km and the time constant Tm.

Assume that in each controller, a time constant T1 of the command filter 2 is set to be 12.72 sec; a time constant T2 of the command/disturbance filter section 4a, 3.18 sec; and a control period Δt, 1 sec.

As is apparent from FIG. 11, in the conventional IMC controller, if a command r is changed when the settings in the internal model are improper, fluctuations occur in the controlled variable y, and the fluctuations cannot be suppressed. The same is true for a general PID controller. In contrast to this, in the controller of this embodiment, the gain Km of the internal model 6 is eventually corrected to 13.854 upon the lapse of 18 sec after a command step input operation, thereby settling control.

Figure 12:
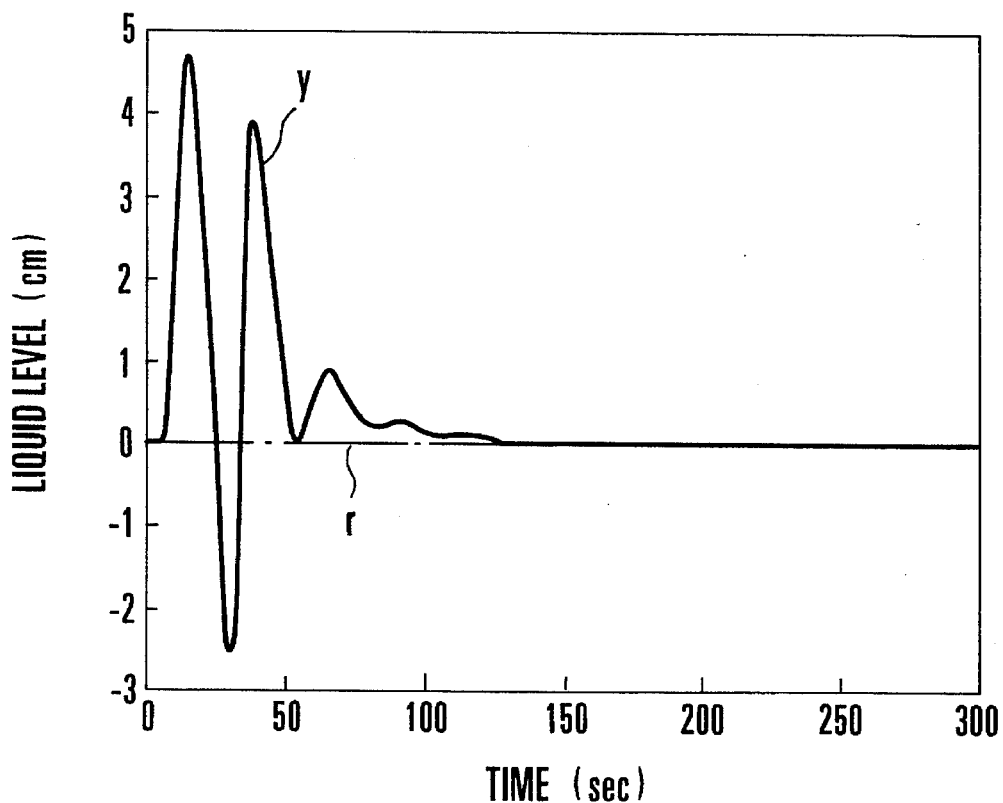
FIG. 12 is a graph showing the command tracking characteristic of the controller shown in FIG. 4.
Figure 13:
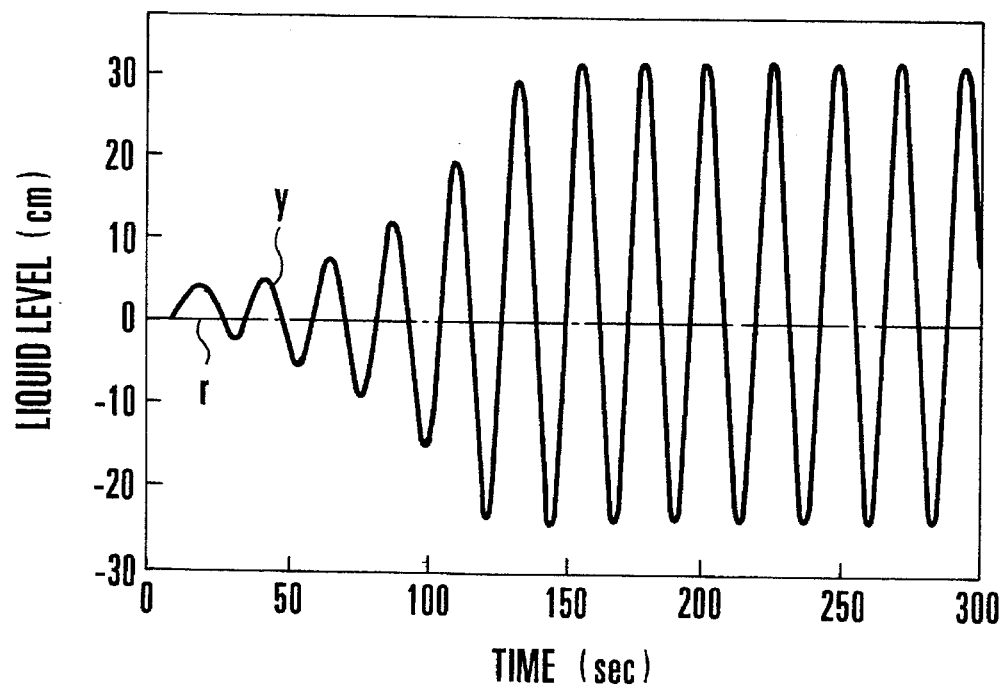
FIG. 13 is a graph showing the command tracking characteristic of the conventional IMC controller.

FIG. 12 shows a command tracking characteristic obtained when the controller of this embodiment is used to control a liquid level in a tank, similar to the case shown in FIG. 10. FIG. 13 shows a command tracking characteristic obtained when the conventional IMC controller is used, similar to the case shown in FIG. 13.

FIGS. 12 and 13 show simulation results, each obtained when the controlled variable y is obtained upon application of a manipulated variable disturbance du caused by, e.g., a valve failure in a settled state in which the controlled variable y is 0 cm. Assume that the same parameters as those in the cases shown in FIGS. 10 and 11 are set.

As is apparent from FIGS. 12 and 13, in the conventional IMC controller, if the disturbance du is applied when the settings in the internal model are improper, an excessive change in the manipulated variable u repeatedly occurs, resulting in a divergent state. In contrast to this, in the controller of this embodiment, the gain Km of the internal model 6 is eventually corrected to 8.884 upon the lapse of 27 sec after a command step input operation, thereby settling control.

Figure 14:
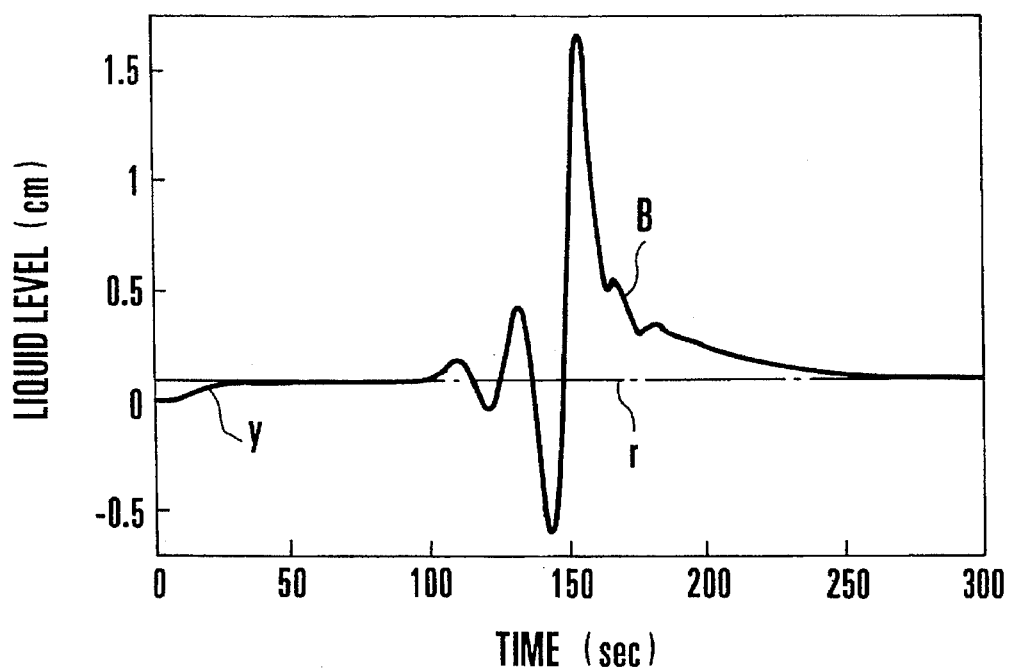
FIG. 14 is a graph showing the command tracking characteristic of the controller shown in FIG. 1.
Figure 15:
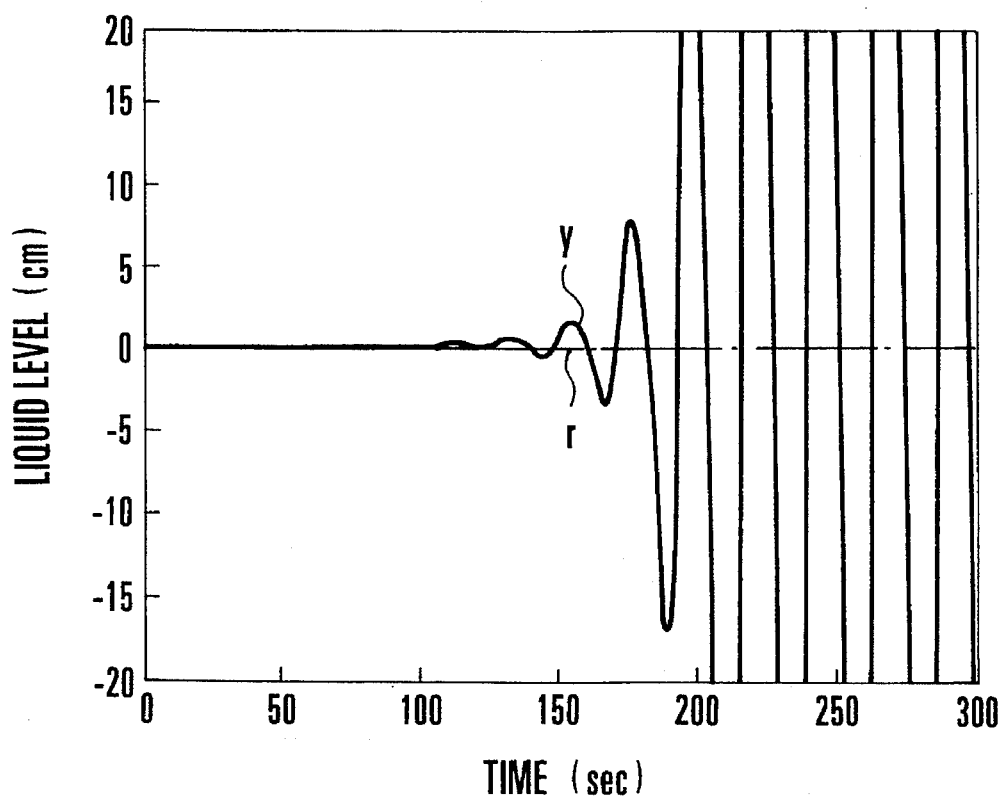
FIG. 15 is a graph showing the command tracking characteristic of the conventional IMC controller.

FIG. 14 shows a command tracking characteristic obtained when the controller of this embodiment is used to control a liquid level in a tank. FIG. 15 shows a command tracking characteristic obtained when the conventional IMC controller is used.

FIGS. 14 and 15 show simulation results, each obtained when a command r of 0.1 cm is input at a time point "0 sec", and the gain K of the controlled system process abruptly changes in the process of this control to obtain the controlled variable y.

Assume that the gain K of the controlled system process is 10 at first, and changes to 30 after the lapse of 100 sec. In each of the controller of this embodiment and the conventional IMC controller, the gain Km of the internal model 6 is set to be 10, and other parameters are set to be the same as those in the cases shown in FIGS. 10 and 11.

As is apparent from FIGS. 14 and 15, in the conventional IMC controller, if the gain K of the controlled system process abruptly changes when the settings in the internal model are improper, an excessive change in manipulated variable repeatedly occurs. As a result, control is set in a divergent state. In contrast to this, in the controller of this embodiment, since the gain Km of the internal model 6 is corrected to 41.919 after the lapse of 149 sec, control is settled.

FIG. 16 shows a command tracking characteristic obtained when the controller of this embodiment is used to control a liquid level in the tank. FIG. 17 shows a command tracking characteristic obtained when the conventional IMC controller is used.

FIGS. 16 and 17 show simulation results, each obtained when self-fluctuations occur such that fluctuations in the controlled variable y are gradually amplified in an unstable control system.

In each of the controller of this embodiment and the conventional IMC controller, the gain Km of the internal model 6 is set to be 2.5, and other parameters are set to be the same as those in the cases shown in FIGS. 10 and 11.

As is apparent from FIGS. 16 and 17, in the conventional IMC controller, an excessive change in manipulated variable repeatedly occurs with respect to a phenomenon of fluctuation which gradually occurs in the unstable control system. In contrast to this, in the controller of this embodiment, since the gain Km of the internal model 6 is corrected to 10.714 after the lapse of 76 sec, control is settled.

According to the embodiment shown in FIG. 4, in the controller in which the settings in the internal model 6 are improper, the gain Km of the internal model 6 is automatically corrected on the basis of the change rate of the controlled variable y and the change rate of the reference controlled variable ym during a control response operation. In this case, from the viewpoint of a control theory, proper countermeasures can be reliably taken against a controller in which a model gain and a model time constant are improperly set. Assume that a controlled system exhibits a process idle time shorter than the process time constant, or a process idle time which is longer than the process time constant but close thereto, as in general temperature control in a furnace. In this case, even if a model idle time is improperly set, proper countermeasures can be reliably taken. Also assume that variations in process gain and process time constant are large, but variations in process idle time are small. In this case, since the user rarely sets an improper model idle time empirically, the embodiment shown in FIG. 4 can satisfactorily handle such a controlled system. In a case other those described above, i.e., a case wherein the process idle time becomes longer than the process time constant, and variations in process idle time are large, it is difficult for the user to properly set a model idle time. In addition, setting of an improper model idle time becomes a factor for insufficient gain correction.

In this case, gain correction must be executed again. In the controller shown in FIG. 4, however, gain correction is not executed again unless, for example, the operator designates re-execution. Consequently, the gain Km of the internal model 6 is kept to be the corrected gain Km1. In order to handle the above case, therefore, processing other than that performed by the controller shown in FIG. 4 is required.

(Second Embodiment)

Figure 18:
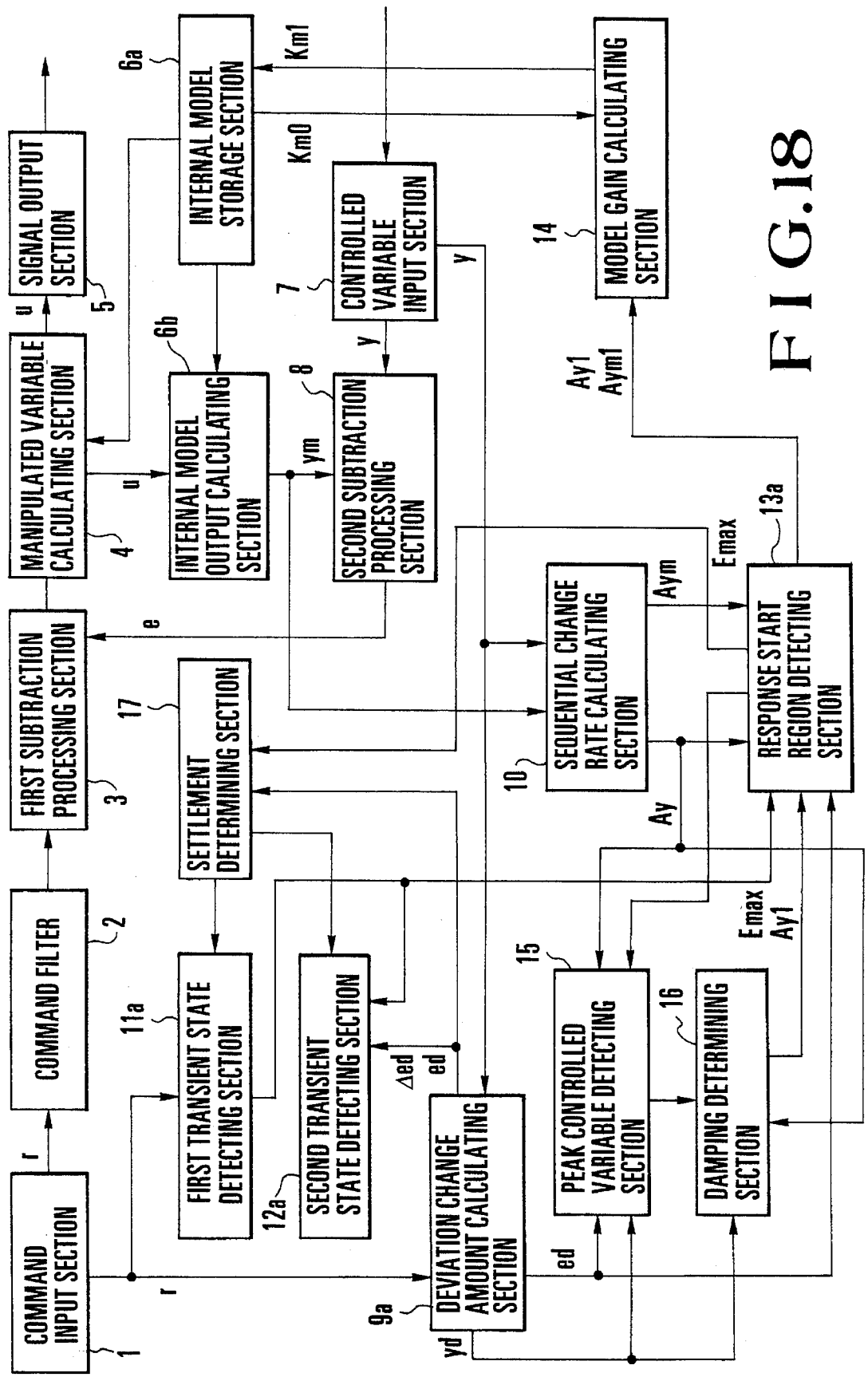
FIG. 18 is a block diagram showing a controller having an IMC structure according to another embodiment of the present invention.

FIG. 18 shows a controller having an IMC structure according to another embodiment of the present invention. The same reference numeral in FIG. 18 denote the same parts as in FIG. 4.

Reference numeral 9a denotes a deviation change amount calculating section which performs the same operation as that of the deviation change amount calculating section 9 and outputs a controlled variable yd(i) after a damping process; 11a and 12a, first and second transient state detecting sections which respectively perform the same operations as those of the first and second transient state detecting sections 11 and 12 and resume detection of transient states upon reception of initialization signals (to be described later); and 13a, a response start region detecting section which performs the same operation as that of the response start region detecting section 13 and detects a response start region again upon reception of a re-execution designation signal (to be described later).

Reference numeral 15 denotes a peak controlled variable detecting section for detecting the maximum and minimum values of a controlled variable y on the basis of the change rate of the controlled variable y after the gain of an internal model 6 is corrected by a model gain calculating section 14, and setting the controlled variable y at the time of this detection as a peak controlled variable; 16, a damping determining section for evaluating the fluctuated state of the controlled variable y on the basis of the peak controlled variable, and outputting a re-execution designation signal to the response start region detecting section 13a upon determining that damping of the fluctuations is insufficient; and 17, a settlement determining section for evaluating the settled state of control on the basis of a deviation ed(i) and a deviation change amount $\Delta$ed(i) output from the deviation change amount calculating section 9a, and outputting initialization signals to the first and second transient state detecting section 11a and 12a upon determining that control is set in a settled state.

In this embodiment, the operation of the basic arrangement of the controller constituted by a command input section 1, a command filter 2, a first subtraction processing section 3, a manipulated variable calculating section 4, a signal output section 5, an internal model storage section 6a, an internal model output calculating section 6b, a controlled variable input section 7, and a second substraction processing section 8 is the same as that of the controller shown in FIG. 4. The operation of a sequential change rate calculating section 10 is also the same as that of the equivalent section in FIG. 4.

The first or second transient state detecting section 11a or 12a outputs a transient state detection signal upon detection of a transient state of control. In response to this signal, the response start region detecting section 13a detects a response start region, and the model gain calculating section 14 corrects a gain Km of the internal model 6. This operation is just the same as that in the controller shown in FIG. 4.

The operation of the controller of this embodiment after gain correction will be described below.

Figure 19:
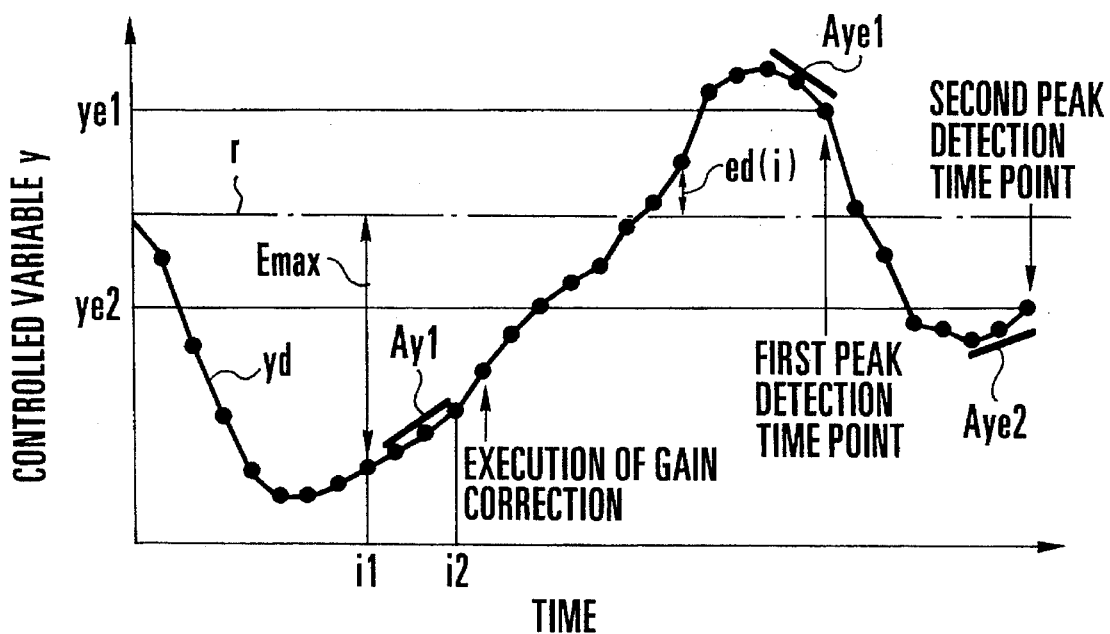
FIG. 19 is a graph showing the fluctuated state of the controlled variable.

The peak controlled variable detecting section 15 monitors the fluctuated state of the controlled variable y after gain correction to perform "damping determination" (to be described later), and detects the first and second peaks as the maximum and minimum values of the controlled variable y. FIG. 19 shows the fluctuated state of the controlled variable y to explain the operation of the peak controlled variable detecting section 15.

The purpose of detecting the maximum and minimum values of the controlled variable y is to detect that the fluctuated state of control continues. For this reason, maximum and minimum values appearing while the controlled variable y is settled without any problems must be considered as values other than peak detection targets. For example, a change in the controlled variable y indicated by reference symbol B in FIG. 14 is a value other than a peak detection target. Such maximum and minimum values other than peak detection targets appear before the controlled variable overshoots a command r after gain correction. Continuation of the fluctuated state of control is equivalent to continuation of repetitive overshoot. Therefore, the peak controlled variable detecting section 15 checks, according to the following inequality, whether overshoot has occurred after the gain Km of the internal model 6 was corrected.

$$ed(i) \times Emax < 0 \quad (24)$$

That is, if the product of a maximum transient deviation Emax obtained by the response start region detecting section 13a in detecting a response start region and the deviation ed(i) output from the deviation change amount calculating section 9a is negative, the peak controlled variable detecting section 15 determines that overshoot has occurred. This operation is equivalent to checking whether the polarities of the maximum transient deviation Emax an the deviation ed(i) are inverted, and checking whether the controlled variable y (a controlled variable yd in this case) exceeds the command r after execution of gain correction, as is apparent from FIG. 19.

Upon determining the occurrence of overshoot, the peak controlled variable detecting section 15 detects the first peak as the maximum or minimum value appearing for the first time after gain correction according to the following inequality, and sets a controlled variable change rate Ay(i) at the time of the detection as a controlled variable change amount Aye1; and a controlled variable yd(i) at the time of the detection as a first peak controlled variable ye1.

$$Ay(i) \times Ay1 < 0 \quad (25)$$

In this operation, the peak controlled variable detecting section 15 determines that the first peak appears in the controlled variable y, if the product of a controlled variable change rate Ay1 at an end time point i2 of the response start region obtained by the response start region detecting section 13a and the current controlled variable change rate Ay(i) output from the sequential change rate calculating section 10 is negative, i.e., the polarities of the two values are reverted.

Subsequently, the peak controlled variable detecting section 15 checks, according to the following inequality, whether overshoot has occurred after the first peak was detected.

$$ed(i) \times Emax > 0 \quad (26)$$

That is, contrary to inequality (24), if the product of the maximum transient deviation Emax and the current deviation ed(i) is positive, the peak controlled variable detecting section 15 determines that overshoot has occurred.

Upon determining the occurrence of overshoot, the peak controlled variable detecting section 15 detects the second peak as the maximum or minimum value after the first peak according to the following equality similar to inequality (25), and sets the controlled variable change rate Ay(i) at the time of the detection as a controlled variable change rate Aye2; and the controlled variable yd(i) as a second peak controlled variable ye2.

$$Ay(i) \times Aye1 < 0 \quad (27)$$

The peak controlled variable detecting section 15 outputs the controlled variable change amount Aye1 and the first peak controlled variable ye1, obtained when the first peak is detected, and the controlled variable change rate Aye2 and the second peak controlled variable ye2, obtained when the second peak is detected, to the damping determining section 16.

The damping determining section 16 evaluates the fluctuated state of the controlled variable y on the basis of the first and second peak controlled variables ye1 and ye2 output from the peak controlled variable detecting section 15, and checks, at a control period, whether the fluctuations are damped.

Each of FIGS. 20A and 20B shows the fluctuated state of the controlled variable y to explain the operation of the damping determining section 16. FIG. 20A shows a case wherein fluctuations in the controlled variable y are being damped, and damping determination is repeated. FIG. 20B shows a case wherein it is determined that damping is insufficient, and gain correction is performed again.

The damping determining section 16 checks, according to the following inequality, whether fluctuations in the controlled variable y are damped.

$$|ye1 - ye2| < \mu \times |ye2 - yd(i)| \quad (28)$$

where $\mu$ is the damping determination proportional constant (e.g., $\mu = 1.5$). In this case, $\mu = 1.5$ is experimentally determined in consideration of the control characteristic that control is set in a settled state after a peak appears two or three times in a fluctuated state.

If inequality (28) is not satisfied, the damping determining section 16 determines that fluctuations in the controlled variable y are being damped, and repeats damping determination at the control period according to inequality (28). In such repetitive damping determination processing, first of all, the damping determining section 16 checks, according to the following inequality, whether the third peak appears in the controlled variable y after the second peak.

$$Ay(i) \times Aye2 < 0 \quad (29)$$

The third peak is detected in the same manner as in detection of the first and second peaks by the peak controlled variable detecting section 15. That is, the detection time point of the third peak is the time point at which the product of the controlled variable change rate Aye2 at the detection time point of the second peak immediately preceding the third peak and the current controlled variable change rate Ay(i) becomes negative.

If inequality (29) is not satisfied, and the third peak is not detected, damping determination is performed according to inequality (28).

If inequality (29) is satisfied, and the third peak is detected, the controlled variable change rate Ay(i) at this detection time point is set as a controlled variable change rate Aye3, and the controlled variable yd(i) as a third peak controlled variable ye3. Subsequently, ye1=ye2, ye2=ye3, and Aye2=Aye3 are set, i.e., the current second peak controlled variable ye2 is set as the first peak controlled variable ye1; the detected third peak controlled variable ye3, as the second peak controlled variable ye2; and the controlled variable change rate Aye3 at the detection time point of the third peak, as the controlled variable change rate Aye2 at the detection time point of the second peak. Thereafter, damping determination is performed according to inequality (28).

In this processing, the first and second peaks are respectively shifted backward by one peak.

In this manner, the damping determining section 16 repeats damping determination until inequality (28) is satisfied. The gain Km of the internal model 6 is kept to be a corrected gain Km1 initially obtained by gain correction as long as this damping determination is repeated. That is, control based on this corrected gain Km1 is continued.

When inequality (28) is satisfied, the damping determining section 16 determines that damping of fluctuations in the controlled variable y is insufficient, i.e., correction of the gain Km of the internal model 6 is improper, and outputs a re-execution designation signal to the response start region detecting section 13a, thereby performing gain correction again.

The operation of the response start region detecting section 13a to which the re-execution designation signal is input is the same as the first gain correction which is performed in response to a transient state detection signal from the first or second transient state detecting section 11a or 12a.

The operation of the model gain calculating section 14 is almost the same as the first gain correction. That is, the model gain calculating section 14 calculates the corrected gain Km1 according to equation (21) and outputs it to the internal model storage section 6a to update the gain Km of the internal model 6. The only difference between this operation and the first gain correction is that a lower limit proportional constant Ld and a higher limit proportional constant Lu are respectively set as Ld=1 and Lu=5 in a gain limiting operation performed according to inequalities (22) and (23) when the corrected gain Km1 is calculated.

If, therefore, damping of fluctuations in the controlled variable y is insufficient because of the improper corrected gain Km1 calculated first, gain correction is performed again, as shown in FIG. 20B. This gain correction is repeated until the damping determining section 16 determines that damping is being performed, or the settlement determining section 17 (to be described later) determines a settled state.

As described above, whether to perform gain correction again is not simply determined on the basis of the lapse of a time but is determined by performing damping determination to check whether the gain Km of the internal model 6 is properly corrected. This operation is performed for the following reasons.

In performing gain correction again on the basis of the lapse of a time, a time constant Tm of the internal model 6 is an index. Assume that the time constant Tm is excessively larger than a time constant T of an actual controlled system process. In this case, even if a divergent state of the controlled variable y worsens because of improper gain correction, gain correction cannot be performed again.

Also assume that the time constant Tm is excessively smaller than the time constant T of the controlled system process. In this case, even if gain correction is properly performed, gain correction is performed again while control is shifting from a transient state to a settled state.

For the above reasons, gain correction is performed again after it is determined by damping determination whether gain correction is properly performed.

The settlement determining section 17 checks, at the control period, whether control is settled, independently of damping determination performed by the peak controlled variable detecting section 15 and the damping determining section 16.

Figure 21:
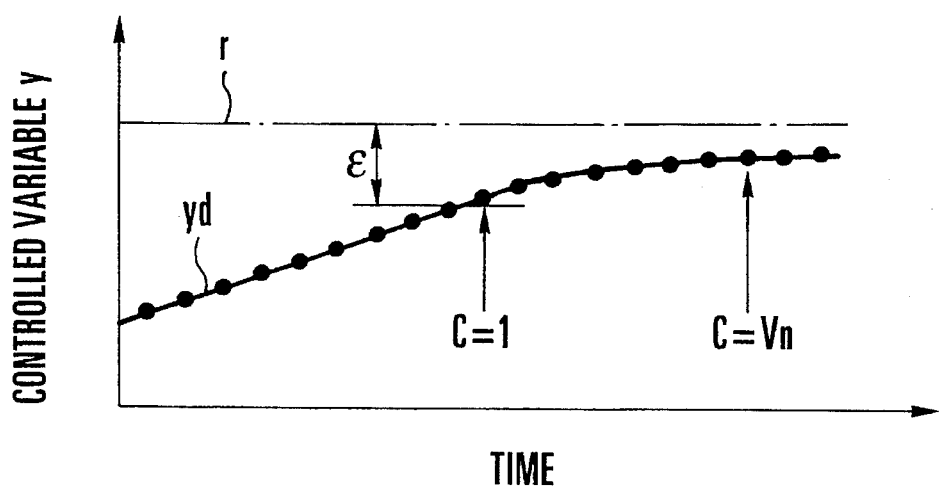
FIG. 21 is a graph showing the settled state of the controlled variable.

FIG. 21 shows the settled state of the controlled variable y to explain the operation of the settlement determining section 17. Reference symbol δ denotes a settlement determination reference value; C, a settlement determination count value (initial value=0); and Cn, a settlement determination reference value as a threshold value for settlement determination.

A settled state is a state in which the controlled variable y is kept to be sufficiently close to the command r. Therefore, whether control has shifted from a transient state to a settled state is determined on the basis of the deviation between the controlled variable y and the command r and the change rate of the deviation. In a settled state, the deviation and the deviation change rate ideally become zero. In practice, however, these values do not necessarily become zero owing to the influences of measurement noise and the like. Consider a criterion for a deviation. In general, in performing temperature control in a furnace by a heater, if the deviation is 5% or less, it should be determined that a settled state may be achieved. A criterion for a deviation change rate should be determined on the basis of a time constant set when the controlled system process is approximated to a 1-order delay. With regard to a control characteristic, it is proper to consider that a transient state starts to converge on a settled state in a step response manner when the maximum deviation is obtained in the transient state. According to experiments, when the maximum deviation appears and converges with a 1-order delay response, a deviation change rate obtained after the lapse of a time 5.0 times the time constant since the maximum deviation appeared is used as a criterion for determining a settled state. Therefore, the settlement determining section 17 checks whether control is in a settled state, on the basis of the deviation ed(i) and the deviation change amount Δed(i) output from the deviation change amount calculating section 9a and the maximum transient deviation Emax output from the response start region detecting section 13a according to the following inequalities:

$$|\Delta ed(i)| < |Emax| \times \exp(-5.0) \times \Delta t \tag{30}$$

$$|ed(i)| < \epsilon \tag{31}$$

|Emax|×exp(−5.0) in inequality (30) is a value obtained by estimating a change amount after the lapse of a time 5.0 times an equivalent 1-order delay time constant in an open loop step response of the controlled system process on the basis of the maximum transient deviation Emax. This value is an index of the maximum change amount which should be maintained in a settled state.

Continuation of a state satisfying inequalities (30) and (31) is a condition for determining that control is in a settled state. More specifically, if a state satisfying inequalities (30) and (31) continues for a time twice the model time constant Tm, it can be determined that a settled state is attained. This time as a criterion is based on the fact that when a settled state cannot be attained, and control is in a fluctuated state, the time interval in which the maximum and minimum values of the controlled variable y appear in a fluctuated state is about twice the model time constant. Therefore, in order to determine continuation of a state satisfying inequalities (30) and (31), if inequalities (30) and (31) are not satisfied at once, it is determined that control does not shift to a settled state, and the settlement determination count value C is initialized to 0.

If inequalities (30) and (31) are satisfied at once, it is determined that control shifts to a settled state, and the settlement determination count value C is incremented by one.

The settlement determining section 17 repeats such settlement determination at the control period. When inequalities (30) and (31) are kept satisfied, and the settlement determination count value C is gradually increased to be equal to the settlement reference value Cn, as shown in FIG. 21, the settlement determining section 17 determines that a settled state is attained. For example, the settlement determination reference value Cn is an integer obtained by omitting the decimal part of 2×Tm/Δ.

Upon determining the settled state, the settlement determining section 17 outputs initialization signals to the first and second transient state detecting sections 11a and 12a, and decrements the settlement determination count value C by one.

Upon reception of the initialization signals, the first and second transient state detecting sections 11a and 12a return to the initial processing described with reference to FIG. 4, and resume detection of the first and second transient states.

This operation is performed to prepare for the next change in command or occurrence of a disturbance or the like after control is settled. When control is settled, preparations for the next transient state are made regardless of whether gain correction has been performed.

When the peak controlled variable detecting section 15 and the damping determining section 16 determine that damping of fluctuations is insufficient, and gain correction is re-executed, control is shifted to a settled state by this re-execution of gain correction. After this operation, therefore, the settlement determining section 17 determines that control is in a settled state.

As described above, even if the gain of the internal model 6 is improperly corrected at first, proper control can be performed by re-executing gain correction. In addition, preparations for the next change in command or occurrence of a disturbance or the like can be made by settlement determination.

Figure 22:
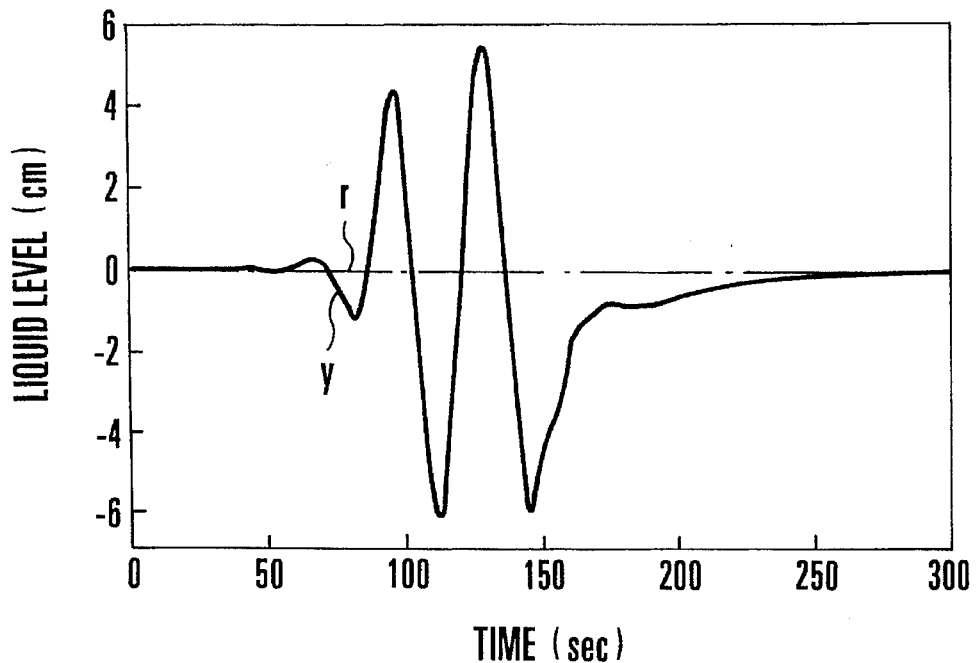
FIG. 22 is a graph showing the command tracking characteristic of the controller shown in FIG. 18.
Figure 23:
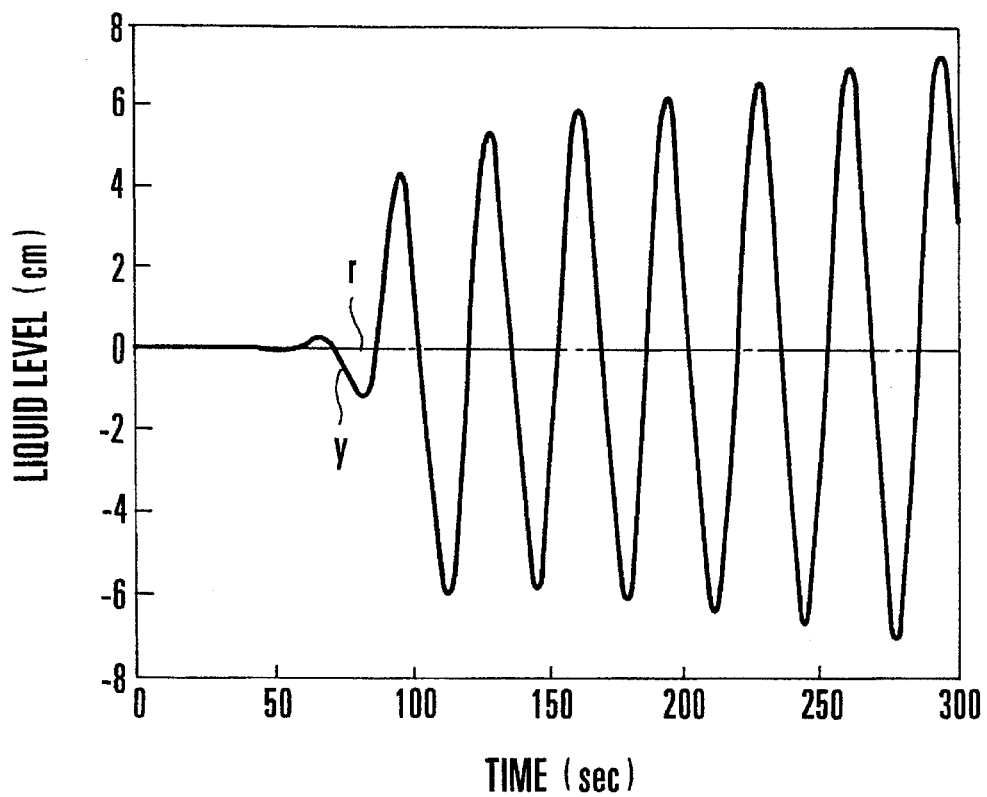
FIG. 23 is a graph showing the command tracking characteristic of the controller shown in FIG. 4.

FIG. 22 shows a command tracking characteristic obtained when the controller of this embodiment is used to control a liquid level in a tank, similar to the case shown in FIG. 10. FIG. 23 shows a command tracking characteristic obtained when the controller shown in FIG. 4 is used.

FIGS. 22 and 23 show simulation results, each obtained when self-fluctuations occur such that fluctuations in the controlled variable y are gradually amplified in an unstable control system.

In this case, the idle time L of the controlled system process is set to be 13 sec. In each of the controllers of this embodiment and the embodiment shown in FIG. 4, the gain Km of the internal model 6 is set to be 2.5, and other parameters are set to be the same as those in the cases shown in FIGS. 10 and 11.

In the controller shown in FIG. 4, the gain Km of the internal model 6 is eventually corrected to 7.157 at a time point "90 sec" in FIG. 23. However, the controlled system in this case has a relatively special characteristic, i.e., having a process idle time longer than a process time constant. In addition, since an error is present in an idle time Lm, gain correction cannot be performed satisfactorily. As a result, an excessive change in manipulated variable is repeated, and control is set in a divergent state. In contrast to this, in the controller of this embodiment, although the gain Km is corrected to 7.157 at a time point "90 sec" as well, it is determined afterward, on the basis of the amplitude of a fluctuated state, that gain correction is insufficient, and gain correction is performed again. With this operation, the gain Km of the internal model 6 is corrected to 23.721 at a time point "136 sec" so that control is settled, and a settled state is determined. Subsequently, preparations for a command tracking operation and a disturbance preventing operation are made.

According to the embodiments shown FIGS. 4 and 18, in the controller in which the settings in the internal model 6 are improper, the gain Km of the internal model 6 is automatically corrected during a control response operation. In these embodiments, gain correction is performed only when a transient state is caused by step input of the command r, a disturbance, or fluctuations. In a special controlled system, however, if the controlled system process gain K gradually changes to an extremely small value in a long period of time, the controller may be eventually set in an excessively stable state. For example, in performing temperature control in a furnace, as the number of products transferred through the furnace gradually increases, the process gain K gradually changes to a small value. Therefore, if such variations occur as excessively large variations, the internal model may be eventually set in an excessively stable state.

An undesired phenomenon due to an excessively stable state appears as follows. Although control is basically in a stable state, a control operation for small variations in a control system is made insufficient because of an excessively large model gain. That is, an undesired phenomenon associated with control characteristics does not appear as a transient state, but control is set in an excessively stable state, and the controlled variable y gradually deviates from the command r. Small variations in a control system in which an undesired phenomenon appears in an excessively stable state include variations caused by command ramp input performed by the operator, a moderate disturbance, and the like. For example, in performing temperature control in a furnace, when a set temperature is gradually increased and decreased, or the furnace is operated at a set temperature close to room temperature, room temperature in the factory where the furnace is installed gradually increases and decreases. This is a disturbance.

(Third Embodiment)

In the embodiments shown in FIGS. 4 and 18, since a command tracking characteristic is not secured when control is in an excessively stable state, proper countermeasures cannot be taken against the phenomenon that when control is set in an excessively stable state, the controlled variable y gradually departs from the command r. Therefore, processing other than that performed by the embodiments shown in FIGS. 4 and 18 is required.

Figure 24:
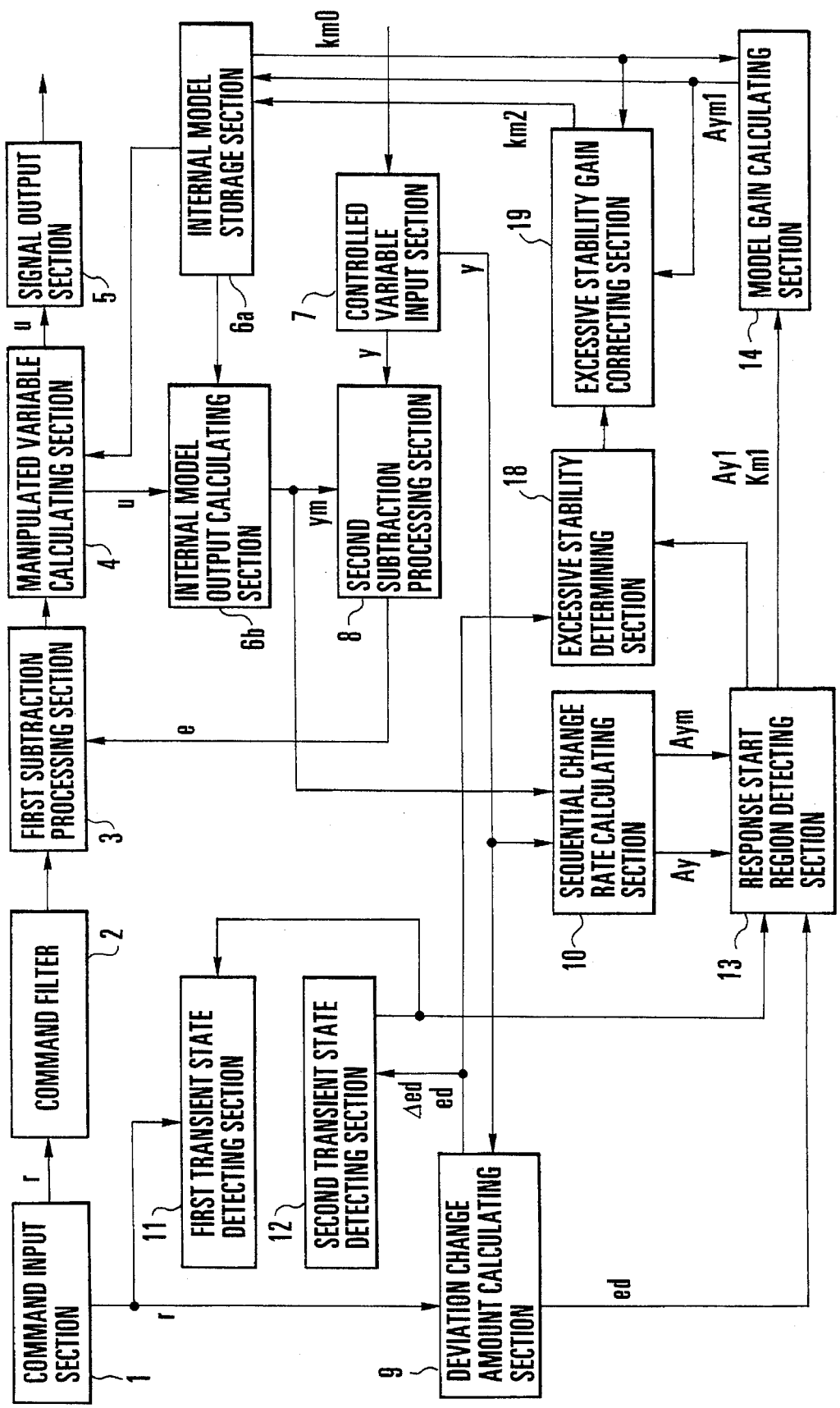
FIG. 24 is a block diagram showing a controller having an IMC structure according to still another embodiment of the present invention.

FIG. 24 shows a controller having an IMC structure according to still another embodiment of the present invention. The same reference numerals in FIG. 24 denote the same parts as in FIG. 4.

Reference numeral 18 denotes an excessive stability determining section for evaluating an excessive stable state of control on the basis of a deviation ed(i) and a deviation change amount Δed(i) output from a deviation change amount calculating section 9, and outputting a correction designation signal upon determining that control is in an excessively stable state; and 19, an excessive stability gain correcting section for calculating the corrected gain of an internal model 6 in response to the correction designation signal to eliminate the excessively stable state, and updating a gain Km stored in an internal model storage section 6a into the corrected gain.

In this embodiment, the operation of the basic arrangement of the controller is the same as that of the controller shown in FIG. 14, and the operations of the deviation change amount calculating section 9, a sequential change rate calculating section 10, a first transient state detecting section 11, a second transient state detecting section 12, a response start region detecting section 13, and a model gain calculating section 14 are the same as those in FIG. 4.

A problem in an excessively stable state is that a controlled variable y gradually departs from a command r owing to the large model gain Km. Therefore, an excessively stable state can be detected from the deviation change amount Δed(i) obtained by subtracting a command change from the controlled variable y.

It is proper that a criterion for determining a deviation change rate be determined on the basis of a time constant set when a controlled system process is approximated to a 1-order delay. As described above, a criterion for determining the occurrence of an excessively stable state due to a disturbance is that a deviation change rate as a criterion is detected in the process of causing a deviation of 5%. Conversely, that a deviation change rate exceeding the deviation charge rate as this criterion is no detected is a criterion for a deviation change rate for detecting an excessively stable state. With regard to a criterion for determining a deviation, it is proper to consider that if a deviation exceeding 1% continues, it is determined that it is highly possible that an undesired phenomenon is caused by an excessively stable state. Therefore, the excessive stability determining section 18 checks, at a control period, whether control is in an excessively stable state, on the basis of the deviation ed(i) and the deviation change amount Δed(i)

output from the deviation change amount calculating section 9 according to the following inequalities:

$$|\Delta ed(i)| < \epsilon \times \exp(-4.8) \times \Delta t \tag{32}$$

$$|\Delta ed(i)| > \lambda \tag{33}$$

where $\lambda$ is the excessive stability determination reference value, which is set to be, for example, 1% of the full range of the controlled variable y. The value given by $\epsilon \times \exp(-4.8)$ in inequality (32) is an index for the maximum change amount to be maintained in an excessively stable state, similar to the corresponding value in inequality (15).

When inequalities (32) and (33) are not satisfied at once, the excessive stability determining section 18 determines that control is not in an excessively stable state, and initializes an excessive stability determination count value H to 0.

When inequalities (32) and (33) are satisfied at once, the excessive stability determining section 18 determines that control is in an excessively stable state, and increments an excessive stability determination count value H by one.

When inequalities (32) and (33) are satisfied at once, together with the following mathematical expression, it is determined that the controlled variable y is close to the command r and control is not in an excessively stable state, and decrements the excessive stability determination count value H by one.

$$\Delta ed(i) = |ed(i)| - |ed(i-1)| < 0 \tag{34}$$

This is because when mathematical expression (34) is satisfied, a damping controlled variable yd(i) at current time i is closer to the command r than a damping controlled variable yd(i−1) at the time one sampling operation before current time i.

Continuation of a state satisfying inequalities (32) and (33) is a condition for determining that control is in an excessively stable state. More specifically, if a state satisfying inequalities (32) and (33) continues for a time twice a model time constant Tm, it can be determined that an excessively stable state is set. This time as a criterion is based on the fact that when a deviation is caused not by an excessively stable state but by a fluctuated state, the time interval in which the maximum and minimum values of the controlled variable y appear in the fluctuated state is about twice the model time constant. Therefore, the excessive stability determining section 18 repeats such excessive stability determination at a control period, and determines that control is set in an excessively stable state, if inequalities (32) and (33) are continuously satisfied, and the excessive stability determination count value H is gradually increased to be equal to an excessive stability determination reference value Hn, similar to the settlement determination described with reference to FIG. 21. The excessive stability determination reference value Hn is an integer obtained by omitting, for example, the decimal part of $2 \times Tm/\Delta$.

Upon determining that control is set in an excessively stable state, the excessive stability determining section 18 outputs a correction designation signal to the excessive stability gain correcting section 19.

A model gain correction amount for eliminating an adverse effect caused by an excessively stable state cannot be properly calculated from a current phenomenon. For this reason, determination on an excessively stable state is continued while the model gain is gradually corrected at the control period. According to experiments, it is proper that the model gain Km be decreased to about 1/20 after the lapse of a time equal to the model time constant Tm. Therefore, the excessive stability gain correcting section 19, to which the correction designation signal is input, calculates a corrected gain Km2 according to the following equation (35), and outputs the corrected gain Km2 to the internal model storage section 6a, thereby updating a current gain Km0 stored in the internal model storage section 6a to the corrected gain Km2.

$$Km2 = Km0 - Km0 \times \Delta t/(\beta 1 \times Tm) \tag{35}$$

where $\beta 1$ is the excessive stability gain correction amount adjustment coefficient (e.g., $\beta 1 = 20$).

Since it is difficult to determine a correction amount for the gain Km from a phenomenon of an excessively stable state, equation (35) is used to gradually decrease the current gain Km0 (equal to a gain Km1 if gain correction has been performed) of the internal model 6, stored in the internal model storage section 6a. If an excessively stable state is detected by the excessive stability determining section 18 after this gain correction, excessive stability gain correction is repeated by the excessive stability gain correcting section 19.

The excessive stability gain correcting section 19, therefore, repeats gain correction until an excessive stable state of control is eliminated. For this reason, even if control is set in an excessively stable state when the initially set gain Km of the internal model 6 is excessively large, or the corrected gain Km1 of the internal model 6 which is calculated by the model gain calculating section 14 is excessively larger, departure of the controlled variable y from the command r can be prevented, thereby securing the command tracking characteristic.

Figure 25:
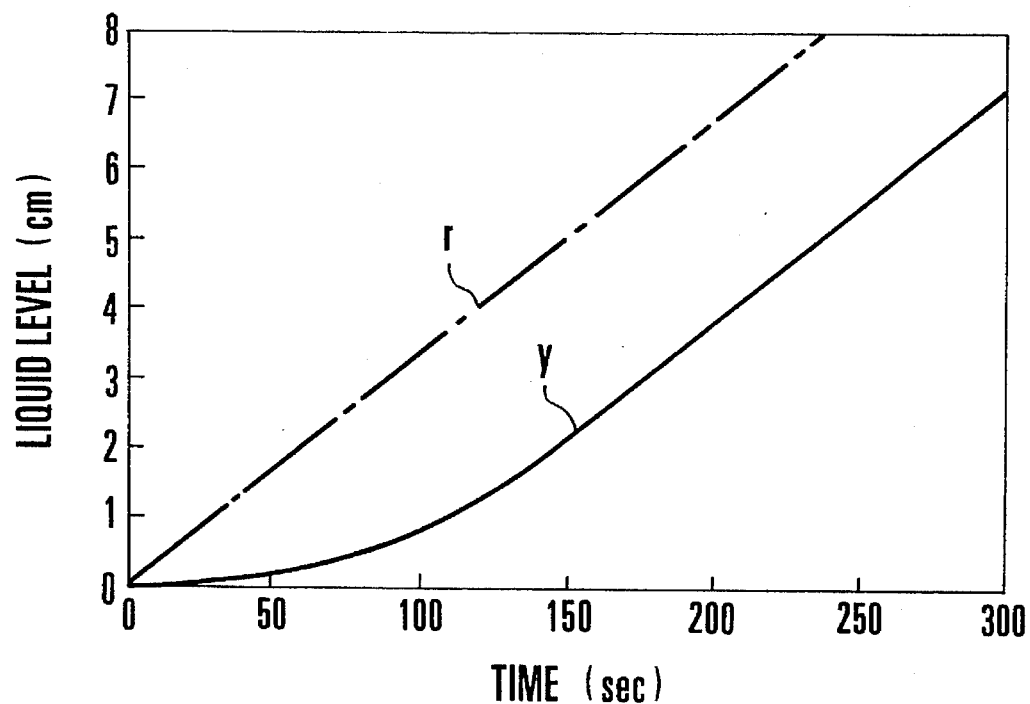
FIG. 25 is a graph showing the command tracking characteristic of the controller shown in FIG. 24.
Figure 26:
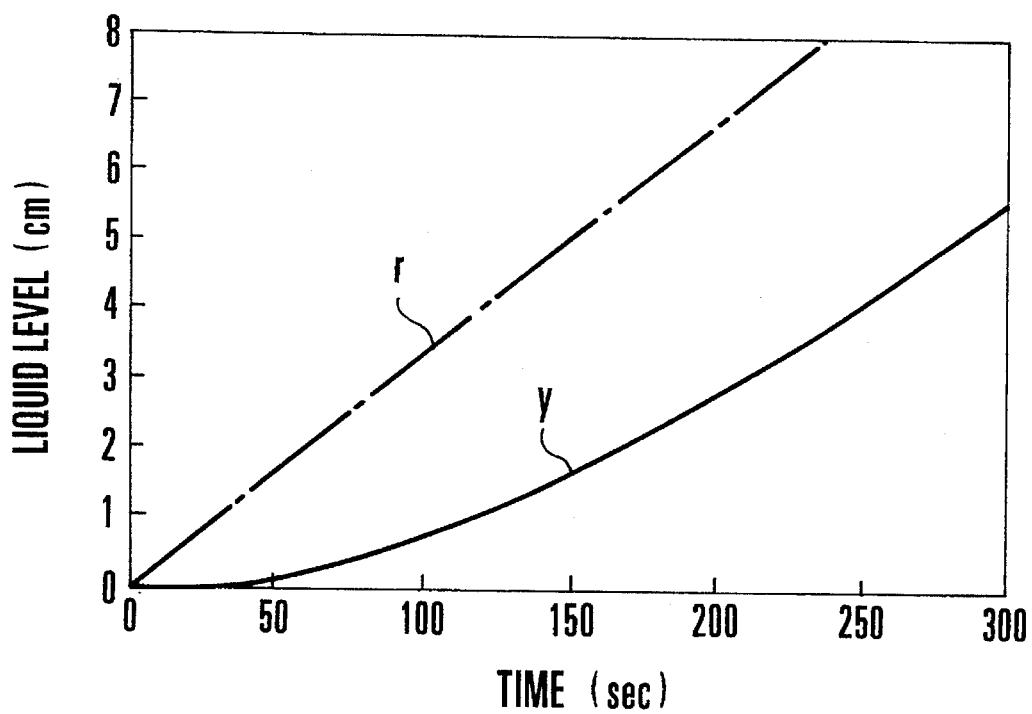
FIG. 26 is a graph showing the command tracking characteristic of the conventional IMC controller.

FIG. 25 shows a command tracking characteristic obtained when the controller of this embodiment is used to control a liquid level in a tank. FIG. 26 shows a command tracking characteristic obtained when the conventional IMC controller is used.

FIGS. 25 and 26 show simulation results, each obtained when the controlled variable y is obtained in a command ramp input operation in which the command r gradually changes from 0 cm.

In each of the controller of this embodiment and the conventional IMC controller, the gain Km of the internal mode is set to be 100, the time constant Tm is se to be 10 sec, and other parameters are set to be the same as those in the cases shown in FIGS. 10 and 11.

As is apparent from FIGS. 25 and 26, in the conventional controller, an insufficient change in manipulated variable continues with respect to a ramp input operation, and the controlled variable y departs from the command r over time. This is also true for a PID controller. In contrast to this, in the controller of this embodiment, the gain Km of the internal model 6 is corrected to 53.442 by excessive stability gain correction after the lapse of 35 sec, and a deviation is maintained within a predetermined range.

(Fourth Embodiment)

According to the embodiments shown in FIGS. 4, 18, and 24, in the controller in which the settings in the internal model 6 are improper, the gain Km of the internal model 6 is automatically corrected during a control response operation. In these embodiments, since the main purpose of correcting the gain Km is to settle a transient state, parameters such as the safety coefficient $\rho$ in equation (21) are set in consideration of the stability of control rather than the quick response characteristic of control. In these embodiments, since the quick response characteristic of control cannot be restored after control is settled, in order to restore the quick response characteristic, processing other than that performed by the embodiments shown in FIGS. 4, 18, and 24 is required.

Figure 27:
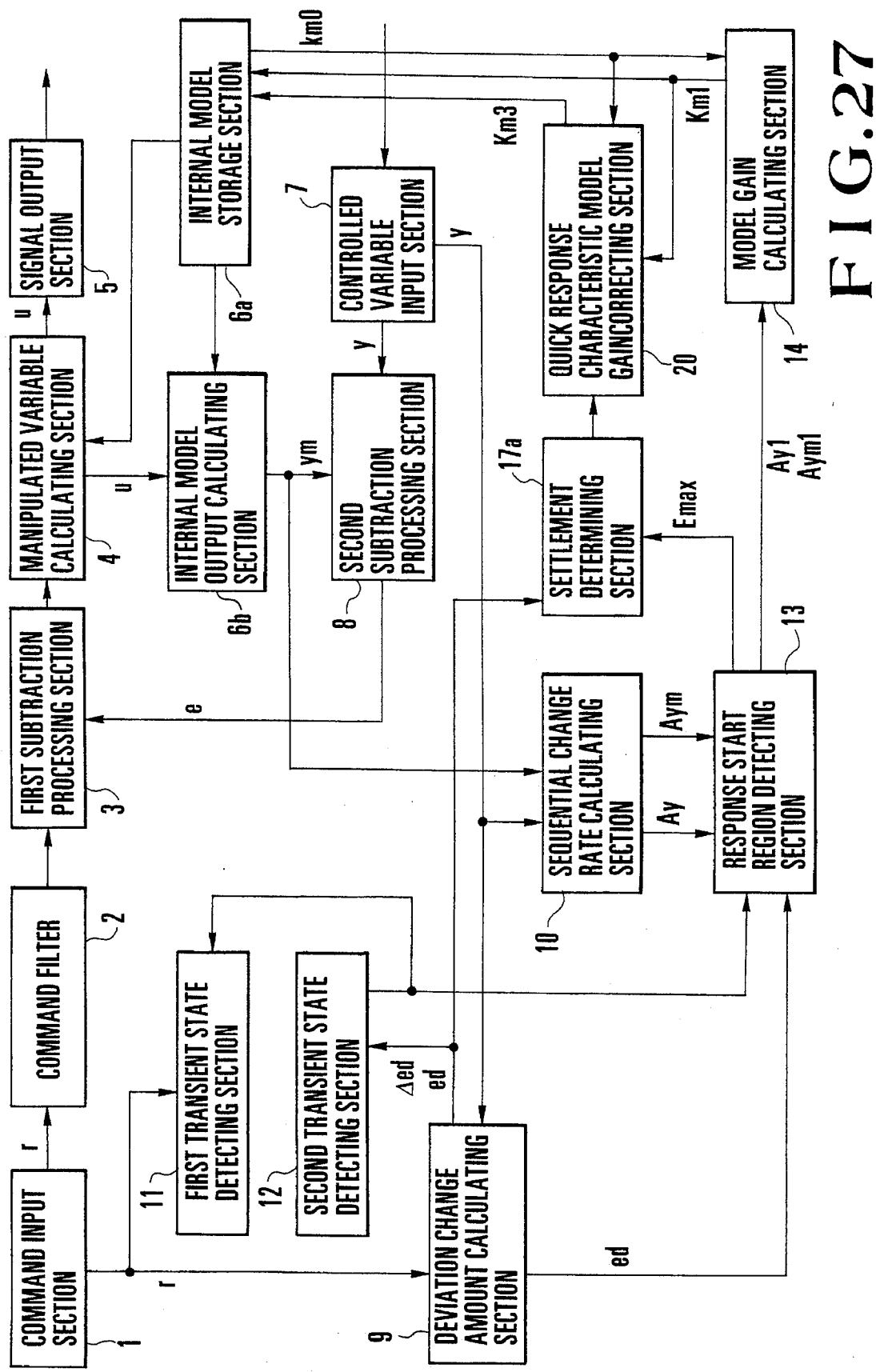
FIG. 27 is a block diagram showing a controller having an IMC structure according to still another embodiment of the present invention.

FIG. 27 shows a controller having an IMC structure according to still another embodiment of the present invention. The same reference numerals in FIG. 27 denote the same parts as in FIG. 4.

Reference numeral 17a denotes a settlement determining section which performs the same operation as that of the settlement determining section 17 and outputs a correction designation signal upon determining that control is in a settled state; and 20, a quick response characteristic model gain correcting section for calculating the corrected gain of an internal model 6 to restore the quick response characteristic of control in response to the correction designation signal, and updating a gain Km stored in an internal model storage section 6a to the corrected gain.

In this embodiment as well, the operation of the basic arrangement of the controller is the same as that of the controller shown in FIG. 4, and the operations of a deviation change amount calculating section 9, a sequential change rate calculating section 10, a first transient state detecting section 11, a second transient state detecting section 12, a response start region detecting section 13, and a model gain calculating section 14 are the same as those in FIG. 4.

The settlement determining section 17a performs settlement determination at a control period in the same manner as the settlement determining section 17 shown in FIG. 18. The settlement determining section 17a is different from the settlement determining section 17 in that it outputs a correction designation signal to a quick response characteristic model gain correcting section 20 upon determining that control is set in a settled state, thereby performing quick response characteristic gain correction.

Quick response characteristic gain correction is an operation of correcting the model gain to a value obtained by dividing a corrected model gain Km1 by a safety coefficient ρ. If the model gain Km is abruptly changed, a settled state cannot be maintained, similar to the case wherein an abrupt disturbance is applied. For this reason, the model gain Km is gradually corrected at a control period to be brought close to Km1/ρ. According to experiments, it is proper that the gain Km become equal to Km1/ρ after gain correction is continued for at least a time three times a model time constant Tm. Therefore, the quick response characteristic model gain correcting section 20, to which this correction designation signal is input, calculates a corrected gain Km3 according to the following equation, and outputs the corrected gain Km3 to the internal model storage section 6a, thereby updating a current gain Km0 stored in the internal model storage section 6a to the corrected gain Km3.

$$Km3 = Km0 - \{Km0 - (Km1/\rho)\} \times \Delta t/(\beta 2 \times Tm) \quad (36)$$

where β2 is the quick response characteristic model gain (e.g., β2=3).

Quick response characteristic gain correction by equation (36) is based on gain correction performed by the model gain calculating section 14, i.e., on the assumption that the corrected gain Km1 is output from the model gain calculating section 14. Therefore, the current gain Km0 set when the corrected gain Km3 is calculated for the first time is equal to the corrected gain Km1.

In a settled state, if the gain Km of the internal model 6 is greatly changed at once, the settled state is disturbed. Equation (36) is used to gradually decrease the current gain Km0 of the internal model 6, stored in the internal model storage section 6a, while maintaining the settled state. Therefore, a settled state is determined by the settlement determining section 17a after this quick response characteristic gain correction, and quick response characteristic gain correction is repeated by the quick response characteristic model gain correcting section 20.

Finally, the gain is corrected to a value given by equation (21) except that the safety coefficient ρ is not multiplied.

As described above, since quick response characteristic gain correction is performed while a settled state is maintained, the quick response characteristic can be restored within a range in which stability of control is not impaired.

Figure 28:
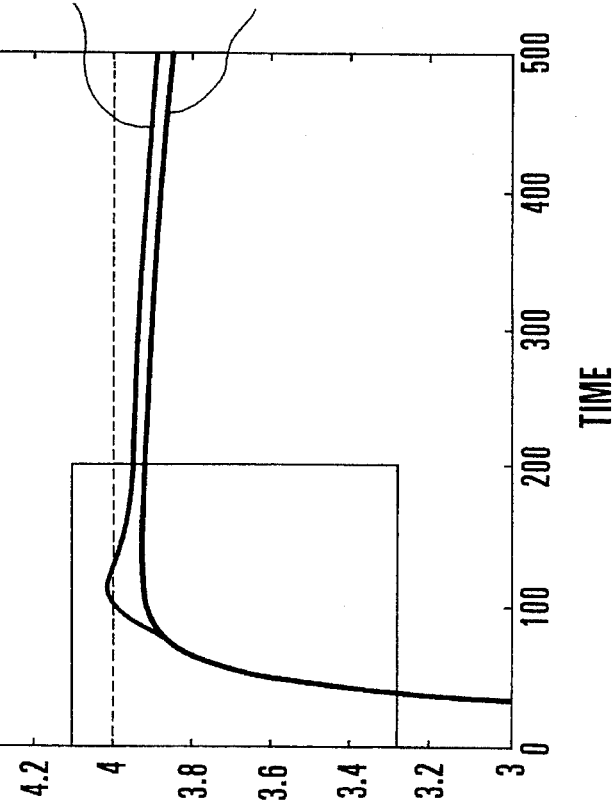
FIG. 28 is a graph showing the command tracking characteristics of the controllers shown in FIGS. 4 and 27.

FIG. 28 shows command tracking characteristics obtained when the controller of this embodiment and the controller shown in FIG. 4 are used to control a liquid level in a tank. FIG. 28 show simulation results, each obtained when the command r of 4 cm is input at a time point "0 sec" and a gain K of a controlled system process is gradually changed in the process of the control to obtain a controlled variable y.

Assume that the gain K of the controlled system process gradually changes from 50 to 30 between a time point "0 sec" and a time point "500 sec". In each of the controllers of this embodiment and the embodiment shown in FIG. 4, the gain Km of the internal model 6 is set to be 50; and the time constant Tm, 10 sec. Other parameters are set to be the same as those in the cases shown in FIGS. 10 and 11.

In the controller shown in FIG. 4, the gain Km of the internal model 6 is corrected to 68.930 in consideration of stability, thereby settling control. After settlement of control, as the gain K of a controlled system process 40 gradually varies, a state of an insufficient change in manipulated variable continues, and the controlled variable y departs from a command r with the lapse of a time. In contrast to this, the controller of this embodiment, the gain Km is corrected to 45.953 after a time point "70 sec" by quick response characteristic gain correction so as to suppress the state wherein the controlled variable y departs from the command r.

Figure 29:
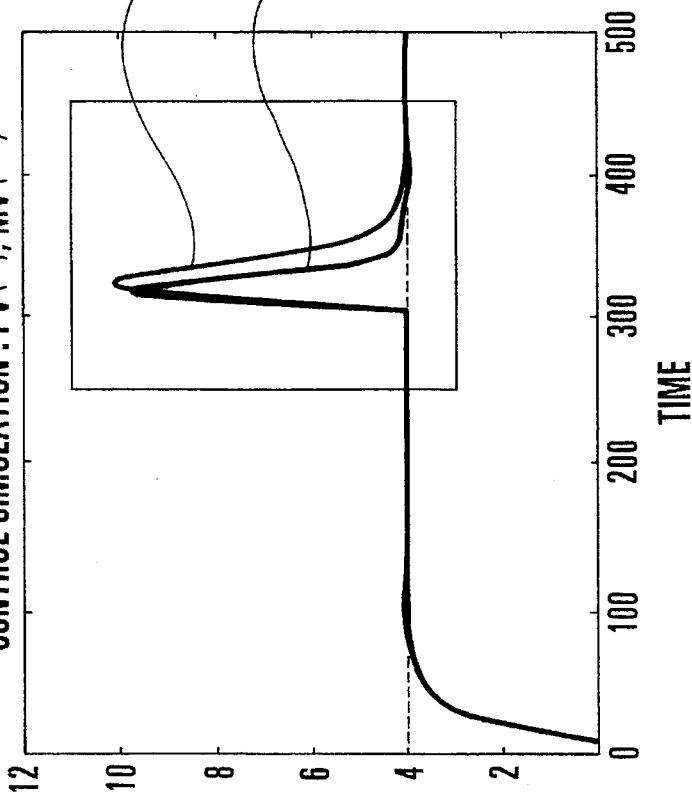
FIG. 29 is a graph showing the command tracking characteristics of the controllers shown in FIGS. 4 and 27.
Figure 30:
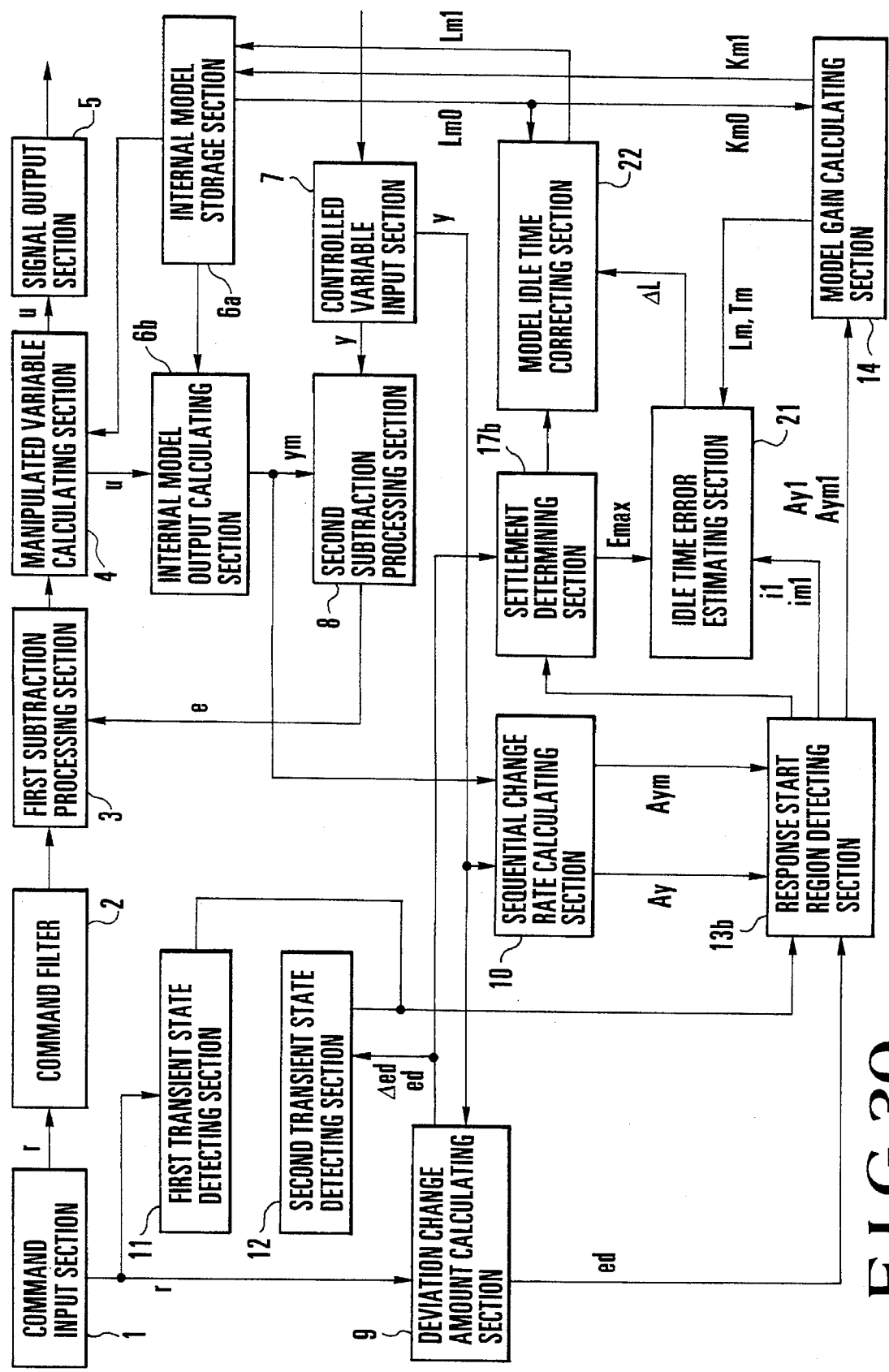
FIG. 30 is a block diagram showing a controller having an IMC structure according to still another embodiment of the present invention.
Figure 35:
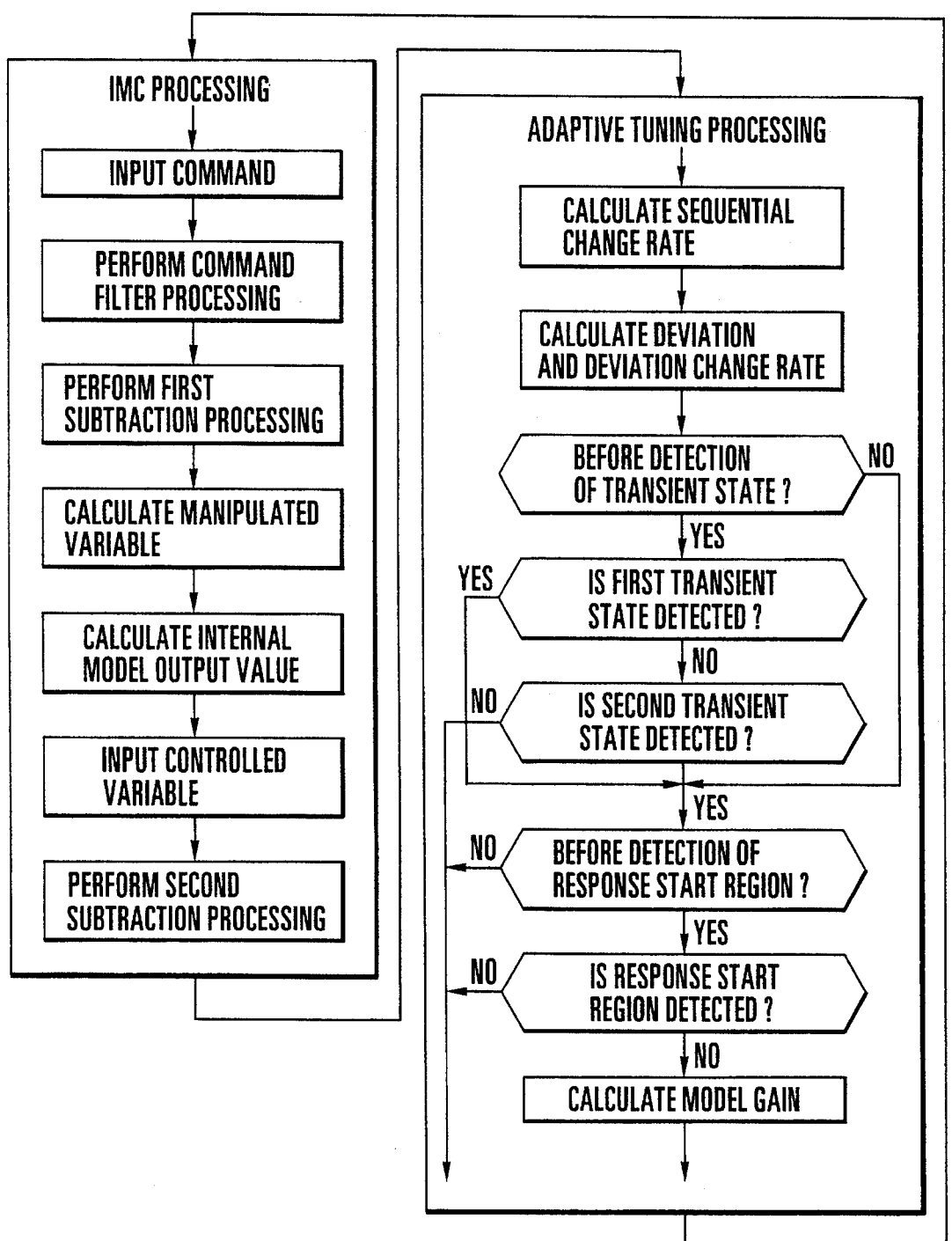
FIG. 35 is a flow chart depicting the operation of the system of FIG. 4.
Figure 36:
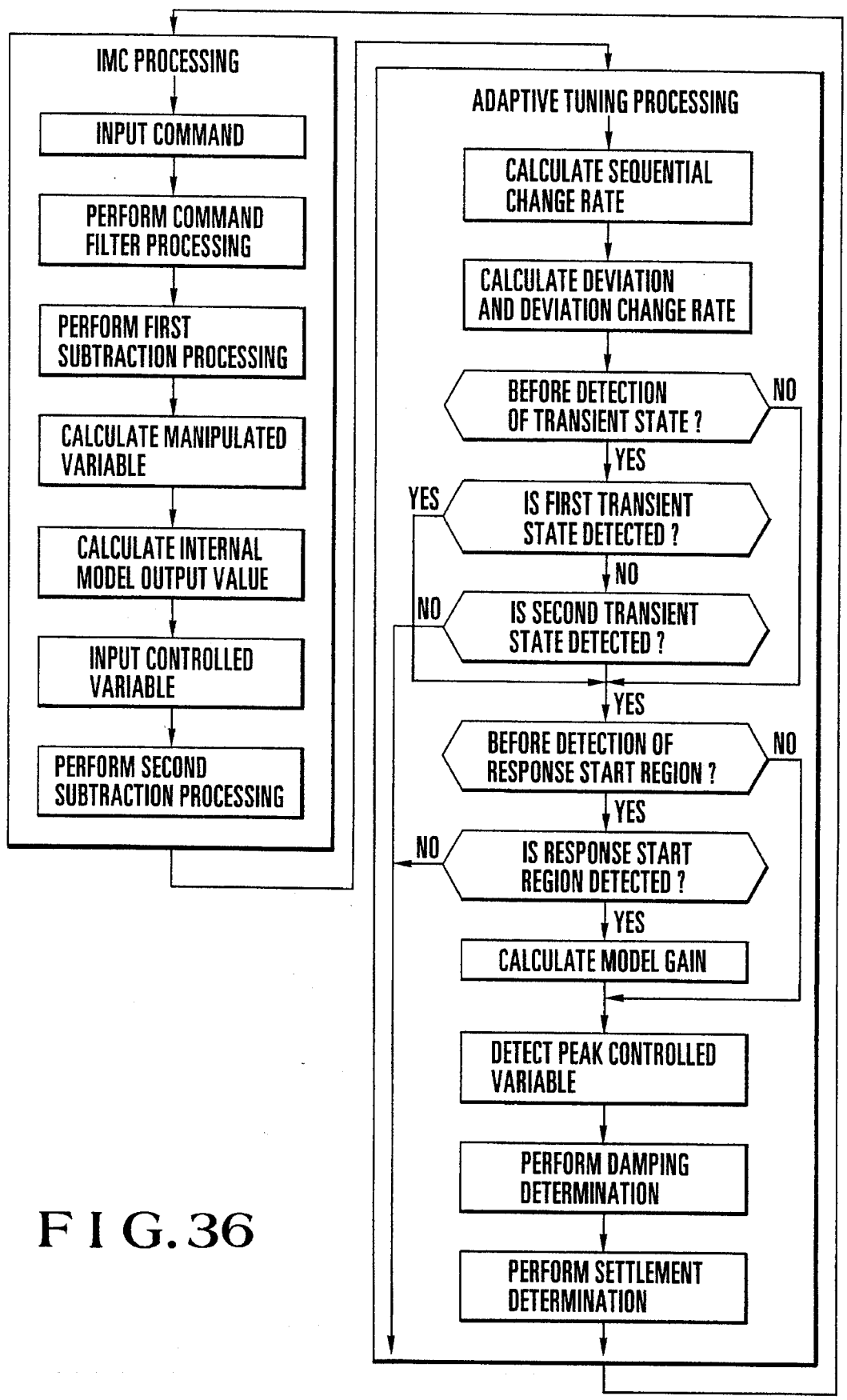
FIG. 36 is a flow chart depicting the operation of the system of FIG. 18.
Figure 37:
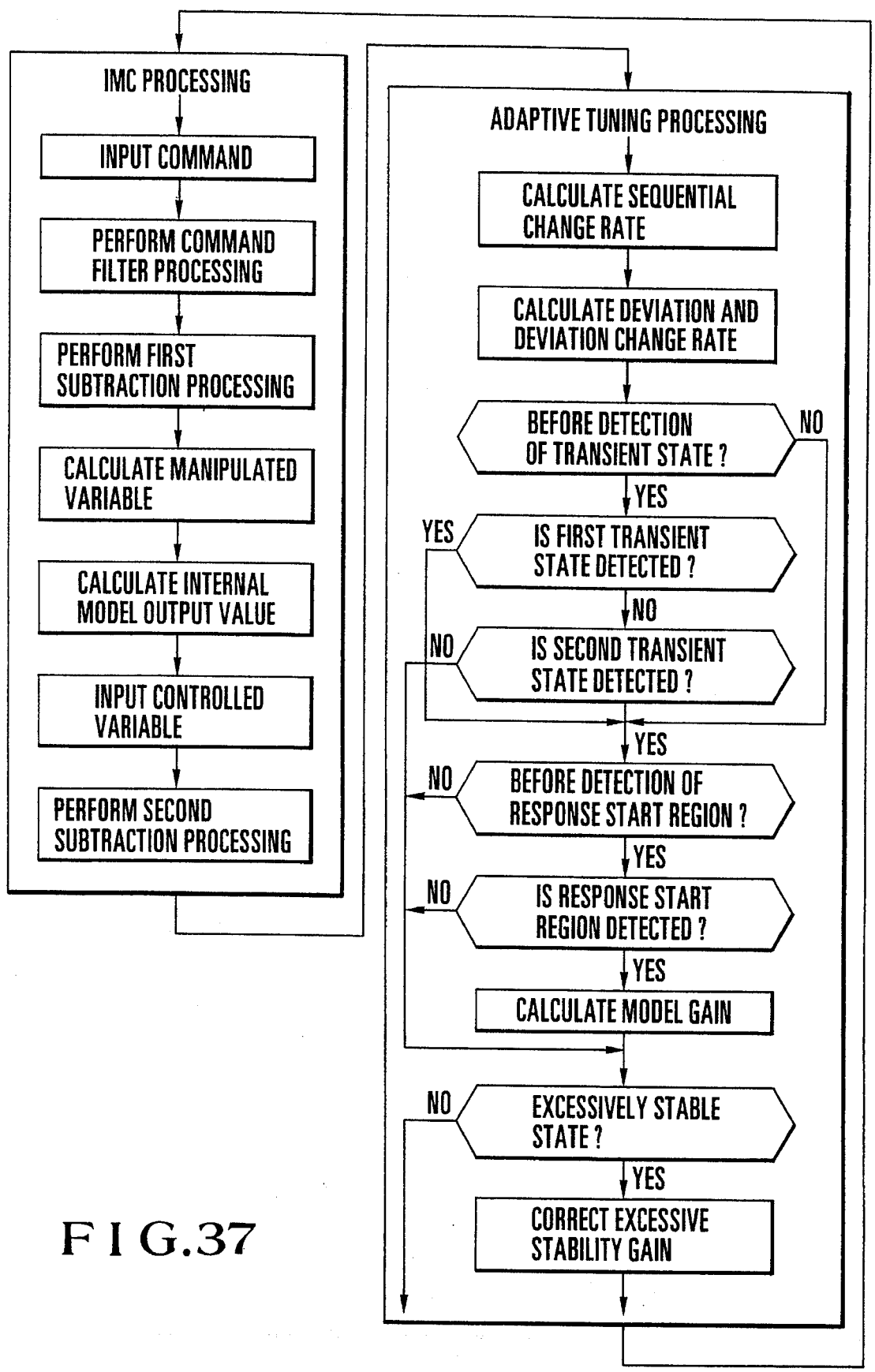
FIG. 37 is a flow chart depicting the operation of the system of FIG. 24.
Figure 38:
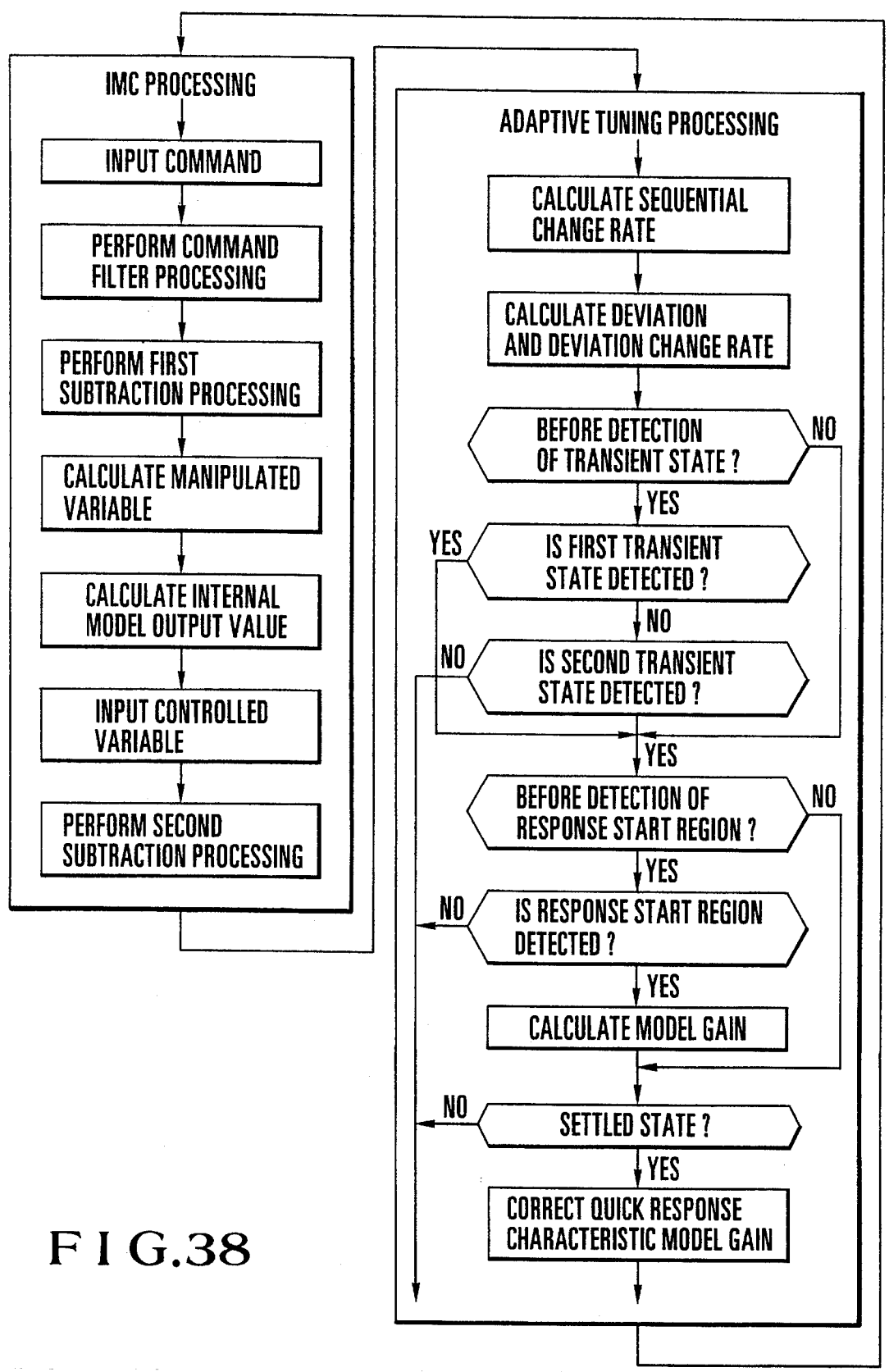
FIG. 38 is a flow chart depicting the operation of the system of FIG. 27.
Figure 39:
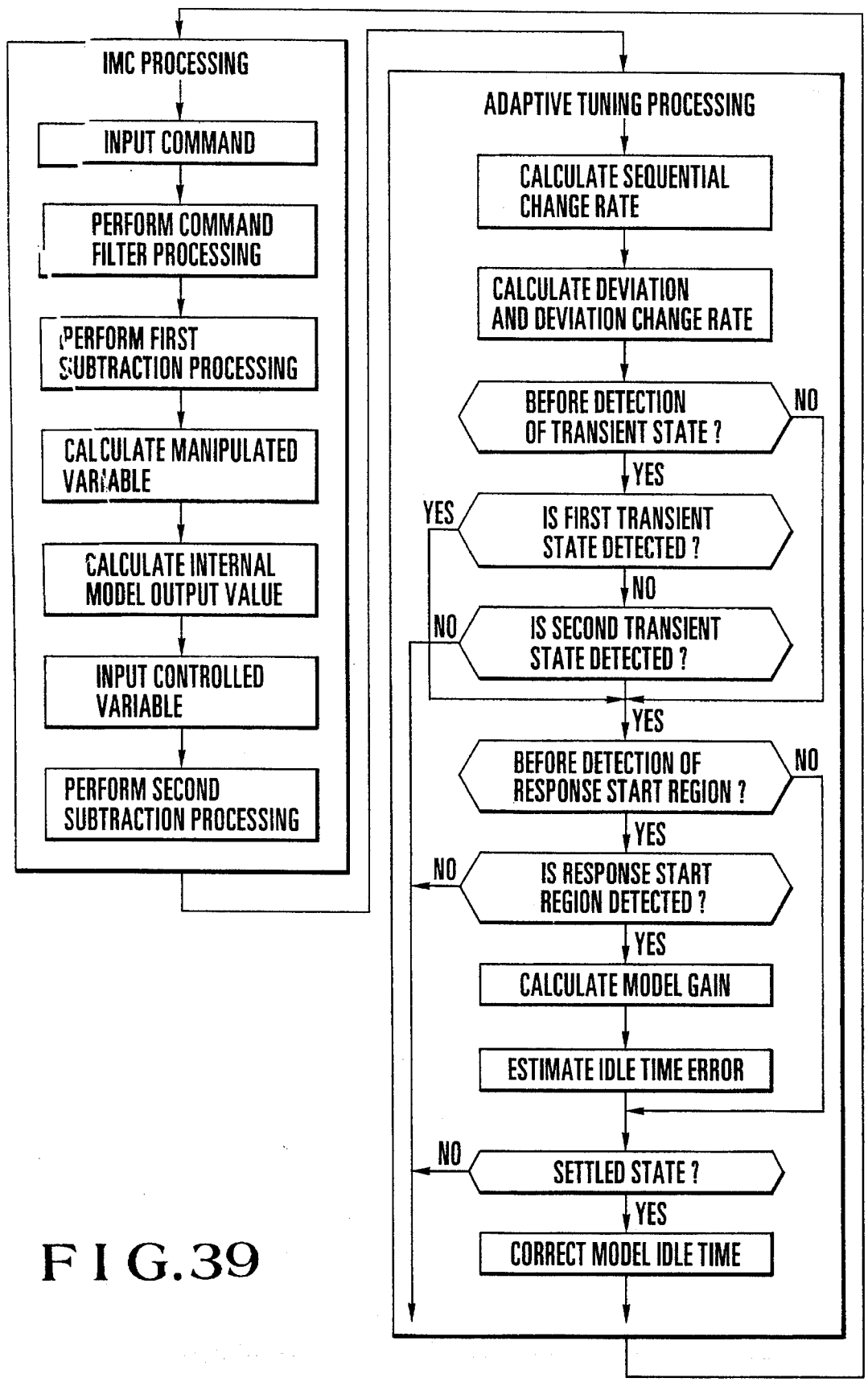
FIG. 39 is a flow chart depicting the operation of the system of FIG. 30.

FIG. 29 shows a command tracking characteristic obtained when the controller of this embodiment is used to control a liquid level in a tank. FIG. 30 shows a command tracking characteristic obtained when the controller shown in FIG. 4 is used. FIGS. 29 and 30 show simulation results, each obtained when the command r of 4 cm is input at a time point "0 sec", and a manipulated variable disturbance du is applied while control is in a settled state to obtain the controlled variable y.

In each of the controllers of this embodiment and the embodiment shown in FIG. 4, the gain Km of the internal model 6 is set to be 10; and the time constant Tm, 10 sec. Other parameters are set to be the same as those in the cases shown in FIGS. 10 and 11.

In the controller shown in FIG. 4, the gain Km of the internal model 6 is corrected to 13.943 in consideration of stability so as to settle control. The controlled variable y increases to 10.14 owing to a manipulated variable step disturbance at a time pint "300 sec" after settlement of control. In contrast to this, in the controller of this embodiment, the gain Km is corrected to 9.297 by quick response characteristic gain correction after a time point "68 sec", so that the increase in the controlled variable y owing to the manipulated variable step disturbance is suppressed to 9.68.

According to the embodiments shown in FIGS. 4, 18, 24, and 27, in the controller in which the settings in the internal model 6 are improper, the gain Km of the internal model 6 is automatically corrected during a control response operation. In these embodiments, if an error in the idle time Lm of the internal model 6 falls within a range of ±50%, excellent control characteristics can be provided in addition to good stability of control. However, in a special process in which a process idle time is longer than a process time constant, if an idle time error exceeds the above range, excellent control characteristics cannot be obtained, although good stability of control can be obtained. In such a case, therefore, in order to obtain excellent control characteristics, processing other than that described above is required.

FIG. 30 shows a controller having an IMC structure according to still another embodiment of the present invention. The same reference numerals in FIG. 30 denote the same parts as in FIG. 4.

Reference numeral 13b denotes a response start region detecting section which performs the same operation as that of the response start region detecting section 13 and outputs time information of a response start region; 17b, a settlement determining section which performs the same operation as that of the settlement determining section 17 and outputs a correction designation signal upon determining a settled state; 21, an idle time error estimating section for estimating an idle time error in an internal model 6 on the basis of the time information of the response start region output from the response start region detecting section 13b; and 22, a model idle time correcting section for calculating a corrected idle time of the internal model 6 on the basis of the idle time error in response to the correction designation signal, and updating an idle time Lm stored in an internal model storage section 6a into the corrected idle time.

In this embodiment as well, the operation of the basic arrangement of the controller is the same as that of the controller shown in FIG. 4, and the operations of a deviation change amount calculating section 9, a sequential change rate calculating section 10, a first transient state detecting section 11, a second transient state detecting section 12, the response start region detecting section 13b, and a model gain calculating section 14 are the same as those of the corresponding components in FIG. 4.

The settlement determining section 17b performs settlement determination at a control period in the same manner as the settlement determining section 17 shown in FIG. 18, except that the settlement determining section 17b outputs a correction designation signal to the model idle time correcting section 22 to cause it to correct the idle time, upon determining that control is set in a settled state.

An idle time error is based on the time difference between a start time point im1 of a response start region of a reference controlled variable ym and a start time point i1 of a response start region of a controlled variable y. This time difference may be simply considered as an idle time error. In general, however, a controlled system process is often a higher-order delay system which can be approximated by (1st-order delay+idle time). In contrast to this, an internal mode for calculating the reference controlled variable ym is a 1-order delay system. Therefore, the simply calculated difference between the two start time points must be corrected. According to experiments, it is proper that a value ¼ a model time constant Tm be subtracted from the difference. The idle time error estimating section 21 estimates an idle time error ΔL on the basis of the controlled variable y detected by the response start region detecting section 13b, the start time points i1 and im1 of the response start regions of the controlled variable y and the reference controlled variable ym, the time constant Tm of the internal model 6 which is stored in the internal model storage section 6a, and the idle time Lm according to the following equation:

$$\Delta L = (im1 - i1) \times \Delta t - Tm/4 \quad (37)$$

The main factor for an idle time error is a variation in process idle time. However, a variation in process idle time tends to occur abruptly and disappear immediately. Assume that a liquid is supplied into a tank via a pipe. In this case, if the pipe is not filled with the liquid, a long idle time is required to operate the flow of the liquid. Once the pipe is filled with the liquid, the idle time required to operate the flow of the liquid is shortened. If, however, the flow of the liquid is stopped, and the pipe is set in an unfilled state, the idle time is prolonged again. As described above, the process idle time may frequently and quickly varies. For this reason, if a detected idle time error is corrected straightforwardly, the error may be excessively corrected. In practice, therefore, excessive correction of an idle time error is not preferable. When the idle time error ΔL satisfies ΔL>Rd×Lm, ΔL=Rd×Lm. When the idle time error ΔL satisfies −ΔL>Rd×Lm, ΔL=−Rd×Lm. With this operation, limit processing for limiting the idle time error is performed. Note that Rd is a proportional constant (e.g., Rd=0.2).

Equation (37) is based on the assumption that the time difference between the start time point im1 of the response start region of the reference controlled variable ym and the start time point i1 of the response start region of the controlled variable y is approximated by an idle time error and a controlled system process 40 as a 1st-order delay system. Since the above time difference is also influenced by the coarseness of a method of detecting a response start region, a gain error, and a time constant error, the above estimation method is a considerably coarse method. For this reason, limit processing for limiting the idle time error ΔL is performed.

Model idle time correction is an operation of subtracting an idle time error ΔL1 from the model idle time Lm. If, however, the model idle time Lm is abruptly changed, a settled state may not be maintained as in the case wherein an abrupt disturbance is applied. For this reason, the model idle time Lm is gradually corrected at the control period to be brought close to Lm−ΔL1. According to experiments, it is proper that the model idle time Lm become equal to Lm−ΔL1 after the lapse of a time 20 times the model time constant Tm. A response start region is detected by the response start region detecting section 13b. The gain Km of the internal model 6 is corrected by the model gain calculating section 14. As a result, control is settled, and a correction designation signal is output from the settlement determining section 17b. In response to this designation signal, the model idle time correcting section 22 calculates a corrected idle time Lm1 according to the following equation and outputs it to the internal model storage section 6a, thereby updating a current idle time Lm0 stored in the internal model storage section 6a into the corrected idle time Lm1.

$$Lm1 = Lm0 - \Delta L1 \times \Delta t/(\beta 3 \times Tm) \quad (38)$$

where β3 is the idle time correction amount adjusting coefficient (e.g., β3=20), and ΔL1 is the idle time error whose initial value is ΔL calculated by the idle time error estimating section 21.

If the model idle time Lm of the internal model 6 is greatly changed at once in a settled state, the settled state is disturbed. For this reason, equation (38) is used to gradually correct the idle time Lm0 of the internal model 6, stored in the internal model storage section 6a, while maintaining a settled state. After this idle time correction, a settled state is determined by the settlement determining section 17b again, and idle time correction is repeatedly performed by the model idle time correcting section 22.

In this repetitive idle time correction, first of all, the model idle time correcting section 22 calculates the above idle time ΔL1 according to the following equation:

$$\Delta L1 = \Delta L0 - \Delta L0 \times \Delta t/(\beta 3 \times Tm) \tag{39}$$

where $\Delta L0$ is the current idle time error. Therefore, the initial value set in calculation of equation (39) is the value AL calculated by the idle time error estimating section 21.

After the idle time error $\Delta L1$ is calculated, the corrected idle time Lm1 is calculated according to equation (38).

When an error in the idle time Lm of the internal model 6, stored in the internal model storage section 6a, is large, the idle time Lm is automatically corrected in the above-described manner. Therefore, a deterioration in control characteristics caused by an idle time error can be prevented.

FIG. 31 shows a command tracking characteristic obtained when the controller of this embodiment is used to control a liquid level in a tank. FIG. 32 shows a command tracking characteristic obtained when the controller shown in FIG. 4 is used. FIGS. 31 and 32 show simulation results, each obtained when commands r of 4 cm and 0 cm are alternately and repeatedly input to obtain the controlled variable y.

In this case, an idle time L of the controlled system process is set to be 20 sec. In each of the controllers of this embodiment and the embodiment shown in FIG. 4, the gain Km of the internal model 6 is set to be 10; the time constant Tm, 10 sec; and the idle time L, 50 sec. Other parameters are set to be the same as those in FIGS. 10 and 11.

In the controller shown in FIG. 4, the gain Km of the internal model 6 is corrected to 33.89 to prevent control from being set in a divergent state. By maintaining this gain Km, command tracking control with a gradual response characteristic is continued. In contrast to this, in the controller of this embodiment, the idle time Lm of the internal model 6 is corrected to 15.9 at a time point "3,000 sec" as the final stage by a repetitive step response operation, thereby obtaining an ideal control response characteristic.

FIG. 33 shows a command tracking characteristic obtained when the control of this embodiment is used to control a liquid level in a tank. FIG. 34 shows a command tracking characteristic obtained when the controller shown in FIG. 4 is used. FIGS. 33 and 34 show simulation results, each obtained when commands r of 4 cm and 0 cm are alternately and repeatedly input to obtain the controlled variable y.

In this case, the idle time L of the controlled system process is set to be 15 sec. In each of the controllers of this embodiment and the embodiment shown in FIG. 4, the idle time Lm of the internal model 6 is set to be 5 sec, and other parameters are set to be the same as those in FIGS. 31 and 32.

In the controller shown in FIG. 4, the gain Km of the internal model 6 is corrected to 17.599 to prevent control from being set in a divergent state. By keeping this gain Km, command tracking characteristic control of a tendency of fluctuation is continued. In contrast to this, in the controller of this embodiment, the idle time Lm of the internal model 6 is corrected to 13 at a time point "3,000 sec" as the final stage by a repetitive step response operation, thereby obtaining an ideal control response characteristic.

FIGS. 36, 37, 38 and 39 are flow charts depicting respectively the operation of the systems shown in FIGS. 4, 18, 24, 27 and 30, which operation has been explained in connection with FIGS. 4, 18, and 30 and will not be repeated here.

What is claimed is:

1. A controller having an IMC structure which calculates a manipulated variable output to a controlled system process from a command of control, calculates a reference controlled variable corresponding to a controlled variable of the controlled system process as a control result by using an internal model representing the controlled system process, and feeds back a difference between the controlled variable and the reference controlled variable, thereby adaptively stabilizing control, comprising:

an IMC section for calculating and outputting a manipulated variable according to an IMC control algorithm; and an adaptive tuning section for adaptively tuning a model gain of an internal model as a constituent element of the IMC control algorithm such that change rates of the controlled variable and the reference controlled variable as variables used in said IMC section become the same value during a control response period in a transient state, said IMC section comprising:

a command filter section for outputting an input command of control with a transfer function having a delay characteristic, a first subtraction processing section for subtracting a feedback amount from the output from said command filter section, a manipulated variable calculating section including a command/disturbance filter section for outputting the output from said first subtraction processing section with a transfer function having a delay characteristic, and a manipulating section for calculating a manipulated variable on the basis of the output from said command/disturbance filter section on the basis of parameters of said internal model, and outputting the calculated manipulated variable, an internal model storage section for storing parameters of said internal model, an internal model output calculating section for calculating a reference controlled variable from the manipulated variable on the basis of parameters of said internal model, and a second subtraction processing section for subtracting the reference controlled variable output from said internal model output calculating section from the controlled variable of said controlled system process, and outputting the feedback amount.

2. A controller having an IMC structure which calculates a manipulated variable output to a controlled system process from a command of control, calculates a reference controlled variable corresponding to a controlled variable of the controlled system process as a control result by using an internal model representing the controlled system process, and feeds back a difference between the controlled variable and the reference controlled variable, thereby adaptively stabilizing control, comprising:

an IMC section for calculating and outputting a manipulated variable according to an IMC control algorithm; and an adaptive tuning section for adaptively tuning a model gain of an internal model as a constituent element of the IMC control algorithm such that change rates of the controlled variable and the reference controlled variable as variables used in said IMC section become the same value during a control response period in a transient state, said IMC section comprising:

a command filter section for outputting an input command of control with a transfer function having a delay characteristic, a first subtraction processing section for subtracting a feedback amount from the output from said command filter section, a manipulated variable calculating section including a command/disturbance filter section for outputting the output from said first subtraction processing section with a transfer function having a delay characteristic, and a manipulating section for calculating a manipulated variable on the basis of the output from said command/disturbance filter section on the basis of parameters of said internal model, and outputting the calculated manipulated variable, an internal model storage section for storing parameters of said internal model, an internal model output calculating section for calculating a reference controlled variable from the manipulated variable on the basis of parameters of said internal model, and a second subtraction processing section for subtracting the reference controlled variable output from said internal model output calculating section from the controlled variable of said controlled system process, and outputting the feedback amount;

said adaptive tuning section comprising:

a deviation change amount calculating section for calculating a deviation as a difference between the command and the controlled variable, and calculating a change amount of the deviation, a sequential change rate calculating section for calculating change rates of the controlled variable and the reference controlled variable, a first transient state detecting section for outputting a transient state detection signal upon detecting a transient state of control due to a change in command, a second transient state detecting section for outputting a transient state detection signal upon detecting a transient state of control due to a factor other than the change in command, a response start region detecting section for detecting a response start region, in which control responses corresponding to a transient state begin to appear in the controlled variable and the reference controlled variable, on the basis of the deviation and the change rates of the controlled variable and the reference controlled variable, when the transient state detection signal is output, and determining the change rates of the controlled variable and the reference controlled variable in the response start region, and a model gain calculating section for calculating a corrected gain of said internal model from the change rates of the controlled variable and the reference controlled variable in the response start region, and updating a gain as one of the parameters stored in said internal model storage section into the corrected gain.

3. A controller having an IMC structure which calculates a manipulated variable output to a controlled system process from a command of control, calculates a reference controlled variable corresponding to a controlled variable of the controlled system process as a control result by using an internal model representing the controlled system process, and feeds back a difference between the controlled variable and the reference controlled variable, thereby adaptively stabilizing control, comprising:

an IMC section for calculating and outputting a manipulated variable according to an IMC control algorithm; and an adaptive tuning section for adaptively tuning a model gain of an internal model as a constituent element of the IMC control algorithm such that change rates of the controlled variable and the reference controlled variable as variables used in said IMC section become the same value during a control response period in a transient state, said adaptive tuning section comprising:

a deviation change amount calculating section for calculating a deviation as a difference between the command and the controlled variable, and calculating a change amount of the deviation, a sequential change rate calculating section for calculating change rates of the controlled variable and the reference controlled variable, a first transient state detecting section for outputting a transient state detection signal upon detecting a transient state of control due to a change in command, a second transient state detecting section for outputting a transient state detection signal upon detecting a transient state of control due to a factor other than the change in command, a response start region detecting section for detecting a response start region, in which control responses corresponding to a transient state begin to appear in the controlled variable and the reference controlled variable, on the basis of the deviation and the change rates of the controlled variable and the reference controlled variable, when the transient state detection signal is output, and determining the change rates of the controlled variable and the reference controlled variable in the response start region, and a model gain calculating section for calculating a corrected gain of said internal model from the change rates of the controlled variable and the reference controlled variable in the response start region, and updating a gain as one of the parameters stored in said internal model storage section into the corrected gain.

4. A controller according to claim 3, wherein said adaptive tuning section further comprises a peak controlled variable detecting section for detecting maximum and minimum values of the controlled variable on the basis of the change rate of the controlled variable after the gain of said internal model is corrected by said model gain calculating section, and setting a controlled variable at the time point, at which the maximum and minimum values are detected, as a peak controlled variable, a damping determining section for evaluating a fluctuated state of the controlled variable on the basis of the peak controlled variable, and outputting a re-execution designation signal for re-executing correction of the gain of said internal model to said response start region detecting section upon determining that damping of fluctuations is insufficient, and a settlement determining section for evaluating a settled state of control on the basis of the deviation and the deviation change amount output from said deviation change amount calculating section, and outputting initialization signals for resuming detection of a transient state to prepare for a next transient state to said first and second transient state detecting sections upon determining a settled state.

5. A controller according to claim 3, wherein said adaptive tuning section further comprises an excessive stability determining section for evaluating an excessively stable state of control on the basis of the deviation and the deviation change amount output from said deviation change amount calculating section, and outputting a correction designation signal upon determining the excessively stable state, and an excessive stability gain correcting section for calculating a corrected gain of said internal model to cancel the excessively stable state in response to the correction designation signal, and updating a gain as one of the parameters stored in said internal model storage section into the corrected gain.

6. A controller according to claim 3, wherein said adaptive tuning section further comprises a settlement determining section for evaluating a settled state of control on the basis of the deviation and the deviation change amount output from said deviation change amount calculating section, and outputting a correction designation signal upon determining the settled state, and a quick response characteristic model gain correcting section for calculating a corrected gain of said internal model to restore a quick response characteristic of control in response to the correction designation signal, and updating a gain as one of the parameters stored in said internal model storage section into the corrected gain.

7. A controller according to claim 3, wherein said adaptive tuning section further comprises a settlement determining section for evaluating a settled state of control on the basis of the deviation and the deviation change amount output from said deviation change amount calculating section, and outputting a correction designation signal upon determining the settled state, an idle time error estimating section for estimating an idle time error of said internal model on the basis of time information of the response start region which is output from said response start region detecting section, and a model idle time correcting section for calculating a corrected idle time of said internal model on the basis of the idle time error in response to the correction designation signal, and updating an idle time as one of the parameters stored in said internal model storage section into the corrected idle time.

8. In a system process controller which calculates a manipulated variable output to the system process in response to an input command and calculates a reference control variable corresponding to a control variable of the system process using an internal model control algorithm representing the system process, and feeds back a difference between the control variable and the reference control variable, a method for adaptively modifying a parameter of an internal model control algorithm comprising the steps of:

calculating a sequential change rate of the input command;

calculating a deviation change rate between said sequential change rate of the input command and a change rate of the reference control variable; and calculating an adjusted gain parameter for said internal model control algorithm as a function of said deviation change rate.

9. A method for adaptively modifying a parameter of an internal model control algorithm as in claim 8, comprising the further steps of:

detecting a transient state of said input command; and adjusting the gain of the internal model control algorithm such that the change rate of the input command and the change rate of the reference control variable converge during a response period in said transient state.

10. A method for adaptively modifying a parameter of an internal model control algorithm as in claim 9, comprising the further steps of:

detecting maximum and minimum values of the controlled variable on the basis of the change rate of the controlled variable after the gain of said internal model is adjusted;

setting, as a peak controlled variable, the control variable at the point in time at which the maximum and minimum values are detected;

evaluating a fluctuated state of the controlled variable on the basis of the peak controlled variable;

re-executing adjustment of the gain of said internal model upon determining that damping of the fluctuated state is insufficient, evaluating a settled state of control on the basis of the deviation and the deviation change amount output, and resuming detection of a transient state to prepare for a next transient state to said first and second transient state detecting sections upon determining a settled state.

11. A method for adaptively modifying a parameter of an internal model control algorithm as in claim 9, comprising the further steps of:

evaluating an excessively stable state of control on the basis of the deviation and the deviation change amount;

outputting an adjustment designation signal upon determining the excessively stable state, calculating an adjusted gain of said internal model to cancel the excessively stable state in response to the adjustment designation signal, and updating a gain as one of the parameters stored in said internal model storage section into the adjusted gain.

12. A method for adaptively modifying a parameter of an internal model control algorithm as in claim 9, comprising the further steps of:

evaluating a settled state of control on the basis of the deviation and the deviation change amount output;

outputting an adjustment designation signal upon determining the settled state, calculating an adjusted gain of said internal model to restore a quick response characteristic of control in response to the adjustment designation signal, and updating a gain as one of the parameters stored in said internal model storage section into the adjusted gain.

13. A method for adaptively modifying a parameter of an internal model control algorithm as in claim 9, comprising the further steps of:

evaluating a settled state of control on the basis of the deviation and the deviation change amount output from said deviation change amount;

outputting an adjustment designation signal upon determining the settled state, estimating an idle time error of said internal model;

calculating an adjusted idle time of said internal model on the basis of the idle time error in response to the adjustment designation signal, and updating an idle time as one of the parameters stored in said internal model storage section into the adjusted idle time.

* * * * *

UNITED STATES PATENT AND TRADEMARK OFFICE
CERTIFICATE OF CORRECTION

PATENT NO. : 5,537,310
DATED : July 16, 1996
INVENTOR(S) : Masato Tanake; Hiroyuki Mibuchi It is certified that error appears in the above-indentified patent and that said Letters Patent is hereby corrected as shown below:

On title page, item [75]
Correct the name of the first inventor to read "Masato Tanaka"
and item [19], should read —Tanaka et al—
Column 13, correct equation (14) to read as follows:

$$|\Delta r(i)| = |r(i) - r(i-1)| > \theta$$

Signed and Sealed this

Twelfth Day of November, 1996

Attest:

BRUCE LEHMAN

Attesting Officer          Commissioner of Patents and Trademarks